(12) United States Patent
Takano et al.

(10) Patent No.: US 7,627,511 B2
(45) Date of Patent: Dec. 1, 2009

(54) METHOD AND APPARATUS FOR CALCULATING CREDIT RISK OF PORTFOLIO

(75) Inventors: Yasushi Takano, Chiyoda-ku (JP); Jiro Hashiba, Chiyoda-ku (JP)

(73) Assignee: Mizuho-DL Financial Technology Co., Ltd., Chiyoda-ku, Tokyo (JP)

( * ) Notice: Subject to any disclaimer, the term of this patent is extended or adjusted under 35 U.S.C. 154(b) by 0 days.

(21) Appl. No.: 12/213,778

(22) Filed: Jun. 24, 2008

(65) Prior Publication Data

US 2009/0006275 A1   Jan. 1, 2009

(30) Foreign Application Priority Data

Jun. 28, 2007 (JP) ............................. 2007-171046
Apr. 11, 2008 (JP) ............................. 2008-103243

(51) Int. Cl.
    *G06Q 40/00* (2006.01)
(52) U.S. Cl. ...................................................... 705/35
(58) Field of Classification Search ............... 705/1–45; 426/55; 435/6; 436/39; 524/439; 600/449
    See application file for complete search history.

(56) References Cited

U.S. PATENT DOCUMENTS

| 7,050,999 B1 | 5/2006 | Ota |
| 7,398,243 B1 * | 7/2008 | Ocampo ................... 705/36 R |
| 2003/0101132 A1 * | 5/2003 | Gaubatz et al. ............... 705/38 |
| 2005/0027645 A1 * | 2/2005 | Lui et al. ...................... 705/38 |

OTHER PUBLICATIONS

Estimating Loan-Loss Exposure: A Comparision of Traditional and Markov Models. Commercial Lending Review V19n6 pp. 25-32. Nov./Dec. 2004.*
Abate et al., "An Introduction to Numerical Transform Inversion and its Application to Probability Models" Transform Inversion, pp. 1-69, Ridgewood, NJ.
Ahn et al., "A Flexible Inverse Laplace Transform Algorithm and its Application" Chosun University Research Funds, 2000, pp. 1-21.
De Hoog et al., "An Improved Method for Numerical Inversion of Laplace Transform" Siam J. Sci. Stat. Comput., 1982, vol. 3, No. 3, pp. 356-367.

(Continued)

*Primary Examiner*—Mary Cheung
*Assistant Examiner*—Tien C Nguyen
(74) *Attorney, Agent, or Firm*—Buchanan Ingersoll & Rooney PC

(57) ABSTRACT

The risk measures of a portfolio are calculated with speed. Concerning a loss for each of the sectors to which the companies constituting the portfolio belong, the Laplace transform of a conditional probability distribution in which factors affecting management indexes are respective values is calculated in advance and stored in a storage unit as data. The stored data is retrieved as an approximate value and used when a numerical calculation of an integral is performed, to perform the integration. Consequently, as it becomes possible to quickly calculate the Laplace transform of a density function and a distribution function, it is possible to calculate the density function and the distribution function by Laplace inversion and calculate the risk measures of the portfolio.

30 Claims, 43 Drawing Sheets

| LOSS RECOGNITION | ACCRUAL BASIS | MARKET PRICE BASIS |
|---|---|---|
| METHOD NAME | Default Mode(DM) | MARK-TO-MARKET Mode(MtM) |
| PURPOSE OF TRANSACTION | ■OWN UNTIL MATURITY | ■SHORT TERM TRADE (SECONDARY MARKET) |
| TRANSACTION EXAMPLE | ■LOAN, GUARANTEE, ETC. | ■CREDIT, DERIVATIVE, ETC. |
| RECOGNITION OF EXPOSURE | ■BOOK VALUE BASIS | ■MARKET PRICE BASIS |
| LOSS OCCURRENCE EVENT | ■DEFAULT | ■DEFAULT<br>■FALL IN CREDIT RATING |
| MAIN NECESSARY PARAMETERS | ■TRANSACTION BALANCE (EAD)<br>■LGD (LOSS GIVEN DEFAULT)<br>■PD (DEFAULT PROBABILITY)<br>■CORRELATION CONCERNING CHANGE IN CREDIT WORTHINESS | ■CASH FLOW INFORMATION OF TRANSACTION<br>■MARKET INFORMATION (YIELD CURVE BY CREDIT RATING)<br>■LGD (LOSS GIVEN DEFAULT)<br>■PD (DEFAULT PROBABILITY)<br>■CREDIT RATING TRANSITION PROBABILITY<br>■CORRELATION CONCERNING CHANGE IN CREDIT WORTHINESS |
| MODEL EXAMPLE | ■CSFP「Credit Risk+」 | ■JPMorgan「CreditMetrics」 |

OTHER PUBLICATIONS

Emmer et al., "Calculating Credit Risk Capital Charges with the One-Factor Model" 2003, pp. 1-15.

Glasserman, "Measuring Marginal Risk Contributions in Credit Portfolios" Journal of Computational Finance, Jun. 2005, vol. 9, No. 2, pp. 1-41.

Glasserman et al., "Computing the Credit Loss Distribution in the Gaussian Copula Model: a Comparison of Methods" Journal of Credit Risk, Jul. 2006, vol. 2, No. 4, pp. 33-66.

Gordy et al., "A Risk-Factor Model Foundation for Ratings-Based Bank Capital Rules" Board of Governors of the Federal Reserves System, 2001, pp. 1-33.

Hollenbeck, "A Matlab Function for Numerical Inversion of Laplace Transform" Department of Hydrodynamics and Water Resources Technical University of Denmark, Nov. 22, 1996, MATLAB 5 Version 27 Jun. 1997 Updated Oct. 1, 1998.

Higo., "An Efficient Monte Carlo Method for a Large and Nongranular credit Portolio" Bank of Japan Working Papers Serves 2006, No. 06-E-19, pp. 1-33.

Huang et al., "Computation of VaR and VaR Contribution in the Vasicek Portfolio Credit Loss Model: A Comparative Study" Journal of Credit Risk, 2007, vol. 3, No. 3, pp. 75-96.

Martin et al., "An Indirect View From the Saddle" Cutting Edge. Credit Portfolio Risk, 2006, pp. 94-99.

Martin et al., Taking to the Saddle, Credit Portfolio Modelling, Risk, 2001, pp. 91-98 (www.RISK.NET).

Pykhtin, "Multi-Factor Adjustment" Portfolio Credit Risk, Cutting Edge, 2004, www.risk.net, pp. 85-90.

Tasche, "Measuring Sectoral Diversification in an Asymptotic Multi-Factor Framework" 2006, pp. 1-23.

Tasche, "Risk Contributions and Performance Measurement" 2000, pp. 1-26.

Von Heinz Rutishauser, "Der Quotienten-Differenzen-Algorithmus" Eingegangen, 1953, pp. 233-251.

Von Heinz Rutishauser, "Der Quotienten-Differenzen-Algorithmus" Eingegangen, 1953, pp. 233-251(with Partial English-language translation).

* cited by examiner

FIG.3

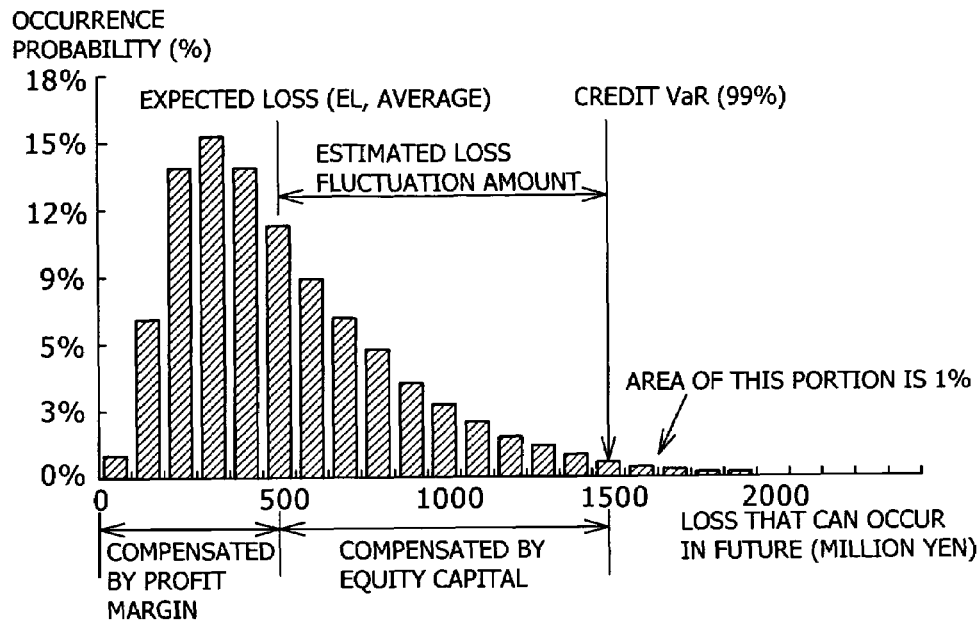

FIG.4

| LOSS RECOGNITION | ACCRUAL BASIS | MARKET PRICE BASIS |
|---|---|---|
| METHOD NAME | Default Mode(DM) | MARK-TO-MARKET Mode(MtM) |
| PURPOSE OF TRANSACTION | ■OWN UNTIL MATURITY | ■SHORT TERM TRADE (SECONDARY MARKET) |
| TRANSACTION EXAMPLE | ■LOAN, GUARANTEE, ETC. | ■CREDIT, DERIVATIVE, ETC. |
| RECOGNITION OF EXPOSURE | ■BOOK VALUE BASIS | ■MARKET PRICE BASIS |
| LOSS OCCURRENCE EVENT | ■DEFAULT | ■DEFAULT<br>■FALL IN CREDIT RATING |
| MAIN NECESSARY PARAMETERS | ■TRANSACTION BALANCE (EAD)<br><br>■LGD (LOSS GIVEN DEFAULT)<br>■PD (DEFAULT PROBABILITY)<br><br>■CORRELATION CONCERNING CHANGE IN CREDIT WORTHINESS | ■CASH FLOW INFORMATION OF TRANSACTION<br>■MARKET INFORMATION (YIELD CURVE BY CREDIT RATING)<br>■LGD (LOSS GIVEN DEFAULT)<br>■PD (DEFAULT PROBABILITY)<br>■CREDIT RATING TRANSITION PROBABILITY<br>■CORRELATION CONCERNING CHANGE IN CREDIT WORTHINESS |
| MODEL EXAMPLE | ■CSFP「Credit Risk+」 | ■JPMorgan「CreditMetrics」 |

FIG.13

■SECTOR INFORMATION (SENSITIVITY COEFFICIENT WITH RESPECT TO COMMON RISK FACTORS)

| SECTOR NUMBER | SECTOR ID | COMMON RISK FACTOR ID | | | | | | | | |
|---|---|---|---|---|---|---|---|---|---|---|
| | | X1 | X2 | X3 | X4 | X5 | X6 | X7 | X8 | |
| 1 | S1 | 0.316 | 0.050 | -0.171 | 0.071 | 0.052 | -0.019 | -0.086 | 0.036 | ... |
| 2 | S2 | 0.530 | -0.489 | -0.285 | 0.052 | -0.165 | -0.103 | -0.078 | 0.091 | ... |
| 3 | S3 | 0.224 | -0.216 | -0.262 | -0.274 | 0.129 | -0.114 | -0.083 | -0.044 | ... |
| 4 | S4 | 0.415 | -0.010 | -0.128 | 0.188 | 0.162 | -0.097 | 0.132 | -0.031 | ... |
| 5 | S5 | 0.304 | 0.438 | -0.355 | 0.048 | -0.058 | -0.012 | 0.065 | -0.089 | ... |
| 6 | S6 | 0.067 | 0.495 | 0.305 | 0.230 | -0.173 | -0.032 | -0.125 | -0.008 | ... |
| 7 | S7 | 0.435 | -0.181 | 0.126 | -0.005 | -0.127 | -0.177 | 0.121 | -0.048 | ... |
| 8 | S8 | 0.248 | 0.308 | -0.139 | 0.172 | -0.172 | 0.026 | -0.123 | -0.035 | ... |
| 9 | S9 | 0.485 | 0.236 | -0.160 | 0.218 | 0.100 | -0.131 | -0.131 | -0.037 | ... |
| 10 | S10 | 0.196 | -0.247 | -0.293 | 0.195 | -0.085 | 0.120 | -0.028 | -0.059 | ... |
| ... | | | | | | | | | | |

FIG.14

■EXAMPLE OF OBRIGOR INFORMATION

| OBRIGOR NUMBER | OBRIGOR ID | CREDIT RATING ID | SECTOR ID | EXPOSURE |
|---|---|---|---|---|
| 1 | C0001 | A | S4 | 5,000,000,000 |
| 2 | C0002 | D | S7 | 200,000,000 |
| 3 | P0001 | E | S16 | 1,000,000,000 |
| ... | | | | |

FIG.15(1)

■AVERAGE DEFAULT PROBABILITY INFORMATION BY CREDIT RATING
(USED IN THE CASE OF DEFAULT MODE)

| CREDIT RATING NUMBER | CREDIT RATING ID | AVERAGE DEFAULT PROBABILITY |
|---|---|---|
| 1 | A | 0.03% |
| 2 | B | 0.10% |
| 3 | C | 0.30% |
| 4 | D | 0.65% |
| 5 | E | 1.00% |
| 6 | F | 5.00% |
| 7 | G | 15.00% |

FIG.15(2)

■CREDIT RATING TRANSITION INFORMATION (USED IN THE CASE OF MtM MODE)

| CREDIT RATING ID AT RISK MEASUREMENT POINT | CREDIT RATING ID AT END POINT OF RISK MEASUREMENT | | | | | | | AVERAGE DEFAULT PROBABILITY |
|---|---|---|---|---|---|---|---|---|
| | A | B | C | D | E | F | G | |
| A | 98.00% | 1.80% | 0.17% | 0.00% | 0.00% | 0.00% | 0.00% | 0.03% |
| B | 1.00% | 96.00% | 1.80% | 0.60% | 0.30% | 0.20% | 0.00% | 0.10% |
| C | 0.40% | 1.50% | 94.00% | 2.10% | 0.80% | 0.50% | 0.40% | 0.30% |
| D | 0.15% | 0.60% | 2.70% | 91.00% | 2.80% | 1.20% | 0.90% | 0.65% |
| E | 0.05% | 0.45% | 2.00% | 4.10% | 87.00% | 3.40% | 2.00% | 1.00% |
| F | 0.00% | 0.10% | 0.80% | 2.70% | 7.10% | 78.00% | 6.30% | 5.00% |
| G | 0.00% | 0.00% | 0.20% | 0.60% | 4.70% | 9.50% | 70.00% | 15.00% |

FIG.16

■ INTEGRATION EVALUATION POINT INFORMATION

| INTEGRATION EVALUATION POINT NUMBER | WEIGHT | COMMON RISK FACTOR ID | | | | | | | | |
|---|---|---|---|---|---|---|---|---|---|---|
| | | X1 | X2 | X3 | X4 | X5 | X6 | X7 | X8 | ... |
| 1 | 0.00153 | -2.4903 | 0.0021 | 0.8821 | -0.0531 | 0.3904 | -2.4237 | -1.0804 | 0.7560 | ... |
| 2 | 0.00026 | -0.7147 | -1.0009 | -2.1738 | -0.7442 | 0.4865 | -1.6927 | -0.5422 | 0.6251 | ... |
| 3 | 0.00083 | 1.3777 | 0.6406 | -0.6465 | -0.8630 | -1.4152 | 0.2125 | 0.5132 | -1.0481 | ... |
| 4 | 0.00072 | -0.4321 | 0.2222 | -0.6117 | -0.7696 | 1.1855 | -1.1327 | -0.0599 | -0.8767 | ... |
| 5 | 0.00123 | -0.1121 | -0.6878 | 0.2348 | -0.3889 | -0.3466 | 0.5747 | 0.1734 | 0.3745 | ... |
| 6 | 0.00026 | 0.7808 | 0.4266 | 0.9004 | -1.2323 | 1.5740 | 0.1528 | -0.2075 | -0.2161 | ... |
| 7 | 0.00049 | -0.6547 | -2.6889 | 0.9792 | -0.3413 | 0.2259 | 0.0674 | -0.0685 | -1.9218 | ... |
| 8 | 0.00105 | 1.2213 | 0.3711 | -1.5148 | -1.4939 | -0.5532 | 0.5714 | 0.9861 | 0.8929 | ... |
| 9 | 0.00003 | 0.1502 | 0.5082 | 0.9039 | -0.0771 | 0.3614 | 0.5435 | -0.7081 | -0.6118 | ... |
| 10 | 0.00179 | -1.3557 | 1.4257 | -0.0955 | 0.7459 | -0.9663 | 2.1272 | -0.2842 | -0.5014 | ... |
| ... | ... | ... | ... | ... | ... | ... | ... | ... | ... | ... |

FIG.17

■INFORMATION ON TRANSITION TO RESPECTIVE DEFAULT STATES
(USED IN THE CASE OF MtM MODE)

| CREDIT RATING NUMBER | CREDIT RATING ID | CUMULATIVE DEFAULT PROBABILITY | | | |
|---|---|---|---|---|---|
| | | DEFAULT 1 | DEFAULT 2 | ... | DEFAULT N |
| 1 | A | 0.00% | 0.01% | ... | 0.03% |
| 2 | B | 0.01% | 0.02% | ... | 0.10% |
| 3 | C | 0.03% | 0.05% | ... | 0.30% |
| 4 | D | 0.06% | 0.12% | ... | 0.65% |
| 5 | E | 0.08% | 0.17% | ... | 1.00% |
| 6 | F | 0.50% | 1.00% | ... | 5.00% |
| 7 | G | 1.25% | 2.50% | ... | 15.00% |

FIG.18

■EXAMPLE OF OBLIGOR INFORMATION

| OBLIGOR NUMBER | OBLIGOR ID | CREDIT RATING ID | SECTOR ID | PROFIT AND LOSS AMOUNT IN EACH OF STATES AFTER ONE YEAR | | | | | |
|---|---|---|---|---|---|---|---|---|---|
| | | | | A | B | C | ... | DEFAULT N | DEFAULT 1 |
| 1 | C0001 | A | S4 | -100,000 | 2,000,000 | 5,000,000 | ... | 4,800,000,000 | 4,800,000,000 |
| 2 | C0002 | D | S7 | -800,000 | -800,000 | -800,000 | ... | -800,000 | 120,000,000 |
| 3 | P0001 | E | S16 | -320,000,000 | -170,000,000 | -80,000,000 | ... | 600,000,000 | 600,000,000 |
| ... | | | | | | | | | |

FIG.20B(1)

INDEX LIST

| VARIABLE NAME | NAME OF INDEX | TYPE | MINIMUM | MAXIMUM | REMARKS |
|---|---|---|---|---|---|
| i | OBRIGOR NUMBER | long | 1 | N | INDEX FOR SPECIFYING OBRIGOR |
| k | AUX VARIABLE NUMBER | long | 0 | $N_k-1$ | INDEX FOR SPECIFYING AUX VARIABLE USED FOR LAPLACE INVERSION |
| l | INTEGRATION POINT NUMBER | long | 1 | $N_l$ | INDEX FOR SPECIFYING INTEGRATION POINT |
| m | EVALUATION POINT NUMBER | long | 1 | $N_g$ | INDEX FOR SPECIFYING DISCRETIZED VALUATION POINT |
| r | CREDIT RATING NUMBER | long | 1 | $N_r$ | INDEX FOR SPECIFYING CREDIT RATING |
| s | SECTOR NUMBER | long | 1 | $N_s$ | INDEX FOR SPECIFYING SECTOR |
| n | FACTOR NUMBER | long | 1 | $N_f$ | INDEX FOR SPECIFYING FACTOR |

FIG.20B(2)

INPUT PARAMETER LIST (VARIABLES STORED IN INPUT-DATA STORAGE UNIT 1314)

| VARIABLE NAME | TYPE | CONTENT | CORRESPONDENCE TO FORMULA | REMARKS |
|---|---|---|---|---|
| $\gamma$ | double | PARAMETER USED FOR CALCULATION OF LAPLACE INVERSION | CORRESPONDING TO $\gamma$ OF FORMULA 42, FORMULA 56, ETC. | CALCULATED FROM N AND tmax ACCORDING TO FORMULA 47 |
| h | double | PARAMETER USED FOR CALCULATION OF LAPLACE INVERSION | CORRESPONDING TO h OF FORMULA 42, FORMULA 56, ETC. | CALCULATED FROM tmax ACCORDING TO FORMULA 47 |
| Nk | long | NUMBER OF AUX VARIABLES USED FOR LAPLACE INVERSION | | |
| Max_g | double | MAXIMUM OF DISCRETIZED VALUATION POINTS | CORRESPONDING TO Max_g OF FORMULA 40 | |
| Min_g | double | MINIMUM OF DISCRETIZED VALUATION POINTS | CORRESPONDING TO Min_g OF FORMULA 40 | |
| Ng | long | NUMBER OF DISCRETIZED VALUATION POINTS | CORRESPONDING TO Ng OF FORMULA 40 | |
| p | double | CONFIDENCE COEFFICIENT IN CALCULATING VaR, CVaR, ETC. | | |
| tmax | double | MAXIMUM OF LOSSES TO BE MEASURED | CORRESPONDING TO tmax OF FORMULA 47 | |
| $N_T$ | long | NUMBER OF LOSSES FOR WHICH VALUE OF DISTRIBUTION FUNCTION IS CALCULATED IN CALCULATION OF EL, CVaR, ETC. | CORRESPONDING TO $N_T$ OF FORMULA 107 AND FORMULA 108 | |
| Nt | long | NUMBER OF INTEGRATION POINTS IN PERFORMING MONTE CARLO INTEGRATION | | USED IN EXAMPLE 11 |
| Rs | unsigned long | RANDOM NUMBER SEED FOR INITIALIZING RANDOM NUMBER USED IN MONTE CARLO INTEGRATION | | USED IN EXAMPLE 11 |

FIG.20C
INPUT DATA LIST (VARIABLES STORED IN INPUT-DATA STORAGE UNIT 1316)

| INPUT DB | VARIABLE NAME | TYPE | SUBSCRIPT | CONTENT | RELATIONSHIPS WITH INPUT DATA EXAMPLE |
|---|---|---|---|---|---|
| SECTOR INFORMATION | $\alpha$ | double | [SECTOR NUMBER, FACTOR NUMBER] | ARRAY IN WHICH SENSITIVITY COEFFICIENT WITH RESPECT TO COMMON RISK FACTORS DESIGNATED BY [FACTOR NUMBER] OF SECTOR DESIGNATED BY [SECTOR NUMBER] IS STORED | CORRESPONDING TO DATA IN THIRD AND SUBSEQUENT COLUMN IN FIG. 13 |
| | Ns | long | – | VARIABLE IN WHICH NUMBER OF SECTORS IS STORED | CORRESPONDING TO NUMBER OF ROWS OF TABLE IN FIG. 13 |
| | Nf | long | – | VARIABLE IN WHICH NUMBER OF COMMON RISK FACTORS IS STORED | CORRESPONDING TO NUMBER OF COLUMNS OF PART OF "COMMON RISK FACTOR ID" IN FIG. 13 |
| CREDIT RATING INFORMATION | pd | double | [CREDIT RATING NUMBER] | ARRAY IN WHICH DEFAULT PROBABILITY BY CREDIT RATING CORRESPONDING TO CREDIT RATING DESIGNATED BY [CREDIT RATING NUMBER] IS STORED | CORRESPONDING TO DATA OF "AVERAGE DEFAULT PROBABILITY" OF TABLE IN (1) IN FIG. 15 |
| | Nr | long | | VARIABLE IN WHICH NUMBER OF CREDIT RATING IS STORED | CORRESPONDING TO NUMBER OF ROWS OF TABLE IN (1) IN FIG. 15 |
| OBRIGOR INFORMATION | E | long | [OBRIGOR NUMBER] | ARRAY IN WHICH EXPOSURE OF OBRIGOR DESIGNATED BY [DEBTOR NUMBER] IS STORE | CORRESPONDING TO DATA OF "LOSS AT DEFAULT IN FIG. 14" |
| | R | long | [OBRIGOR NUMBER] | ARRAY IN WHICH CREDIT NUMBER OF OBRIGOR DESIGNATED BY [OBRIGOR NUMBER] IS STORED | CORRESPONDING TO DATA OBTAINED BY CONVERTING "CREDIT RATING ID" INTO CREDIT RATING NUMBER IN FIG. 14 |
| | S | long | [OBRIGOR NUMBER] | ARRAY IN WHICH SECTOR NUMBER OF OBRIGOR DESIGNATED BY [OBRIGOR NUMBER] IS STORED | CORRESPONDING TO DATA OBTAINED BY CONVERTING "SECTOR ID" INTO SECTOR NUMBER IN FIG. 14 |
| | N | long | – | VARIABLE IN WHICH NUMBER OF OBRIGORS IS STORED | CORRESPONDING TO NUMBER OF ROWS OF TABLE IN FIG. 14 |
| INTEGRATION POINT INFORMATION | w | double | [INTEGRATION POINT NUMBER] | ARRAY IN WHICH WEIGHT INCIDENTAL TO INTEGRATION POINT DESIGNATED BY [INTEGRATION POINT NUMBER] IS STORED | CORRESPONDING TO DATA OF "WEIGHT" IN FIG. 16 |
| | x | double | [FACTOR NUMBER, INTEGRATION POINT NUMBER] | ARRAY IN WHICH VALUE OF COMMON RISK VARIABLES DESIGNATED BY [FACTOR NUMBER] OF INTEGRATION POINT DESIGNATED BY [INTEGRATION POINT NUMBER] IS STORED | CORRESPONDING TO DATA IN THIRD AND SUBSEQUENT COLUMNS IN FIG. 16 |
| | NI | long | – | VARIABLE IN WHICH NUMBER OF INTEGRATION POINTS IS STORED | CORRESPONDING TO NUMBER OF ROWS OF TABLE IN FIG. 16 |

FIG. 23

CalcSectorMGF/VARIABLE SPECIFICATIONS

■INPUT VARIABLES

| VARIABLE NAME | TYPE | SUBSCRIPT | CONTENT | REMARKS |
|---|---|---|---|---|
| E | double | [OBRIGOR NUMBER] | EXPOSURE OF OBRIGOR DESIGNATED BY [OBRIGOR NUMBER] | |
| R | long | [OBRIGOR NUMBER] | CREDIT RATING NUMBER OF OBRIGOR DESIGNATED BY [OBRIGOR NUMBER] | |
| S | long | [OBRIGOR NUMBER] | SECTOR NUMBER OF OBRIGOR DESIGNATED BY [OBRIGOR NUMBER] | |
| CPD | double | [EVALUATION POINT NUMBER, CREDIT RATING NUMBER, SECTOR NUMBER] | CONDITIONAL DEFAULT PROBABILITY OF OBRIGOR HAVING OBRIGOR ATTRIBUTE DESIGNATED BY [SECTOR NUMBER] AND [CREDIT RATING NUMBER] UNDER CONDITION "REALIZATION OF SECTOR FACTOR DESIGNATED BY [SECTOR NUMBER] IS EQUAL TO VALUE OF DISRETIZED VALUATION POINT DESIGNATED BY [EVALUATION POINT NUMBER]" | CORRESPONDING TO PROBABILITY OF LOSS OCCURRENCE DATA |
| $\gamma$ | double | - | PARAMETER USED FOR CALCULATION OF LAPLACE INVERSION | CORRESPONDING TO $\gamma$ OF FORMULA 47 |
| h | double | - | PARAMETER USED FOR CALCULATION OF LAPLACE INVERSION | CORRESPONDING TO h OF FORMULA 47 |
| N | long | - | NUMBER OF OBRIGORS OF MEASUREMENT OBJECT PORTFOLIO | |
| Nk | long | - | NUMBER OF AUX VARIABLES USED FOR LAPLACE INVERSION | |
| Ng | long | - | NUMBER OF DISRETIZED VALUATION POINTS | |

■OUTPUT VARIABLES

| VARIABLE NAME | TYPE | SUBSCRIPT | CONTENT | REMARKS |
|---|---|---|---|---|
| SMGF | complex | EVALUATION POINT NUMBER, AUX VARIABLE NUMBER, SECTOR NUMBER | VALUE OF CONDITIONAL MOMENT GENERATING FUNCTION BY SECTOR CORRESPONDING TO [EVALUATION POINT NUMBER] AND [AUX VARIABLE NUMBER] OF SECTOR DESIGNATED BY [SECTOR NUMBER] | CORRESPONDING TO SECTOR FUNCTION DATA |

■LOCAL VARIABLES

| VARIABLE NAME | TYPE | SUBSCRIPT | CONTENT | REMARKS |
|---|---|---|---|---|
| i | long | - | INDEX REPRESENTING OBRIGOR NUMBER | |
| k | long | - | INDEX REPRESENTING AUX VARIABLE NUMBER | |
| m | long | - | INDEX REPRESENTING EVALUATION POINT NUMBER | |
| Ex | complex | AUX VARIABLE NUMBER | USED FOR TEMPORARILY STORING EXPONENTIAL FUNCTION OF EXPOSURE | |
| PD | double | - | USED FOR TEMPORARILY STORING CONDITIONAL DEFAULT PROBABILITY | SINCE IT IS LIKELY THAT EXECUTION SPEED FALLS IF MEMORY ACCESS TO ARRAY IS PERFORMED IN THE LOOP, CONDITIONAL DEFAULT PROBABILITY IS STORED OUTSIDE THE LOOP |
| PMGF | complex | | USED FOR TEMPORARILY STORING MOMENT GENERATING FUNCTION OF INDIVIDUAL COMPANY | CORRESPONDING TO LOSS INDEX FUNCTION |

NB: IN FLOWCHART, INITIAL VALUES OF ALL OUTPUT VARIABLES AND LOCAL VARIABLES ARE SET TO 0

FIG.24A

CalcMGF/VARIABLE SPECIFICATIONS(1/2)

■INPUT VARIABLES

| VARIABLE NAME | TYPE | SUBSCRIPT | CONTENT | REMARKS |
|---|---|---|---|---|
| SMGF | complex | [EVALUATION POINT NUMBER, AUX VARIABLE NUMBER, SECTOR NUMBER] | VALUE OF CONDITIONAL MOMENT GENERATING FUNCTION BY SECTOR CORRESPONDING TO [EVALUATION POINT NUMBER] AND [AUX VARIABLE NUMBER] OF SECTOR DESIGNATED BY [SECTOR NUMBER] | CORRESPONDING TO SECTOR FUNCTION DATA |
| g | double | [EVALUATION POINT NUMBER] | VALUE OF DISCRETIZED VALUATION POINT CORRESPONDING TO [EVALUATION POINT NUMBER] | |
| x | double | [FACTOR NUMBER, INTEGRATION POINT NUMBER] | VALUES OF COMMON RISK VARIABLES DESIGNATED BY [FACTOR NUMBER] IN INTEGRATION POINT DESIGNATED BY [INTEGRATION POINT NUMBER] | |
| w | double | [INTEGRATION POINT NUMBER] | WEIGHT WITH RESPECT TO INTEGRATION POINT DESIGNATED BY [INTEGRATION POINT NUMBER] | |
| α | double | SECTOR NUMBER, FACTOR NUMBER] | SENSITIVITY COEFFICIENT WITH RESPECT TO COMMON RISK FACTORS DESIGNATED BY [FACTOR NUMBER] OF SECTOR DESIGNATED BY [SECTOR NUMBER] | |
| β | double | [SECTOR NUMBER] | NORM OF SENSITIVITY COEFFICIENT VECTOR OF SECTOR DESIGNATED BY [SECTOR NUMBER] | CORRESPONDING TO β[s] OF FORMULA 100 |
| γ | double | — | PARAMETER USED FOR CALCULATION OF LAPLACE INVERSION | CORRESPONDING TO γ OF FORMULA 47 |
| h | double | — | PARAMETER USED FOR CALCULATION OF LAPLACE INVERSION | CORRESPONDING TO h OF FORMULA 47 |
| Nk | long | — | NUMBER OF AUX VARIABLES USED FOR LAPLACE INVERSION | |
| Ni | long | — | NUMBER OF AUX VARIABLES USED FOR LAPLACE INVERSION | |
| Ns | long | — | NUMBER OF SECTORS | |
| Nf | long | — | NUMBER OF COMMON RISK FACTORS | USED IN CALCULATING VALUE OF SECTOR VARIABLE |
| Ng | long | — | NUMBER OF DISCRETIZED EVALUATION POINTS | USED FOR PROCESSING IN S2214 |

NB: IN FLOWCHART, INITIAL VALUES OF ALL OUTPUT VARIABLES AND LOCAL VARIABLES ARE SET TO 0

FIG.24B

CalcMGF/VARIABLE SPECIFICATIONS(2/2)

■OUTPUT VARIABLES

| VARIABLE NAME | TYPE | SUBSCRIPT | CONTENT | REMARKS |
|---|---|---|---|---|
| PF | complex | [AUX VARIABLE NUMBER] | VALUE OF PORTFOLIO FUNCTION WITH RESPECT TO AUX VARIABLE CORRESPONDING TO [AUX VARIABLE NUMBER] | |

■LOCAL VARIABLES

| VARIABLE NAME | TYPE | SUBSCRIPT | CONTENT | REMARKS |
|---|---|---|---|---|
| k | long | – | INDEX REPRESENTING AUX VARIABLE NUMBER | |
| l | long | – | INDEX REPRESENTING INTEGRATION POINT NUMBER | |
| s | long | – | INDEX REPRESENTING SECTOR NUMBER | |
| n | long | – | INDEX REPRESENTING FACTOR NUMBER | USED FOR PROCESSING IN S2212 |
| m | long | – | INDEX REPRESENTING EVALUATION POINT NUMBER | USED FOR PROCESSING IN S2214 |
| M | long | [SECTOR NUMBER] | ARRAY IN WHICH EVALUATION POINT NUMBER IS STORED. USED FOR STORING EVALUATION POINT NUMBER OF DISCRETIZED VALUATION POINT CLOSEST TO VALUE OF SECTOR VARIABLE CORRESPONDING TO INTEGRATION POINT | |
| y | double | – | STORE VALUE OF SECTOR VARIABLE | |
| CMGF | complex | – | USED FOR STORING VALUE OF CONDITIONAL MOMENT GENERATING FUNCTION ON INTEGRATION POINT | |
| MGF | complex | [AUX VARIABLE NUMBER] | VALUE OF MOMENT GENERATING FUNCTION WITH RESPECT TO AUX VARIABLE CORRESPONDING TO [AUX VARIABLE NUMBER] | |

NB: IN FLOWCHART, INITIAL VALUES OF ALL OUTPUT VARIABLES AND LOCAL VARIABLES ARE SET TO 0

FIG.26A

CalcMGF_MC/VARIABLE SPECIFICATIONS(1/2)

■INPUT VARIABLES

| VARIABLE NAME | TYPE | SUBSCRIPT | CONTENT | REMARKS |
|---|---|---|---|---|
| SMGF | complex | [EVALUATION POINT NUMBER, AUX VARIABLE NUMBER, SECTOR NUMBER] | VALUE OF CONDITIONAL MOMENT GENERATING FUNCTION BY SECTOR CORRESPONDING TO [EVALUATION POINT NUMBER] AND [AUX VARIABLE NUMBER] OF SECTOR DESIGNATED BY [SECTOR NUMBER] | CORRESPONDING TO SECTOR FUNCTION DATA |
| g | double | [EVALUATION POINT NUMBER] | VALUE OF DISCRETIZED VALUATION POINT CORRESPONDING TO [EVALUATION POINT NUMBER] | |
| α | double | [SECTOR NUMBER, FACTOR NUMBER] | SENSITIVITY COEFFICIENT WITH RESPECT TO COMMON RISK FACTORS DESIGNATED BY [FACTOR NUMBER] OF SECTOR DESIGNATED BY [SECTOR NUMBER] | |
| β | double | [SECTOR NUMBER] | NORM OF SENSITIVITY COEFFICIENT VECTOR OF SECTOR DESIGNATED BY [SECTOR NUMBER] | CORRESPONDING TO $\beta$ [s] OF FORMULA 100 |
| γ | double | – | PARAMETER USED FOR CALCULATION OF LAPLACE INVERSION | CORRESPONDING TO $\gamma$ OF FORMULA 47 |
| h | double | – | PARAMETER USED FOR CALCULATION OF LAPLACE INVERSION | CORRESPONDING TO h OF FORMULA 47 |
| Nk | long | – | NUMBER OF AUX VARIABLES USED FOR LAPLACE INVERSION | |
| Ni | long | – | NUMBER OF INTEGRATION POINTS | |
| Ns | long | – | NUMBER OF SECTORS | |
| Nf | long | – | NUMBER OF COMMON RISK FACTORS | USED IN CALCULATING VALUE OF SECTOR VARIABLE |
| Ng | long | – | NUMBER OF DISCRETIZED VALUATION POINTS | USED FOR PROCESSING IN S2526 |
| Rs | unsigned long | – | RANDOM NUMBER SEED | |

NB: IN FLOWCHART, INITIAL VALUES OF ALL OUTPUT VARIABLES AND LOCAL VARIABLES ARE SET TO 0

FIG.26B

CalcMGF_MC/VARIABLE SPECIFICATIONS(2/2)

■OUTPUT VARIABLES

| VARIABLE NAME | TYPE | SUBSCRIPT | CONTENT | REMARKS |
|---|---|---|---|---|
| PF | complex | [AUX VARIABLE NUMBER] | VALUE OF PORTFOLIO FUNCTION WITH RESPECT TO AUX VARIABLE CORRESPONDING TO [AUX VARIABLE NUMBER] | |

■LOCAL VARIABLES

| VARIABLE NAME | TYPE | SUBSCRIPT | CONTENT | REMARKS |
|---|---|---|---|---|
| k | long | – | INDEX REPRESENTING AUX VARIABLE NUMBER | |
| i | long | – | INDEX REPRESENTING INTEGRATION POINT NUMBER | |
| s | long | – | INDEX REPRESENTING SECTOR NUMBER | |
| n | long | – | INDEX REPRESENTING FACTOR NUMBER | |
| m | long | – | INDEX REPRESENTING EVALUATION POINT NUMBER | USED FOR PROCESSING IN S2526 |
| M | long | [SECTOR NUMBER] | ARRAY IN WHICH EVALUATION POINT NUMBER IS STORED. USED FOR STORING EVALUATION POINT NUMBER OF DISCRETIZED VALUATION POINT CLOSEST TO VALUE OF SECTOR VARIABLE CORRESPONDING TO INTEGRATION POINT | |
| y | double | – | STORE VALUE OF SECTOR VARIABLE | |
| R | double | – | STORE VALUE OF UNIFORM RANDOM NUMBER GENERATED BY MERSENNE TWISTER METHOD | |
| x | double | [FACTOR NUMBER] | VALUES OF COMMON RISK VARIABLES DESIGNATED BY [FACTOR NUMBER] CALCULATED FROM UNIFORM RANDOM NUMBER | |
| w | double | – | STORE WEIGHT OF INTEGRATION POINT | =1/Ni (MONTE CARLO INTEGRATION) |
| CMGF | complex | – | USED FOR STORING VALUE OF CONDITIONAL MOMENT GENERATING FUNCTION ON INTEGRATION POINT | |
| MGF | complex | [AUX VARIABLE NUMBER] | VALUE OF MOMENT GENERATING FUNCTION WITH RESPECT TO AUX VARIABLE CORRESPONDING TO [AUX VARIABLE NUMBER] | |

NB: IN FLOWCHART, INITIAL VALUES OF ALL OUTPUT VARIABLES AND LOCAL VARIABLES ARE SET TO 0

【CalcPF_RC,CalcPF_RC2】

FIG.30A

CalcMGF_RC/VARIABLE SPECIFICATIONS(1/2)

■INPUT VARIABLES

| VARIABLE NAME | TYPE | SUBSCRIPT | CONTENT | REMARKS |
|---|---|---|---|---|
| SMGF | complex | [EVALUATION POINT NUMBER, AUX VARIABLE NUMBER, SECTOR NUMBER] | VALUE OF CONDITIONAL MOMENT GENERATING FUNCTION BY SECTOR CORRESPONDING TO [EVALUATION POINT NUMBER] AND [AUX VARIABLE NUMBER] OF SECTOR DESIGNATED BY [SECTOR NUMBER] | CORRESPONDING TO SECTOR FUNCTION DATA |
| x | double | [FACTOR NUMBER, INTEGRATION POINT NUMBER] | VALUES OF COMMON RISK VARIABLES DESIGNATED BY [FACTOR NUMBER] AT INTEGRATION POINT DESIGNATED BY [INTEGRATION POINT NUMBER] | |
| w | double | [INTEGRATION POINT NUMBER] | WEIGHT WITH RESPECT TO INTEGRATION POINT DESIGNATED BY [INTEGRATION POINT NUMBER] | |
| α | double | [SECTOR NUMBER, FACTOR NUMBER] | SENSITIVITY COEFFICIENT WITH RESPECT TO COMMON RISK FACTOR DESIGNATED BY [FACTOR NUMBER] OF SECTOR DESIGNATED BY [SECTOR NUMBER] | |
| β | double | [SECTOR NUMBER] | NORM OF SENSITIVITY COEFFICIENT VECTOR OF SECTOR DESIGNATED BY [SECTOR NUMBER] | CORRESPONDING TO $\beta[s]$ OF FORMULA 100 |
| g | double | [EVALUATION POINT NUMBER] | VALUE OF DISCRETIZED EVALUATION POINT CORRESPONDING TO [EVALUATION POINT NUMBER] | |
| γ | double | – | PARAMETER USED FOR CALCULATION OF LAPLACE INVERSION | CORRESPONDING TO $\gamma$ OF FORMULA 47 |
| h | double | – | PARAMETER USED FOR CALCULATION OF LAPLACE INVERSION | CORRESPONDING TO h OF FORMULA 47 |
| Nk | long | – | NUMBER OF AUX VARIABLES USED FOR LAPLACE INVERSION | |
| Ni | long | – | NUMBER OF INTEGRATION POINTS | |
| Ns | long | – | NUMBER OF SECTORS | |
| Nf | long | – | NUMBER OF COMMON RISK FACTORS | USED IN CALCULATING VALUE OF SECTOR VARIABLE |
| Ng | long | – | NUMBER OF DISCRETIZED EVALUATION POINTS | USED FOR PROCESSING IN S2814 |

NB: IN FLOWCHART, INITIAL VALUES OF ALL OUTPUT VARIABLES AND LOCAL VARIABLES ARE SET TO 0

FIG.30B

CalcMGF_RC/VARIABLE SPECIFICATIONS(2/2)

■OUTPUT VARIABLES

| VARIABLE NAME | TYPE | SUBSCRIPT | CONTENT | REMARKS |
|---|---|---|---|---|
| PF | complex | [AUX VARIABLE NUMBER] | VALUE OF PORTFOLIO FUNCTION WITH RESPECT TO AUX VARIABLE CORRESPONDING TO [AUX VARIABLE NUMBER] | |
| P | complex | [SECTOR NUMBER, EVALUATION POINT NUMBER, AUX VARIABLE NUMBER] | WEIGHTED SUM OF CONDITIONAL MOMENT GENERATING FUNCTION FOR EACH CONDITION DESIGNATED BY [SECTOR NUMBER] AND [EVALUATION POINT NUMBER] | CORRESPONDING TO SUM DATA (LEFT SIDE OF FORMULA 88) |

■LOCAL VARIABLES

| VARIABLE NAME | TYPE | SUBSCRIPT | CONTENT | REMARKS |
|---|---|---|---|---|
| k | long | — | INDEX REPRESENTING AUX VARIABLE NUMBER | |
| l | long | — | INDEX REPRESENTING INTEGRATION POINT NUMBER | |
| s | long | — | INDEX REPRESENTING SECTOR NUMBER | |
| n | long | — | INDEX REPRESENTING FACTOR NUMBER | USED FOR PROCESSING IN S2812 |
| m | long | — | INDEX REPRESENTING EVALUATION POINT NUMBER | USED FOR PROCESSING IN S2814 |
| M | long | [SECTOR NUMBER] | ARRAY IN WHICH EVALUATION POINT NUMBER IS STORED. USED FOR STORING EVALUATION POINT NUMBER OF DISCRETIZED VALUATION POINT CLOSEST TO VALUE OF SECTOR VARIABLE CORRESPONDING TO INTEGRATION POINT | |
| y | double | — | STORE VALUE OF SECTOR VARIABLE | |
| CMGF | complex | — | USED FOR STORING VALUE OF CONDITIONAL MOMENT GENERATING FUNCTION ON INTEGRATION POINT | |
| MGF | complex | [AUX VARIABLE NUMBER] | VALUE OF MOMENT GENERATING FUNCTION WITH RESPECT TO AUX VARIABLE CORRESPONDING TO [AUX VARIABLE NUMBER] | |

NB: IN FLOWCHART, INITIAL VALUES OF ALL OUTPUT VARIABLES AND LOCAL VARIABLES ARE SET TO 0

FIG.31A

CalcEC/VARIABLE SPECIFICATIONS(1/2)

■INPUT VARIABLES

| VARIABLE NAME | TYPE | SUBSCRIPT | CONTENT | REMARKS |
|---|---|---|---|---|
| E | double | [OBRIGOR NUMBER] | EXPOSURE OF OBRIGOR DESIGNATED BY [OBRIGOR NUMBER] | |
| R | long | [OBRIGOR NUMBER] | CREDIT RATING NUMBER OF OBRIGOR DESIGNATED BY [OBRIGOR NUMBER] | |
| S | long | [OBRIGOR NUMBER] | SECTOR NUMBER OF OBRIGOR DESIGNATED BY [OBRIGOR NUMBER] | |
| VaR | double | - | VALUE OF VaR AS OBJECT OF RISK CONTRIBUTION CALCULATION | |
| CPD | double | [SECTOR NUMBER, EVALUATION POINT NUMBER, AUX VARIABLE NUMBER] | CONDITIONAL DEFAULT PROBABILITY OF OBRIGOR HAVING OBRIGORATTRIBUTE DESIGNATED BY [SECTOR NUMBER] AND [CREDIT RATING NUMBER] UNDER CONDITION "REALIZATION OF SECTOR FACTOR DESIGNATED BY [SECTOR NUMBER] IS EQUAL TO VALUE OF DISCRETIZED VALUATION POINT DESIGNATED BY[EVALUATION POINT NUMBER]" | CORRESPONDING TO PROBABILITY OF LOSS OCCURRENCE DATA |
| P | complex | [SECTOR NUMBER, EVALUATION POINT NUMBER, AUX VARIABLE NUMBER] | WEIGHTED SUM OF CONDITIONAL MOMENT GENERATING FUNCTION FOR EACH CONDITION DESIGNATED BY [SECTOR NUMBER] AND [EVALUATION POINT NUMBER] | CORRESPONDING TO SUM DATA (LEFT SIDE OF FORMULA 88) |
| γ | double | | PARAMETER USED FOR CALCULATION OF LAPLACE INVERSION | CORRESPONDING TO γ OF FORMULA 47 |
| h | double | | PARAMETER USED FOR CALCULATION OF LAPLACE INVERSION | CORRESPONDING TO h OF FORMULA 47 |
| N | long | - | NUMBER OF OBRIGORS OF MEASUREMENT OBJECT PORTFOLIO | |
| Nk | long | - | NUMBER OF AUX VARIABLES USED FOR LAPLACE INVERSION | |
| Ng | long | - | NUMBER OF DISCRETIZED VALUATION POINTS | |

NB: IN FLOWCHART, INITIAL VALUES OF ALL OUTPUT VARIABLES AND LOCAL VARIABLES ARE SET TO 0

FIG.31B

CalcEC/VARIABLE SPECIFICATIONS(2/2)

■OUTPUT VARIABLES

| VARIABLE NAME | TYPE | SUBSCRIPT | CONTENT | REMARKS |
|---|---|---|---|---|
| EC_VaR | double | [OBRIGOR NUMBER] | VaR BASE ECONOMIC CAPITAL OF OBRIGOR DESIGNATED BY [OBRIGOR NUMBER] | |

■LOCAL VARIABLES

| VARIABLE NAME | TYPE | SUBSCRIPT | CONTENT | REMARKS |
|---|---|---|---|---|
| i | long | – | INDEX REPRESENTING OBRIGOR NUMBER | |
| k | long | – | INDEX REPRESENTING AUX VARIABLE NUMBER | |
| m | long | – | INDEX REPRESENTING EVALUATION POINT NUMBER | |
| Ex | complex | [AUX VARIABLE NUMBER] | USED FOR TEMPORARILY STORING EXPONENTIAL FUNCTION OF EXPOSURE | |
| PD | double | – | USED FOR TEMPORARILY STORING CONDITIONAL DEFAULT PROBABILITY | SINCE IT IS LIKELY THAT EXECUTION SPEED FALLS IF MEMORY ACCESS TO ARRAY IS PERFORMED IN THE LOOP, CONDITIONAL DEFAULT PROBABILITY IS STORED OUTSIDE THE LOOP |
| R | complex | – | USED FOR STORING VALUE OF RISK CONTRIBUTION MEASURE FUNCTION | CORRESPONDING TO FORMULA 76 |
| RCMGF_VaR | complex | [AUX VARIABLE NUMBER] | USED FOR RISK CONTRIBUTION CALCULATION | CORRESPONDING TO FORMULA 89 |
| TotalEC | double | – | VARIABLE USED FOR NORMALIZATION OF ECVaR | |

NB: IN FLOWCHART, INITIAL VALUES OF ALL OUTPUT VARIABLES AND LOCAL VARIABLES ARE SET TO 0

FIG. 32A

CalcMGF_RC2/VARIABLE SPECIFICATIONS (1/2)

■INPUT VARIABLES

| VARIABLE NAME | TYPE | SUBSCRIPT | CONTENT | REMARKS |
|---|---|---|---|---|
| SMGF | complex | [EVALUATION POINT NUMBER, AUX VARIABLE NUMBER, SECTOR NUMBER] | VALUE OF CONDITIONAL MOMENT GENERATING FUNCTION BY SECTOR CORRESPONDING TO [EVALUATION POINT NUMBER] AND [AUX VARIABLE NUMBER] OF SECTOR DESIGNATED BY [SECTOR NUMBER] | CORRESPONDING TO SECTOR FUNCTION DATA |
| CPD | double | [EVALUATION POINT NUMBER, CREDIT RATING NUMBER, SECTOR NUMBER] | CONDITIONAL DEFAULT PROBABILITY OF OBRIGOR HAVING OBRIGOR ATTRIBUTE DESIGNATED BY [SECTOR NUMBER] AND [CREDIT RATING NUMBER] UNDER CONDITION "REALIZATION OF SECTOR FACTOR DESIGNATED BY [SECTOR NUMBER] IS EQUAL TO VALUE OF DISCRETIZED VALUATION POINT DESIGNATED BY [EVALUATION POINT NUMBER]" | CORRESPONDING TO PROBABILITY OF LOSS OCCURRENCE DATA |
| x | double | FACTOR NUMBER, INTEGRATION POINT NUMBER | VALUE OF COMMON RISK VARIABLE DESIGNATED BY [FACTOR NUMBER] AT INTEGRATION POINT DESIGNATED BY [INTEGRATION POINT NUMBER] | |
| w | double | [INTEGRATION POINT NUMBER] | WEIGHT WITH RESPECT TO INTEGRATION POINT DESIGNATED BY [INTEGRATION POINT NUMBER] | |
| α | double | [SECTOR NUMBER, FACTOR NUMBER] | SENSITIVITY COEFFICIENT WITH RESPECT TO COMMON RISK FACTOR DESIGNATED BY [FACTOR NUMBER] OF SECTOR DESIGNATED BY [SECTOR NUMBER] | |
| β | double | [SECTOR NUMBER] | NORM OF SENSITIVITY COEFFICIENT VECTOR OF SECTOR DESIGNATED BY [SECTOR NUMBER] | CORRESPONDING TO $\beta[s]$ OF FORMULA 100 |
| g | double | [EVALUATION POINT NUMBER] | VALUE OF DISCRETIZATION VALUATION POINT CORRESPONDING TO [EVALUATION POINT N[UMBER]] | |
| γ | double | - | PARAMETER USED FOR CALCULATION OF LAPLACE INVERSION | CORRESPONDING TO $\gamma$ OF FORMULA 47 |
| h | double | - | PARAMETER USED FOR CALCULATION OF LAPLACE INVERSION | CORRESPONDING TO h OF FORMULA 47 |
| Nk | long | - | NUMBER OF AUX VARIABLES USED FOR LAPLACE INVERSION | |
| Ni | long | - | NUMBER OF INTEGRATION POINTS | |
| Nr | long | - | NUMBER OF CREDIT RATINGS | |
| Ns | long | - | NUMBER OF SECTORS | |
| Nf | long | - | NUMBER OF COMMON RISK FACTORS | |
| Ng | long | - | NUMBER OF DISCRETIZED VALUATION POINTS | USED IN CALCULATING VALUE OF SECTOR VARIABLE USED FOR PROCESSING IN S2814 |

NB: IN FLOWCHART, INITIAL VALUES OF ALL OUTPUT VARIABLES AND LOCAL VARIABLES ARE SET TO 0
※: VARIABLES ADDED FOR CALCULATION OF CVaR BASE ECONOMIC CAPITAL

FIG. 32B

CalcMGF_RC2/VARIABLE SPECIFICATIONS(2/2)

■OUTPUT VARIABLES

| VARIABLE NAME | TYPE | SUBSCRIPT | CONTENT | REMARKS |
|---|---|---|---|---|
| PF | complex | [AUX VARIABLE NUMBER] | VALUE OF PORTFOLIO FUNCTION WITH RESPECT TO AUX VARIABLE CORRESPONDING TO [AUX VARIABLE NUMBER] | CORRESPONDING TO SUM DATA (LEFT SIDE OF FORMULA 88) |
| P | complex | [SECTOR NUMBER, EVALUATION POINT NUMBER, AUX VARIABLE NUMBER] | WEIGHTED SUM OF CONDITIONAL MOMENT GENERATING FUNCTION FOR EACH CONDITION DESIGNATED BY [SECTOR NUMBER] AND [EVALUATION POINT NUMBER] | |
| PD_avg ※ | double | [SECTOR NUMBER, CREDIT RATING NUMBER] | AVERAGE DEFAULT PROBABILITY (VALUE CALCULATED BY NUMERAL INTEGRATION) OF OBRIGOR HAVING ATTRIBUTE DESIGNATED BY [SECTOR NUMBER] AND [CREDIT RATING NUMBER] | USED IN CALCULATING CVaR BASE RISK CONTRIBUTION |

■LOCAL VARIABLES

| VARIABLE NAME | TYPE | SUBSCRIPT | CONTENT | REMARKS |
|---|---|---|---|---|
| k | long | – | INDEX REPRESENTING AUX VARIABLE NUMBER | |
| l | long | – | INDEX REPRESENTING INTEGRATION POINT NUMBER | |
| s | long | – | INDEX REPRESENTING SECTOR NUMBER | |
| n | long | – | INDEX REPRESENTING FACTOR NUMBER | USED FOR PROCESSING IN S2812 |
| m | long | – | INDEX REPRESENTING EVALUATION POINT NUMBER | USED FOR PROCESSING IN S2814 |
| r | long | – | INDEX REPRESENTING CREDIT RATING NUMBER | |
| M | long | [SECTOR NUMBER] | ARRAY IN WHICH EVALUATION POINT NUMBER IS STORED. USED FOR STORING EVALUATION POINT NUMBER OF DISCRETIZED VALUATION POINT CLOSEST TO VALUE OF SECTOR VARIABLE CORRESPONDING TO INTEGRATION POINT | |
| y | double | – | STORE VALUE OF SECTOR VARIABLE | |
| CMGF ※ | complex | – | USED FOR STORING VALUE OF CONDITIONAL MOMENT GENERATING FUNCTION ON INTEGRATION POINT | |
| w_sum ※ | double | [SECTOR NUMBER, EVALUATION POINT NUMBER] | ARRAY USED FOR CALCULATION OF PD_avg | CORRESPONDING TO LEFT SIDE OF SECOND EQUATION OF FORMULA 109 |
| MGF | complex | [AUX VARIABLE NUMBER] | VALUE OF MOMENT GENERATING FUNCTION WITH RESPECT TO AUX VARIABLE CORRESPONDING TO [AUX VARIABLE NUMBER] | |

NB: IN FLOWCHART, INITIAL VALUES OF ALL OUTPUT VARIABLES AND LOCAL VARIABLES ARE SET TO 0
※: VARIABLE ADDED FOR CALCULATION OF CVaR BASE ECONOMIC CAPITAL

FIG.33A

CalcEC2/VARIABLE SPECIFICATIONS(1/2)

■INPUT VARIABLES

| VARIABLE NAME | TYPE | SUBSCRIPT | CONTENT | REMARKS |
|---|---|---|---|---|
| E | double | [OBRIGOR NUMBER] | EXPOSURE OF OBRIGOR DESIGNATED BY [OBRIGOR NUMBER] | |
| R | long | [OBRIGOR NUMBER] | CREDIT RATING NUMBER OF OBRIGOR DESIGNATED BY [OBRIGOR NUMBER] | |
| S | long | [OBRIGOR NUMBER] | SECTOR NUMBER OF OBRIGOR DESIGNATED BY [OBRIGOR NUMBER] | |
| VaR ※ | double | — | VALUE OF VaR AS OBJECT OF RISK CONTRIBUTION CALCULATION | |
| CVaR ※ | double | — | VALUE OF CVaR AS OBJECT OF RISK CONTRIBUTION CALCULATION | |
| p | double | — | CONFIDENCE COEFFICIENT USED IN CALCULATING VaR AND CVaR | |
| CPD | double | [EVALUATION POINT NUMBER, CREDIT RATING NUMBER, SECTOR NUMBER] | CONDITIONAL DEFAULT PROBABILITY OF OBRIGOR HAVING OBRIGOR ATTRIBUTE DESIGNATED BY [SECTOR NUMBER] AND [CREDIT RATING NUMBER] UNDER CONDITION "REALIZATION OF SECTOR FACTOR DESIGNATED BY [SECTOR NUMBER] IS EQUAL TO VALUE OF DISCRETIZED VALUATION POINT DESIGNATED BY [EVALUATION POINT NUMBER]" | CORRESPONDING TO PROBABILITY OF LOSS OCCURRENCE DATA |
| P | complex | [SECTOR NUMBER, EVALUATION POINT NUMBER, AUX VARIABLE NUMBER] | WEIGHTED SUM OF CONDITIONAL MOMENT GENERATING FUNCTION FOR EACH CONDITION DESIGNATED BY [SECTOR NUMBER] AND [EVALUATION POINT NUMBER] | CORRESPONDING TO SUM DATA (LEFT SIDE OF FORMULA 88) |
| PD_avg ※ | double | [SECTOR NUMBER, CREDIT RATING NUMBER] | AVERAGE DEFAULT PROBABILITY (VALUE CALCULATED BY NUMERICAL INTEGRATION) OF OBRIGOR HAVING ATTRIBUTE DESIGNATED BY [SECTOR NUMBER] AND [CREDIT RATING NUMBER] | USED IN CALCULATING CVaR BASED RISK CONTRIBUTION |
| γ | double | — | PARAMETER USED FOR CALCULATION OF LAPLACE INVERSION | CORRESPONDING TO γ OF FORMULA 47 |
| h | double | — | PARAMETER USED FOR CALCULATION OF LAPLACE INVERSION | CORRESPONDING TO h OF FORMULA 47 |
| N | long | — | NUMBER OF OBRIGORS OF MEASUREMENT OBJECT PORTFOLIO | |
| Nk | long | — | NUMBER OF AUX VARIABLES USED FOR LAPLACE INVERSION | |
| Ng | long | — | NUMBER OF DISCRETIZED VALUATION POINTS | |

NB: IN FLOWCHART, INITIAL VALUES OF ALL OUTPUT VARIABLES AND LOCAL VARIABLES ARE SET TO 0
※: VARIABLE ADDED FOR CALCULATION OF CVaR BASE ECONOMIC CAPITAL

FIG.33B

CalcEC2/VARIABLE SPECIFICATIONS(2/2)

■OUTPUT VARIABLES

| VARIABLE NAME | TYPE | SUBSCRIPT | CONTENT | REMARKS |
|---|---|---|---|---|
| EC_VaR | double | [OBRIGOR NUMBER] | VaR BASE ECONOMIC CAPITAL OF OBRIGOR DESIGNATED BY [OBRIGOR NUMBER] | |
| ※ EC_CVaR | double | [OBRIGOR NUMBER] | CVaR BASE ECONOMIC CAPITAL OF OBRIGOR DESIGNATED BY [OBRIGOR NUMBER] | |

■LOCAL VARIABLES

| VARIABLE NAME | TYPE | SUBSCRIPT | CONTENT | REMARKS |
|---|---|---|---|---|
| i | long | - | INDEX REPRESENTING OBRIGOR NUMBER | |
| k | long | - | INDEX REPRESENTING AUX VARIABLE NUMBER | |
| m | long | - | INDEX REPRESENTING EVALUATION POINT NUMBER | |
| Ex | complex | [AUX VARIABLE NUMBER] | USED FOR TEMPORARILY STORING EXPONENTIAL FUNCTION OF EXPOSURE | |
| PD | double | - | USED FOR TEMPORARILY STORING CONDITIONAL DEFAULT PROBABILITY | SINCE IT IS LIKELY THAT EXECUTION SPEED FALLS IF MEMORY ACCESS TO ARRAY IS PERFORMED IN LOOP, CONDITIONAL DEFAULT PROBABILITY IS STORED OUTSIDE THE LOOP |
| R | complex | - | USED FOR STORING VALUE OF RISK CONTRIBUTION MEASURE FUNCTION | CORRESPONDING TO FORMULA 76 |
| RCMGF_VaR | complex | [AUX VARIABLE NUMBER] | USED FOR RISK CONTRIBUTION CALCULATION | CORRESPONDING TO FORMULA 89 |
| ※ RCMGF_CVaR | complex | [AUX VARIABLE NUMBER] | USED FOR CALCULATING CVaR BASE RISK CONTRIBUTION | CORRESPONDING TO FUNCTION IN PARENTHESES OF EQUATION AT THE BOTTOM OF FORMULA 94 |
| TotalEC | double | - | VARIABLE USED FOR NORMALIZATION OF EC_VaR | |
| ※ TotalEC_CVaR | double | - | VARIABLE USED FOR NORMALIZATION OF EC_CVaR | |

NB: IN FLOWCHART, INITIAL VALUES OF ALL OUTPUT VARIABLES AND LOCAL VARIABLES ARE SET TO 0
※: VARIABLES ADDED FOR CALCULATION OF CVaR BASE ECONOMIC CAPITAL

METHOD AND APPARATUS FOR CALCULATING CREDIT RISK OF PORTFOLIO

FIELD OF THE INVENTION

The present invention relates to a calculation method, a calculation program, and a calculation apparatus for credit risks for appropriately performing credit risk management. Specifically, the present invention relates to a method, a program, and an apparatus concerning a calculation for calculating risk measures for quantitatively grasping risks including defaults in management of a portfolio that is a set of a large number of credit transactions including loans.

BACKGROUND OF THE INVENTION

"Risk" for financial institutions generally means uncertainty of asset values in the future. It is very important for financial institutions to appropriately manage risks in various financial transactions. The largest risk for, in particular, banks among financial institutions is credit risk. Banks need to independently establish strong credit risk management systems in order to maintain their financial soundness. Supervisory authorities are required to verify the appropriateness of a bank's credit risk management systems on the basis of the second pillar of the "Basel II", which is an international agreement concerning bank supervisory methods. In view of such external and internal demands, it can be said that risk management departments should play an important role in bank management to appropriately manage credit risks. In order to appropriately carry out credit risk management, it is necessary to quantitatively grasp information such as "how much loss occurs at how high a probability over the next one year from a certain portfolio".

In order to quantitatively grasp such information, it is effective to perform risk management taking into account the probabilistic nature. This can be achieved by appropriately grasping, for each loss after a fixed period assumed based on the portfolio, the probability of occurrence of the loss. FIG. 3 is an explanatory diagram showing a loss expected in a fixed period in future as a graph. In FIG. 3, probabilities of occurrence of respective losses that are assumed after a fixed period are shown with respect to the respective losses. Information necessary for the credit risk management described above can be grasped by quantitatively predicting such a probability distribution. A mathematical procedure for reasonably predicting, from various data, a probability density function or a distribution function for giving such a probability distribution is called "measurement (or estimation) of risks" in the field of financial engineering.

When a probability density function, or cumulative distribution function, of losses is accurately predicted (i.e., a risk is "measured"), various risk measures are calculated as indicators for portfolio management practice. For example, "expected loss (EL)" is calculated, "credit VaR (Value at Risk)" is calculated, and "unexpected loss (UL)" is calculated. The expected loss (EL) represents a loss expected as an average after a certain period. The credit VaR is a single measure represented by an amount and represents a loss where the distribution function takes a fixed value. This fixed value is called a confidence coefficient or a confidence interval. For example, a value such as 99% or 99.97% is selected as the fixed value. Actually, the credit VaR can be considered as the upper limit of a loss that should be assumed in operation management after operation in that period. In the present specification, the credit VaR may be simply referred to as VaR. The unexpected loss (UL) is calculated by a difference between the credit VaR and the expected loss. When these specific measures are calculated, a risk management department can quantitatively grasp beforehand, for example, whether a provision equivalent to an expected loss can be prepared or whether equity capital can be appropriated for a loss equivalent to an unexpected loss exceeding the provision. A portfolio operation department can reasonably determine, by using credit risk measures of its own company as reference information, whether the portfolio should be held or the portfolio should be rebalanced.

In predicting the probability distribution of losses, i.e., measuring risks, mainly two ideas are known depending on the premise of how a loss is recognized, i.e., what kind of event is considered to be losses. One idea is to grasp only a fall in credit value caused by default. This is called the default mode. Another idea is to grasp a fall in credit value due to a fall in creditworthiness of a borrower company in addition to default. This is called the MtM (Mark to market) mode.

FIG. 4 is a table in which characteristics of the default mode and the MtM mode are summarized. The default mode is an idea on an accrual basis in which only the occurrence of default is regarded as a loss. The default mode is used by traders who mainly aim at maturity transactions in evaluating, for example, a portfolio mainly including lendings and guarantees. On the other hand, the MtM mode is an idea on a market price basis in which the losses caused by a fall in market prices of individual credits are taken into account. The MtM mode is used by traders who mainly aim at short-term trades in evaluating, for example, a portfolio mainly including bonds and derivatives.

A credit value is recognized on a book value basis in the default mode and is recognized on a market price basis in the MtM mode. The event in which loss is recognized as credit risk is default in the default mode and includes a fall in credit rating in the market in addition to default in the MtM mode.

Because of such a difference, selection of the main parameters used for the mathematical procedure used in measurement of risk is also different between the default mode and the MtM mode. In the default mode, the exposure of respective companies, the probability of default (PD), the correlation in changes of creditworthiness, and the like are taken into account as the parameters. The exposure of a company means a loss that occurs when the company is in default and can be calculated from a transaction balance and a loss-at-default rate. The correlation in changes of creditworthiness is a parameter representing association of credit capabilities of a plurality of companies and is calculated from, for example, time series data of stock prices and bond prices. On the other hand, in the MtM mode, information on the cash flow of a transaction, market information, a rating transition probability, the correlation in changes of creditworthiness, and the like are take into account. The cash flow information of a transaction means information on a cash flow generated by interest payment (coupon) of a bond or the like forming a portfolio. The market information means the information on the market that affects market prices such as yield curves given for each rating of bonds. Since such a market price in the market depends on credit rating, in risk management in the MtM mode, the rating transition probability, which is the probability of transition from a credit rating at the present point to respective credit ratings after a fixed period, is needed.

An example of the ideas of loss in which the default mode explained above is adopted as a model is Credit Risk+ (Credit Suisse Financial Products). An example in which the MtM mode is adopted as a model is Credit Metrics (JP Morgan).

Measurement of credit risk will now be explained. The measurement of credit risk is performed in two steps. First, there is a step of describing the probabilities of loss of respective companies in the measurement of credit risk. Then, there is a step of adding up losses of the respective companies contained in a portfolio. FIGS. 5 and 6 are diagrams showing concepts of loss of a company. FIG. 5 shows a concept in the case of the default mode and FIG. 6 shows a concept in the case of the MtM mode. As described above, in the default mode, it is assumed that loss occurs only when a default occurs. In the MtM mode, it is assumed that loss occurs because of a fall in credit rating after a risk measurement period in addition to default. In the MtM mode, loss is different depending on the credit rating after the risk measurement period. Profit could occur instead of loss.

FIG. 7 is an explanatory diagram showing a concept of adding up losses of companies. The concept only of the default mode is explained below. It is assumed that the probability of default for each loss is known for each of plural companies (company "i" and company "j"). In FIG. 7, the probability that the company "i" falls into default is 5% and the loss at that time is 100. The probability that the company "j" falls into default is also 5% and the loss at that time is 50. Even in such a case, in order to add up the losses of the plurality of companies and clarify the probability distribution of the losses, it is necessary to further take into account the correlation regarding default events between the companies. This is for the purpose of accurately reflecting the correlation of business performance or the like between the companies included in a real portfolio. As shown in FIG. 7, when there is no correlation between the companies (in the case of correlation=0), default events independently occur. Therefore, the probability that both the companies fall in default and the total loss reaches 150 is represented by the product of the default probability of the company "i" and the default probability of the company "j" as 0.25%. On the other hand, when there is a complete correlation between the companies (in the case of correlation=1), the default of one company leads to the default of the other company. Therefore, the probability that the total loss amount reaches 150 is the same as the default probability 5% of one company. Besides these cases, in FIG. 7, the cases in which there is a partial correlation between the companies, i.e., correlation coefficient is 0.2 and 0.5 is described. In this way, it is possible to calculate, concerning the plurality of companies, the probabilities of losses appropriately taking into account correlation.

FIG. 8 shows such probabilities for each loss for one company (the company "i") and in a case in which the correlation in the case of two companies (the company "i" and the company "j") is 0.2. The graphs shown in FIG. 8 indicate the probability density function by which the probabilities of respective losses are obtained. The probability density function corresponds to the probability density function in FIG. 3. In principle, it is evident that the probability distribution of losses of a portfolio with an arbitrary number of companies can be calculated. Once the probability density function is calculated, the distribution function shown in FIG. 9 can be calculated by integrating the probability density function. For example, the amount where the distribution function indicates the value 99% is the amount of credit VaR. Therefore, the measures such as EL, UL, and credit VaR can be calculated by calculating a probability distribution. Actually, unlike the example shown in FIG. 8, in actual operation of a portfolio and management of banks, it is not easy to take into account all of several tens of thousands to several million credits included in banks.

A credit risk measurement model will now be explained. As described above, in order to grasp the credit risk of a portfolio, it is necessary to appropriately take into account the correlation between companies (obligors) observed in default and the change of creditworthiness. Therefore, it is necessary to mathematically model the credit risk such that the correlation can be taken into account. In the mathematical modeling of the credit risk, it is necessary to model the credit risk such that the correlation observed in default and the change in creditworthiness of the companies can be appropriately reflected. As a credit risk measurement model employing such a correlation between companies, in recent years, a model called "firm-value model" is often used.

Among the firm-value model, there are one-factor firm-value model and multi-factor firm-value model. The one-factor firm-value model represents a firm value after a fixed period using the following equation:

[Formula 1]

$$Z_i = \alpha_i X + \sqrt{1-\alpha_i^2}\epsilon_i \quad (1)$$

where, i is the suffix indicating a company (an individual company) and $Z_i$ indicates the firm value of the company "i". X on the right side is called common risk factors and $\alpha_i$ is called sensitivity coefficient. The common risk factors X are factors common to companies for which a risk is measured by the credit risk measurement model. As an assumption of the firm-value model, the common risk factors X are random variables conforming to the standard normal distribution N(0, 1). $\epsilon_i$ is a factor representing fluctuation in each of the companies, which cannot be explained by the factor X common to the companies, and is called idiosyncratic factor. It is assumed that the idiosyncratic factor $\epsilon_i$ also conforms to the standard normal distribution N(0, 1). The coefficient in front of the idiosyncratic factor is set so that the firm value $Z_i$ conforms to the standard normal distribution N(0, 1).

As an important assumption in the firm-value model, X and $\epsilon_i$ are random variables independent from each other. That is,

[Formula 2]

$$X \sim N(0, 1), \epsilon_i \sim N(0, 1) \text{ Corr}(X, \epsilon_i) = 0, \text{ Corr}(\epsilon_i, \epsilon_j) = 0 \quad (i \neq j) \quad (2)$$

From these random variables, it is possible to calculate the correlation between the firm values as follows:

[Formula 3]

$$\text{Corr}(Z_i, Z_j) = \alpha_i \alpha_j \ (i \neq j) \quad (3)$$

This indicates that, in the one-factor firm-value model, the correlation between firm values of different companies is generated through the presence of the common risk factors X that affects the firm values of all the companies.

The multi-factor firm-value model is obtained by modeling a credit risk assuming that a plurality of common risk factors exists. The firm value $Z_i$ of the company "i" is represented as follows:

[Formula 4]

$$Z_i = \sum_{j=1}^{N_F} \alpha_{ij} X_j + \sqrt{1 - \sum_{j=1}^{N_F} \alpha_{ij}^2}\, \epsilon_i \quad (4)$$

where, $N_F$ is the number of the common risk factors. It is assumed that, in the firm-value model, different common risk factors $X_k$ and $X_l$ are independent from each other. That is, the following equation holds.

[Formula 5]

$$\text{Corr}(X_k, X_l) = \delta_{kl} \; \text{Corr}(X_k, \epsilon_i) = 0 \qquad (5)$$

$\delta_{kl}$ is Kronecker Delta. The $\alpha_i$ in Equation 1 and $\alpha_{ij}$ in Equation 4 are parameters that include the information concerning the correlation between the companies. There is known, for example, a method of estimating the parameters from a principal component analysis of the time series data of industry share price indexes.

In the one-factor or multi-factor firm-value model based on such assumptions, it is assumed that the company "i" falls into default when the firm value $Z_i$ falls below a fixed level. For example, in the case of the default mode, when the value of firm value causing default (default threshold) is represented as $C_i$, since the firm value $Z_i$ conforms to the standard normal distribution, the probability $PD_i$ that the company falls into default is as follows:

[Formula 6]

$$PD_i = Pr\{Z_i < C_i\} \qquad (6)$$
$$= \Phi(C_i)$$

The firm value $Z_i$ depends on the common risk factors, which are random variables. The probability $PD_i$ is an average over the common risk factors. Therefore, the probability $PD_i$ is referred to as average default probability of the company "i". Conversely, when the average default probability $PD_i$ is given, the default threshold $C_i$ is determined as follows:

[Formula 7]

$$C_i = \Phi^{-1}(PD_i) \qquad (7)$$

where, $\Phi^{-1}$ on the right side is the inverse function of the distribution function of the standard normal distribution. The default probability of the company "i" is estimated, for example, from the credit rating separately given for the company "i". It is possible to set the default threshold by giving the average default probability in this way. FIG. 10 is an explanatory diagram showing a concept of the default threshold given in this way. When the firm value Z conforming to the standard normal distribution falls below the default threshold $C_i$ after a fixed period (e.g., one year), a default occurs.

When the default threshold $C_i$ is determined from the average default probability, the conditional default probability can be calculated under the condition that the values of the common risk factors are determined. For example, the conditional default probability of the company "i" is given by the following equation:

[Formula 8]

$$PD_i(\vec{x}) = Pr\{Z_i < C_i \mid \vec{X} = \vec{x}\} = \Phi\left(\frac{C_i - \vec{\alpha} \cdot \vec{x}}{\sqrt{1 - |\vec{\alpha}|^2}}\right) \qquad (8)$$

where, x is a realization of the common risk factors X and represents the condition for giving the conditional default probability. In the one-factor firm-value model, x is a scalar amount. In the multi-factor firm-value model, x is a vector amount including respective common risk factors as elements. In the one-factor and multi-factor firm-value models, the idiosyncratic factors ($\epsilon$) are independent from each other for each of the companies. Therefore, under the condition that common risk factors take certain realizations x, defaults of the respective companies occur independently from each other. This characteristic is called conditional independence and is a characteristic extremely beneficial in numerical calculation.

In the MtM mode, the market price fluctuation due to credit rating transition is taken into account in recognizing profit and loss in addition to default in the default mode. Therefore, thresholds are set on the basis of rating transition probabilities to divide the firm value $Z_i$ into hierarchies. That is,

[Formula 9]

$$p_i(r \to s)$$
$$C_i(r \to s) \qquad (9)$$

The upper formula in formula (9) represents the transition probability of the company "i" from a credit rating r to a credit rating s. The lower formula represents the threshold for separating the credit rating s and a credit rating s−1. FIG. 11 is an explanatory diagram for explaining a method by which the credit rating and the default of a company are determined according to the firm value after one year. By considering the thresholds and the transition probabilities shown in the figure, the formulation applied to the default mode can be easily extended to the MtM mode.

A specific method for credit risk measurement after the modeling will now be explained. To calculate the probability distribution of losses, in principle, the losses and occurrence probabilities only have to be calculated for all scenarios considering credit states (scenarios) assumed for borrower companies after a fixed period. However, when it is attempted to execute this calculation, in reality, an extremely difficult calculation is necessary. For example, when the portfolio to be calculated is a combination of credits given to ten thousand borrowers, the number of combinations that should be considered as the states of the respective borrowers after one year is the 10000th power of 2 (250th power of one trillion). It can be said that it is practically impossible to calculate the losses and occurrence probabilities in all the scenarios. Therefore, to create a loss distribution, some approximation calculation is necessary. As a standard method for the approximation calculation, there is the Monte Carlo simulation method.

The Monte Carlo simulation method is a general method for performing an analysis of a probabilistic phenomenon by performing a numerical simulation using random numbers. To apply the Monte Carlo simulation method in the firm-value model, for example, steps 1 to 5 described below are sequentially executed. As step 1, first, the common risk factors are determined. This processing is a processing for generating random numbers conforming to the standard normal distribution and determining the values of the common risk factors. As step 2, the default probabilities of respective companies are calculated. This is a processing for calculating the conditional default probabilities of the respective companies under the value of the common risk factors determined in step 1. As step 3, default scenarios are created. This processing is a processing for creating the scenarios representing the credit states of the companies after one year. Specifically, the uniform random number in the interval [0, 1] is generated for each of the companies and, when the random number falls below the default probability calculated in step 2, it is determined that a default has occurred. As the following step 4, losses are calculated. The losses caused from the entire portfolio are calculated on the basis of the scenarios created in step 3. In the Monte Carlo simulation method, the step 5 of repeating steps 1 to 4 multiple times is executed to count, for each loss, the frequency of occurrence of events that cause the loss. Consequently, it is possible to create the loss distribution.

Besides the Monte Carlo simulation method, there is known a method of calculating the distribution of losses using the Laplace transform. A process for calculating a loss distribution using the Laplace transform will now be explained concerning an example of the default mode. The density function of a loss distribution is represented as $f_L(t)$. The Laplace transform of thereof is give by the following equation:

[Formula 10]

$$\hat{f}_L(\lambda) = \int_0^\infty e^{-\lambda t} f_L(t) dt = E[\exp(-\lambda \tilde{L})] \qquad (10)$$

In particular, the rightmost side of this equation is the function called moment generating function in the field of probability statistics. Respective expressions used here have the following meanings:

[Formula 11]

$\tilde{L}$: random variable representing loss of the entire portfolio $\left( \tilde{L} = \sum_{i=1}^{N} E_i \tilde{D}_i \right)$ (11)

$E_i$: loss of the firm "$i$" at default (Exposure)

$N$: the number of firms in the portfolio $\tilde{D}_i$: definition function for the firm "$i$" $\left( \begin{array}{l} \text{Default} \Rightarrow 1, \\ \text{Non-Default} \Rightarrow 0 \end{array} \right)$ From this result, it is possible to calculate the distribution of losses by subjecting the moment generating function to Laplace inversion. When there is no correlation between the companies, the moment generating function is represented as follows:

[Formula 12]

$$E[\exp(-\lambda \tilde{L})] = \prod_{i=1}^{N} (1 - p_i + p_i \exp(-\lambda E_i)) \qquad (12)$$

where, $p_i$ is the default probability of the company "$i$", which is the same as $PD_i$ in formula (6).

On the other hand, when the correlation among the companies is taken into account by the firm-value model, the moment generating function is calculated as follows from the characteristic of conditional independence:

[Formula 13]

$$\hat{f}_L(\lambda) = \int_{\vec{x} \in R^{N_F}} \prod_{i=1}^{N} \{1 - p_i(\vec{x}) + p_i(\vec{x}) \exp(-\lambda E_i)\} \phi_{N_F}(\vec{x}) d\vec{x} \qquad (13)$$

where,

[Formula 14]

$p_i(\vec{x})$: Conditional default probability of the firm "$i$" under the condition that "a common risk factor is $\vec{X} = \vec{x}$" (same as $PD_i(\vec{x})$ in formula (8))

$\phi_{N_F}(\vec{x})$: Density function of $N_F$-dimensional standard normal distribution (14)

Such calculation of a loss distribution using the Laplace transform method can be performed in two steps. First, as step 1, the moment generating function is calculated. As step 2, the Laplace inversion of the moment generating function is executed. The Laplace transform method has been explained for the default mode as an example. However, risk measurement in the MtM mode can also be executed by the Laplace transform method by changing the moment generating function. Even when a model other than the firm-value model is used, the probability density function and the distribution function that give the probability distribution of losses can be calculated by the Laplace transform method if the moment generating function can be calculated. Therefore, it is possible to measure the credit risk of a portfolio.

An example of the techniques for executing credit risk calculation with an analytical method using Fourier transform rather than the Laplace transform method is disclosed in Japanese Patent Application Laid-Open No. 2000-148721. Examples of theoretical researches for executing calculation of a credit risk using Laplace transform are disclosed in Martin, R., K. Thompson and C. Browne, "Taking to the saddle," Risk, 14(6), 2001, pp. 91 to 94, and Glasserman, P. and J. Ruiz-Mata, "Computing the credit loss distribution in the Gaussian copula model: a comparison of methods, "Journal of credit risk, 2(4), 2006, pp. 33 to 66.

SUMMARY OF THE INVENTION

In the Monte Carlo simulation method, the necessary accuracy is not obtained unless an enormous number of calculations is performed. In particular, for calculations in which calculation accuracy in an area where the value of a probability density function is small (e.g., an area where the value of a distribution function is close to 1) is important (e.g., calculation for highly accurately calculating a credit VaR), it is necessary to secure high numerical accuracy in a portion where the frequency of appearance is rare in the simulation. Therefore, the computational complexity is enormous.

Concerning the method of using Laplace transform, theretical researches for deriving an approximation formula assuming the portfolio form and distribution shape are mainly performed. In the case of multiple factors, not even many theoretical researches are performed at present. One of the few instances of such theoretical researches includes assumptions too restrictive for practical use. There is a problem in that a significant error could occur if the method is used for a real portfolio (see Martin, R., K. Thompson and C. Browne, "Taking to the saddle," Risk, 14(6), 2001, pp. 91 to 94).

The present invention has been devised in order to solve at least any one of the problems described above.

The present invention makes it possible to quickly execute credit risk calculation with high precision by employing a particular numerical calculation technique on the basis of analytical equations. In a certain embodiment of the present invention, Laplace transform is used as a theoretical basis of calculation. When a loss distribution is calculated by the Laplace transform method, there are two technical points described below. The first point is how fast and accurately a moment generating function is calculated. In particular, since there is a processing for executing multi-dimensional numerical integration over common risk factors, it is necessary to appropriately perform this processing. The second point is how Laplace inversion represented by an integration along an infinite interval on the complex plane is executed quickly with high precision. With respect to the first point, the inventor performs discretization of sector risk factors. With respect to the second point, the inventor uses fast Laplace inversion. In the present invention, specific algorithms and computer processing are employed for processing in calculation to make it possible to perform processing at sufficiently practicable certain speed in a real computer. Further, processing for eliminating numerical errors involved in numerical simulations and securing accuracy is employed. Consequently, a dedicated computer for information processing that measures credit risks on the basis of the Laplace transform method is realized and a method for the information processing and a computer program are provided.

In this certain embodiment of the present invention, there is provided a calculation method of calculating risk measures concerning losses of a portfolio including credits given to a plurality of companies, the risk measure calculation method including a step of calculating, for each of the companies, data of a loss index function (in braces on the right side of the second equation of formula 31) defined by using the probability of loss occurrence ($p_i'(y)$) of the respective companies for respective values of sector variables and the exponential function of the value obtained by multiplying the auxiliary variable ($\lambda$) for Laplace transform by the exposure of the credit to the company, wherein, the sector variable is a realization of the sector risk factor (Y) for each of the sectors dividing the companies included in the portfolio, the sector risk factor is a random variable common to the companies included in the sector as linear combination of common risk factors, which are a plurality of risk factors that can affect the firm values used for determination of the probability of loss occurrence, the probability of loss occurrence is the conditional probability indicating the occurrence of the loss of company based on the firm value under the condition that the sector variable of the sector to which the company belongs is given, the definition of the loss index function includes a function of the probability of loss occurrence, the data of the loss index function is calculated by using the discretized valuation points ($g_m$) for the definition of the loss index function (in braces on the right side of the second equation in formula 31) instead of respective values ($y^s$) of the sector variables, and the discretized valuation points are in a range corresponding to a distribution range of the sector variable, a sector-function-data calculating step of calculating sector function data, which are the values at the discretized valuation points of a sector function defined for each of the sectors including the product of the loss index functions for all the companies in the sectors, using the value obtained by taking the product of the data of the loss index functions of all the companies in the respective sectors and storing the value in sector function data storage means in association with at least the sectors and the discretized valuation points, a sector multiplying step of calculating, concerning respective integration points (formula 26) for performing integration over common risk variables that are realizations of the common risk factors, for each of the sectors (S), an approximate value at the respective integration points of a conditional portfolio function including the product of the sector functions for all the sectors included in the portfolio by specifying one of the discretized valuation points near a sector variable ($y^S_1$ of formula 32), which is a linear combination of components of the integration points, and retrieving the sector function data for the specified one discretized valuation point from the sector function data storage means and taking the product of the sector function data of all the sectors, a portfolio-function calculating step of numerically performing integration calculation over the common risk variables of an integrand that includes the conditional portfolio function using the approximate value of the conditional portfolio function at the integration points (formula 26) and calculating data of a portfolio function that is the product of an average over the common risk factors of the conditional portfolio function and a portfolio auxiliary variable function, which is a function of the auxiliary variable, a Laplace inversion step of calculating, on the basis of the data of the portfolio function, data of the value of a function obtained by subjecting the portfolio function to Laplace inversion by numerically performing integration calculation over the auxiliary variable ($\lambda$), and a risk-measure calculating step of calculating risk measures indicating the risks concerning losses of the portfolio from the data of the value of the function obtained by subjecting the portfolio function to Laplace inversion.

In the present invention, the portfolio including credits given to a plurality of companies generally indicates a set of credits including credits as securities such as finance receivable to the companies and bonds. For example, the entire finance receivables of financial institutions such as banks is an example of this portfolio. In the present specification, the companies are not always limited to commercial companies having judicial personality and generally indicate borrowers of the financial institutions. For example, sole proprietors, individuals, national and local municipal entities, and the like that do not have judicial personality are also included in the companies in the present specification. Therefore, portfolios including credits such as housing loans for individuals, government bonds, and local government bonds are also objects of calculation of risk measures according to the present invention. In the following explanation, a term "obligor" may be used instead of company.

The term "firm value" in the present invention means a firm value used in firm-value models widely used in credit risk management practice. In other words, the firm value is a random variable conforming to a standard normal distribution set for each of the companies and represented as linear combination of common risk factors and idiosyncratic factors. In general, there are a plurality of common risk factors, which are random variables conforming to the standard normal distribution independently from one another. Since the common risk factors affect the firm values of all the companies, a correlation occurs among the firm values. The idiosyncratic factors are random variables each set for each of the companies and conforming to the standard normal distribution independently from one another. All the idiosyncratic factors are independent from all the common risk factors. In formula 4, $Z_i$ is an example of the firm value, $X_j$ is an example component of the common risk factors, and $\epsilon_i$ is an example of the idiosyncratic risk factors. $X_j$ and $\epsilon_i$ satisfy the relation of formula 5. A coefficient for the common risk factors appearing in the firm values is called sensitivity coefficient. $\alpha_{ij}$ in formula 4 is an example of the sensitivity coefficient.

The sector is a unit of a company group for giving the sensitivity coefficient appearing in the firm-value model. The sensitivity coefficient is a common value for all the companies in the sector. The sector risk factor is a random variable that is represented as linear combination of the common risk factors and commonly affects firm values of all the companies in the sector. A specific example of the sector risk factor is given by $Y^S$ of formula 30 described later. The sector variable means a realization of the sector risk factor. When risk measurement is performed using the firm-value model in the practice of risk management, in many cases, companies are classified into several sectors according to some company attributes and, then, a sensitivity coefficient is estimated for each of the sectors. This is because not only companies having much information for estimating a sensitivity coefficient like listed companies but also a large number of companies without enough information for precisely estimating a sensitivity coefficient are included in a portfolio and, even if sensitivity coefficient can be estimated individually for the companies, it is difficult in terms of calculation load to individually give sensitivity coefficients to all the companies forming several tens of thousands to several million portfolios and calculate risk measures. Calculation speed in carrying out the certain embodiment of the present invention depends on the number of sectors. In practice, the number of sectors is set to about several tens to several hundred. In this case, it is possible to extremely quickly execute calculation in the certain embodiment of the present invention. However, as a special case, if the number of sectors is equal to the number of companies and each of all the sectors includes one individual company, the present invention can be applied when sensitivity coefficients are estimated for the respective individual companies.

The probability of loss occurrence ($p_i(y)$) means the occurrence probability of loss of a company in a risk measurement period under the condition that the values of common risk factors are determined. The probability of loss occurrence is calculated on the basis of the probability distribution of firm values at an end point of a risk measurement period and a criterion reflecting recognition of loss. In the firm-value model, the probability distribution of firm values at the end point of the risk measurement period is determined if common risk variables, which are realizations of the common risk factors, are given. In the case of the default mode, the loss criterion is set to reflect a criterion that makes it possible to determine the event of default in some form. In the case of the MtM mode, the loss criterion is set to further reflect a criterion that makes it possible to determine the event of changes in credit rating in some form. The default threshold $C_i$ in formula 7 is an example of the loss criterion in the default mode. As described above, since a firm value depends on the common risk factors, the probability of loss occurrence is a function of the common risk variables. Since the firm value can also be represented by a sector risk factor of a sector to which the company belongs, the probability of loss occurrence can also be represented as a function of a sector variable of the sector to which the company belongs.

The auxiliary variable $\lambda$ is typically a variable of a function obtained by Laplace transform of a certain function and means a variable appearing after integral transform such as Laplace transform is performed. As in the case of normal Laplace transform, the auxiliary variable $\lambda$ is used as a variable for an exponential (exponential function) in integral calculation of Laplace inversion and regarded as an integral variable.

The loss index function is a function defined for each of the companies using the probability of loss occurrence and the exponential function value of the value obtained by multiplying the auxiliary variable by the exposure of a credit to the company or the loss corresponding to the state of the company after the risk measurement period. The exposure is the loss that occurs from a credit given to a company when the company falls into default and is also referred to as loss at default. A function form of the loss index function may be different for each of the companies. As described above, since the probability of loss occurrence is a function of the sector variable, the loss index function is a function of the sector variable of the sector to which the company belongs and the auxiliary variable. In the certain embodiment of the present invention, it is possible to calculate various risk measures by changing the function form of the loss index function. An example of the loss index function is shown in braces on the right side of formula 67 later.

The sector function is a function including the product of the loss index functions of all companies in a sector. The sector function in the certain embodiment of the present invention is exactly the product of the loss index functions of all companies in the sector. Formula 27 described later is an example of the sector function. A function obtained by multiplying the product of the loss index functions of all companies in the sector by a sector auxiliary variable function that is a function of the auxiliary variable and is defined for each of the sectors can also be the sector function.

The conditional portfolio function is a function including the product of the sector functions of all sectors. From this definition, the conditional portfolio function is a function including the product of the loss index function of all companies included in a portfolio. The conditional portfolio function in the certain embodiment of the present invention is exactly the product of the sector functions of all sectors. Formula 67 described later is an example of the conditional portfolio function. A function obtained by multiplying the product of the sector functions of all sectors by the conditional portfolio auxiliary variable function can also be the conditional portfolio function.

The portfolio function is a function defined as the product of an average over the common risk factors of the conditional portfolio function (a function obtained by integrating the product of the conditional portfolio function and the probability density function of the common risk factors with respect to the common risk variables) and a portfolio auxiliary variable function, which is a function of the auxiliary variable. According to the definition of the portfolio function, the moment generating function shown in formula 13 is included in the portfolio function. A function obtained by subjecting a distribution function to Laplace transform indicated by formula 28 later is also included in the portfolio function. Moreover, a function used at the time of risk contribution calculation indicated by formula 70 described later also satisfies the definition of the portfolio function under the assumption that the form of the loss index function is different for only the company "i". Laplace transform of the functions important in risk measurement can be represented in the form of a portfolio function because the firm-value model has a characteristic called conditional independence.

The sector auxiliary variable function, the conditional portfolio auxiliary variable function, and the portfolio auxiliary variable function include, besides a function explicitly dependent on the auxiliary variable, the identity function yielding the numerical value of 1 and a constant function which are not dependent on the auxiliary variable. These functions are defined because, when, for example, the portfolio function is formula 28 described later, multiplication processing of $1/\lambda$ can be performed in various steps. The points of attention concerning the multiplication processing are described in detail later.

The risk measure is a measure that can be data for determining the degree of risk. In the present invention, the risk measure is calculated on the basis of a portfolio function subjected to Laplace inversion. For example, if the portfolio function subjected to Laplace inversion is the distribution function of a loss distribution, expected loss (EL) and credit VaR can be calculated as risk measures. In this way, all numerical measures that can be calculated from the density function and the distribution function indicating a probability distribution can be the risk measure of the present application.

The integration point is a coordinate point in the space of the values of the common risk variables used in approximating integration over the common risk variables by a series and is represented by a vector including the values of the common risk variables as components. The weight value $w_1$ related to the integration point is the coefficient used for the series and, in general, takes values different for each integration point. The integration point and the weight value $w_1$ related to the integration point are given by a numerical integration algorithm used for determining a series for approximating integration of a portfolio function. Since the sector variable is a linear combination of the common risk variables, the sector variables of all the sectors are given for each integration point.

The discretized valuation point is a point sequence set according to the distribution range of the sector variables. In the certain embodiment of the present invention, a substantial increase in speed of calculation is realized by using the discretized valuation points as an alternative to the sector variable in a calculation process. Sets of discretized valuation points do not always have to be identical in all the sectors. It is also possible to carry out the present invention using different sets of discretized valuation points for each of the sectors.

Data of a loss index function in the certain embodiment of the present invention is the value of the loss index function at the time when the sector variables are the values of respective discretized valuation points. The loss index function is a function of the auxiliary variable and the sector variable. It is possible to calculate the data of the loss index function by giving values of the auxiliary variable and discretized valuation points.

In the sector-function-data calculating step, processing for taking the product of the data of the loss index function of all companies in a sector for each of the discretized valuation points is performed for respective sectors. When the sector function is the product of the loss index functions of all the companies in a sector, the multiplied value itself obtained by this processing is the sector function data. When the sector function is the product of the product of the loss index functions of all the companies in a sector and a sector auxiliary variable function, in the sector function-data calculating step, processing for multiplying the multiplied value by a value of the sector auxiliary variable function is also performed.

The sector function data storage means is, for example, storage means that can store sector function data logically separate from other data and retrieve the sector function data in a storage device included in a computer. The sector function data is stored in the sector function data storage means in association with the sectors and the discretized valuation points.

In the sector multiplying step, for each of the sectors, the value of the sector variable is calculated from a integration point one discretized valuation point is specified from the vicinity of the value of the sector variable, and the sector function data at the discretized valuation point obtained by this specifying processing is retrieved from the sector function data storage means. Then, processing of taking the product of the sector function data of all the sectors retrieved in this way is performed. When a conditional portfolio function is the product of the sector functions of all the sectors, the value calculated by the processing is an approximate value of the conditional portfolio function at the integration point. In this way, instead of sector function data that should be newly calculated every time using the sector variables, the value of the sector function data calculated and stored in the sector function data storage means in advance is retrieved and used. Consequently, it is possible to substantially increase speed of calculation. When the conditional portfolio function is the product of the product of the sector functions of all the sectors and a conditional portfolio auxiliary variable function, in the sector multiplying step, processing for multiplying the product for all the sectors of the sector function data by a value of the conditional portfolio auxiliary variable function is also performed.

In the portfolio-function calculating step, integration calculation over common risk variables is performed by numerical calculation by using the approximate value of the conditional portfolio function obtained in the sector multiplying step. In this integration calculation, over each of integration points, it is possible to use a weight multiplying step of multiplying the approximate value of the conditional portfolio function by a weight value related to the integration point to obtain weighted data and a step of adding up the weighted data for all the integration points and thereby calculating an average over common risk factors of the conditional portfolio function. Alternatively, when the weight value related to the integration point is equal for all the integration points, processing for adding up the approximate values of the conditional portfolio function for all the integration points and dividing the approximate values by the number of the integration points to thereby calculate an average over common risk factors of the conditional portfolio function can also be adopted. Data of a portfolio function is calculated by calculating the product of the average obtained in this way and a portfolio auxiliary variable function, which is a function of the auxiliary variable. The data of the portfolio function can also be calculated by performing the processing of integration calculation using, instead of the approximate value of the conditional portfolio function obtained in the sector multiplying step, the value obtained by multiplying the approximate value by a value of the portfolio auxiliary variable function over each of the integration points. However, such processing is also included in an embodiment of the present invention.

Points which require attention when calculating a portfolio auxiliary variable function will now be explained with reference to an example in which a portfolio function is the Laplace transform of a distribution function (formula 28). In this case, in a certain embodiment of the present invention, the loss index function of all companies is set to be the function in braces of formula 67, the sector function is set to be the product of the loss index function for all the companies in the sector (formula 27), the conditional portfolio function is set to be the product of the sector functions for all the sectors (formula 67), and the portfolio auxiliary variable function is set to be $1/\lambda$. Then, data of a portfolio function is calculated by performing the processing in respective steps. In this embodiment, sector auxiliary variable functions and conditional portfolio auxiliary variable functions of all the sectors are the identity functions. However, multiplication processing of $1/\lambda$ can be executed in various steps. For example, data of a portfolio function can be calculated by performing the processing in the respective steps assuming that one of the portfolio auxiliary variable function, the sector auxiliary variable function of the respective sectors, and the conditional portfolio auxiliary variable functions is given by $1/\lambda$ and the others are given by an identity function. Alternatively, data of a portfolio function can be calculated even if, in the step of calculating data of a loss index function, it is assumed that only the loss index function of a certain one company is the function obtained by multiplying the function in braces of formula 67 by $1/\lambda$, the loss index functions of the other companies are the function in braces of formula 67, and all functions concerning the auxiliary variable are the identity functions. In this way, the processing of multiplying $1/\lambda$ can be performed in various steps. All of these are included in the scope of the present invention. It is not essential for fast calculation and highly accurate calculation for risk measures, which are effects of the present invention, in which step the processing for multiplying $1/\lambda$ is performed. The difference in this processing method does not limit the scope of the present invention.

In a certain embodiment of the present invention, calculation of Laplace inversion for a portfolio function is performed by using data of a portfolio function for a plurality of values of the auxiliary variable. It is determined according to an infinite series method and a convergence acceleration method used for Laplace inversion for what values of the auxiliary variable the values of the portfolio function is necessary. The method of calculating the portfolio function described above can be applied to arbitrary values of the auxiliary variable. Data of the portfolio function can be quickly calculated by the method. Therefore, it is possible to carry out the present invention using various Laplace inversion methods.

Another embodiment of the present invention includes not only calculation employing the Laplace transform method but also a method of using a Fourier transform method. In the present invention, there is provided a calculation method of calculating risk measures concerning losses of a portfolio including credits given to a plurality of companies, the risk measure calculation method including a step of calculating, for each of the companies, data of a loss index function defined by using the probability of loss occurrence of the respective companies for respective values of sector variables and the exponential function of the value obtained by multiplying an auxiliary variable for Fourier transform by the exposure of the credit to the company and by the imaginary unit, the sector variable being a realization of a sector risk factor for each of the sectors dividing the companies included in the portfolio, the sector risk factor being a random variable common to the companies included in the sector as linear combination of common risk factors, which are a plurality of risk factors that can affect firm values used for determination of the probability of loss occurrence, the probability of loss occurrence being the conditional probability indicating the occurrence of the loss of the companies based on the firm values under the condition that the sector variable of the sector to which the company belongs is given, the definition of the loss index function including a function of the probability of loss occurrence, the data of the loss index function being calculated by using at the discretized valuation points for the definition of the loss index function instead of respective values of the sector variable, and the discretized valuation points being in a range corresponding to a distribution range of the sector variable, a sector-function-data calculating step of calculating sector function data, which are values at the discretized valuation points of a sector function defined for each of the sectors including the product of loss index functions for all the companies in the sector, using the value obtained by taking the product of the data of the loss index functions of all the companies in the respective sectors and storing the value in sector function data storage means in association with at least the sectors and the discretized valuation points, a sector multiplying step of calculating, concerning respective integration points for performing integration over common risk variables that are realizations of the common risk factors, for each of the sectors, an approximate value at the respective integration points of a conditional portfolio function including the product of the sector functions for all the sectors included in the portfolio by specifying one of the discretized valuation points near a sector variable, which is a linear combination of components of the integration points, and retrieving the sector function data for the specified one discretized valuation point from the sector function data storage means and taking the product of the sector function data of all the sectors, a portfolio-function calculating step of numerically performing integration calculation over the common risk variables of an integrand that includes the conditional portfolio function using the approximate value of the conditional portfolio function at the integration points to thereby calculate data of a portfolio function that is the product of an average over the common risk factors of the conditional portfolio function and a portfolio auxiliary variable function, which is a function of the auxiliary variable, an inverse Fourier transform step of calculating, on the basis of the data of the portfolio function, data of a value of a function obtained by subjecting the portfolio function to inverse Fourier transform by numerically performing integration calculation over the auxiliary variable, and a risk-measure calculating step of calculating risk measures indicating risks concerning losses of the portfolio from the data of the value of the function obtained by subjecting the portfolio function to inverse Fourier transform. Moreover, for each of the auxiliary variable, sector function data may be stored in the sector function data storage means as sector function data for each auxiliary variable. In the case of this embodiment, there is a mathematical difference as transform between Laplace transform and Fourier transform. Therefore, auxiliary variable and loss index functions are different between the embodiment employing Laplace transform and the embodiment employing Fourier transform. However, both the embodiments are the same in the technical idea of the present invention for increasing speed of calculation using the sector function data storage means. Therefore, both the embodiments are represented using identical terms. In both the embodiments, the sector function data, the portfolio functions, and the sector function data for each auxiliary variable calculated by using these different elements are also different. However, risk measures finally calculated are virtually the same regardless of any difference in mathematical forms between the two embodiments except a nonessential error due to a difference in numerical calculation due to the difference in forms.

In a certain embodiment of the present invention, the present invention can be carried out as a method as described above. Further, the present invention can be carried out as a computer program and an apparatus. This point will be clarified by explanation of the embodiments.

Signs and formulas in parentheses affixed to the respective elements in the above explanation are affixed only for illustration and are not meant to limit the present invention in any way.

According to any one of the embodiments for carrying out the present invention, it is possible to calculate risk measures of a portfolio at sufficiently practicable speed while eliminating excessive simplification of a model and excessive simplification of calculation, which lead to a calculation error in calculation of risk measures. According to any one of the embodiments for carrying out the present invention, it is possible to perform calculation of risk measures (e.g., risk contribution), which have previously been extremely difficult to calculate.

BRIEF DESCRIPTION OF THE DRAWINGS

FIG. 3 is a distribution graph showing a loss distribution of a portfolio, for which calculation of the present invention is performed, together with various risk measures;

FIG. 4 is a comparison table showing criteria for taking into account loss in the calculation of the present invention;

FIG. 13 is a diagram showing an example of data of coefficients (sensitivity coefficients) for generating sector risk factors used in an example of the present invention from common risk factors;

FIG. 14 is a diagram showing an example of data given to each of companies (obligors) used in the example of the present invention;

FIG. 15(1) is an explanatory diagram showing an example of an average default probability for each of the credit ratings used in the default mode used in a certain example of the present invention;

FIG. 15(2) is an explanatory diagram showing an example of an average rating transition probability for each of the credit ratings used in the MtM mode in another example;

FIG. 16 is an explanatory diagram showing an example of integration points used in the example of the present invention;

FIG. 17 is a diagram showing an example of data of rates of transition to a default given for each of the credit ratings given to the companies (obligors) in an example of the present invention;

FIG. 18 is a diagram showing an example of data given to each of the companies (obligors) used in the example of the present invention;

FIG. 20B is a table in which specifications of variables used in the example of the present invention implemented by the block diagram shown in FIG. 20A are summarized;

FIG. 20C is a table in which specifications of variables used in the example of the present invention implemented by the block diagram shown in FIG. 20A are summarized;

FIG. 23 is a table in which specifications of variables used in the program according to the example of the present invention are summarized;

FIG. 24A is a table in which specifications of variables used in the program according to the example of the present invention are summarized;

FIG. 24B is a table in which specifications of variables used in the program according to the example of the present invention are summarized;

FIG. 26A is a table in which specifications of variables used in the program according to the example of the present invention are summarized;

FIG. 26B is a table in which specifications of variables used in the program according to the example of the present invention are summarized;

FIG. 30A is a table in which specifications of variables used in the program according to the example of the present invention are summarized;

FIG. 30B is a table in which specifications of variables used in the program according to the example of the present invention are summarized;

FIG. 31A is a table in which specifications of variables used in the program according to the example of the present invention are summarized;

FIG. 31B is a table in which specifications of variables used in the program according to the example of the present invention are summarized;

FIG. 32A is a table in which specifications of variables used in the program according to the example of the present invention are summarized;

FIG. 32B is a table in which specifications of variables used in the program according to the example of the present invention are summarized;

FIG. 33A is a table in which specifications of variables used in the program according to the example of the present invention are summarized; and FIG. 33B is a table in which specifications of variables used in the program according to the example of the present invention are summarized.

DESCRIPTION OF THE EMBODIMENTS

Figure 1:
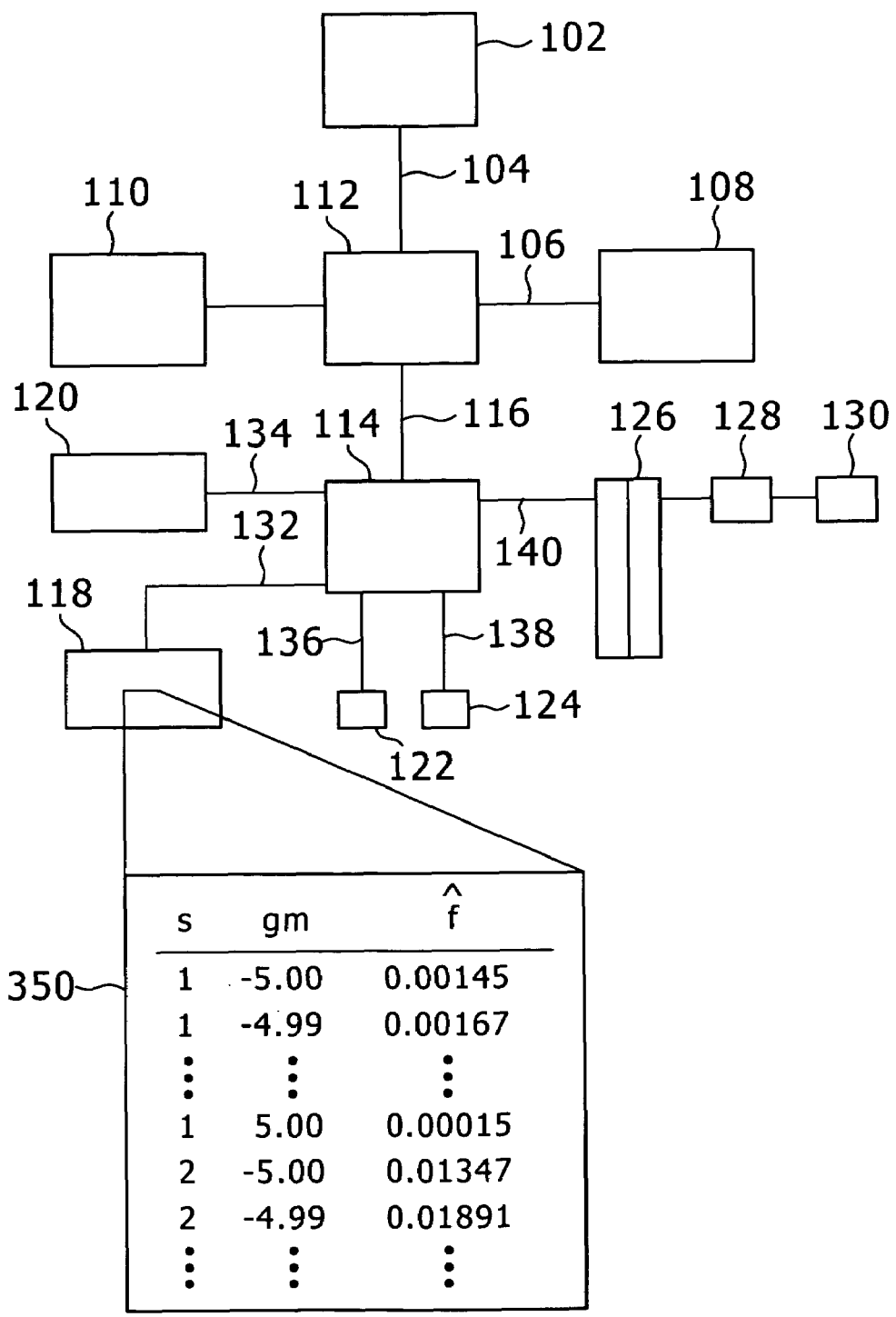
FIG. 1 is a functional block diagram of a computer in which a calculation method according to an embodiment of the present invention is realized.

Embodiments of the present invention will be hereinafter explained. First, in order to clearly indicate an overview of calculation, a calculation method will be explained about the techniques employed in analytical calculation and the techniques employed in numerical calculation using formulas. Then, a specific configuration for implementing such techniques in a computer as software will be explained as an example.

First Embodiment: Risk Measurement

In an embodiment of the present invention, risk measures are quickly calculated with high precision on the basis of an analytical method by employing numerical calculation techniques. In this embodiment, a moment generating function is calculated and the probability distribution (probability density function and distribution function) concerning losses of a portfolio is calculated on the basis of the moment generating function. The moment generating function is the Laplace transform of the probability density function. Therefore, a calculation of Laplace inversion is used to calculate the probability density function from the moment generating function.

In the numerical calculation techniques according to this embodiment, formulas themselves for Laplace inversion used in the processes of calculation of risk measures are not simplified. Instead, when the calculation is performed using a real computer, a method for quick and highly accurate calculation is provided by employing particular calculation methods and calculation procedures. In this embodiment, no assumption is included in a portfolio. Therefore, this embodiment of the present invention can be applied to a portfolio having an arbitrary structure. For example, even in a portfolio in which credits are sufficiently diversified, or even in a portfolio in which credits are concentrated, it is possible to quickly carry out calculation of risk measures with high precision.

In this embodiment, first, a moment generating function is calculated from data such as exposures and default probabilities. Then, the probability distribution of losses (probability density function) is calculated by subjecting the moment generating function to Laplace inversion. The moment generating function in this context is an example of the portfolio function in the present invention. A calculation method will now be explained by dividing the calculation method into a calculation process for a moment generating function and a calculation process of Laplace inversion.

[Calculation of a Moment Generating Function]

In order to calculate a moment generating function, it is necessary to execute integration over common risk variables x, which are realizations of common risk factors X (see formula 13). In the examination carried out by the inventor, when the number of common risk factors is small, for example, it is confirmed that, when the number of factors is one, a moment generating function can be calculated with high precision by the Gauss-Legendre method and the Gauss-Hermite method. It has been confirmed that, when the number of factors is two to four, a moment generating function can be calculated with high precision by the Good Lattice Point method (GLP method). However, the number of common risk factors in a multi-factor firm-value model used in the practice of credit risk management is often set to be five or more (e.g., ten to twenty to several tens). In such cases, the numerical integration algorithm cannot be applied or, even if the numerical integration algorithm can be applied, calculation time is extremely long. In particular, when the number of obligors is extremely large (several hundred thousand to several million), practicality is deteriorated because of an increase in calculation time.

A generality of numerical integration will now be very briefly explained. In executing numerical integration, various numerical integration algorithms are known. Most of the numerical integration algorithms can be represented by using the following form:

[Formula 15]

$$\int_{\vec{x} \in I} g(\vec{x}) d\vec{x} \approx \sum_{l=1}^{N_I} q_l g(\vec{x}_l) \quad (15)$$

where,

[Formula 16]

I: integration area $\vec{x}_l (l=1, 2, \ldots N_I)$: point sequence (integration points)

in $\vec{x}_l \in I$ $q_l (l=1, 2, \ldots, N_I)$: weight associated with $\vec{x}_l$ $N_I$: number of integration points  (16)

In other words, in the numerical integration, integration points and a point sequence including weights associated with the integration points are appropriately given from an integration area as follows:

[Formula 17]

$$(q_l, \vec{x}_l) \, (l=1,2,\ldots, N_I) \quad (17)$$

An approximate value of integration is calculated by an appropriate weighted sum of values of an integrand at those points. Therefore, accuracy of the numerical integration depends on how the following point sequence is selected.

[Formula 18]

$$(q_l, \vec{x}_l) \quad (18)$$

In other words, the numerical integration algorithm indicates a procedure for determining this point sequence.

Many numerical integration algorithms can only be applied when an integration area is finite. However, actually, in some cases there is a need to numerically calculate the integration on an infinite area. As a method of representing integration on an infinite area as integration on a finite area, there are a method of neglecting an area which does not contribute much to integration and a method of making an integration area finite by variable transform. In the former method, an error due to neglect of an integration area occurs. However, a highly accurate numerical integration algorithm can sometimes be used by making the integration area finite. As a result, it is possible that the numerical integration can be executed with higher precision than in the original integration area.

The moment generating function is written as integration over common risk variables. An integration area extends to the entire $N_F$-dimensional Euclidean space. However, in this integration, the following convergent factor with good characteristic due to conformity of common risk factors to the normal distribution is included:

[Formula 19]

$$\phi_{N_f}(\vec{x}) = \frac{1}{(2\pi)^{N_F/2}} \exp\left(-|\vec{x}|^2/2\right) \quad (19)$$

Therefore, the integration has a characteristic that the integration is easily treated in numerical calculation. Actually, since this factor is included, contribution to integration from an area sufficiently distant from the origin is extremely small. Therefore, even if an integration area on numerical integration is limited to a hypersphere or a hypercube including the origin, an error caused by the limitation of the integration area can be reduced to be extremely small. For example, in the following approximation of limiting an integration area to the hypercube with its center being at the origin, the side of which has length 2a:

[Formula 20]

$$\hat{f}_L(\lambda) \cong \int_{\vec{x} \in [-a,a]^{N_F}} \prod_{i=1}^{N} (1 - p_i(\vec{x}) + p_i(\vec{x})\exp(-\lambda E_i))\phi_{N_F}(\vec{x})d\vec{x} \quad (20)$$

it is possible to set an error due to this approximation arbitrarily small by setting "a" sufficiently large.

It is also possible to make the integration area finite with variable transform. For example, the following transform is conceivable.

[Formula 21]

$$\eta_j = \Phi(x_j) \quad (21)$$

where, $x_j$ is the jth component of the following vector of an integration variable:

[Formula 22]

$$\vec{x} \quad (22)$$

The integration area can be transformed into a Cartesian product of the interval [0, 1] by this transform. A moment generating function can be represented as follows:

[Formula 23]

$$\hat{f}_L(\lambda) = \int_{\vec{\eta} \in [0,1]^{N_F}} \prod_{i=1}^{N} (1 - p_i(\Phi^{-1}(\vec{\eta})) + p_i(\Phi^{-1}(\vec{\eta}))\exp(-\lambda E_i))d\vec{\eta} \quad (23)$$

The argument of $p_i$ on the right side is the following vector:

[Formula 24]

$$\Phi^{-1}(\vec{\eta}) = (\Phi^{-1}(\theta_j), \ldots, \Phi^{-1}(\theta_{N_F})) \quad (24)$$

$\Phi^{-1}$ appearing on the right side is the inverse function of the distribution function of the standard normal distribution.

In numerically calculating integration over common risk variables appearing in a portfolio function, the numerical integration algorithm can be applied to an expression of original integration after it is subjected to some transform described above. Whatever kind of transform is performed, an equation obtained by using the numerical integration algorithm can be represented in the following form:

[Formula 25]

$$\hat{f}_L(\lambda) \cong \sum_{l=1}^{N_I} w_l \prod_{i=1}^{N} \{1 - p_i(\vec{x}_l) + p_i(\vec{x}_l)\exp(-\lambda E_i)\} \quad (25)$$

$N_I$: number of integration evaluation points
$\vec{x}_l$: lth integration evaluation point where,

[Formula 26]

$$\vec{x}_l \quad (26)$$

is an integration point and $w_l$ is a weight value related to the integration point. The integration point is calculated, by using a formula of variable transform performed in the process of deformation of integration, from an integration point determined by the numerical integration algorithm and has a meaning as common risk variables. Weight values related to the respective integration points are products of values of the density function of the standard normal distribution at the integration points, weights associated with the integration points determined from the numerical integration algorithm, and Jacobian involved in variable transform of integration variables included when necessary. In this way, a method of giving an integration point and a weight value related to the integration point is different depending on methods of numerical integration. However, since a method of increasing speed of calculation of formula 25 is provided by the present invention, the present invention can be applied regardless of the method of numerical integration.

Monte Carlo integration is a method of evaluating integration through a procedure of selecting an integration point using random numbers and uniformly setting all weights to be $w_l = 1/N_I$. $N_I$ is the number of integration points. The Monte Carlo integration has a remarkable characteristic that speed of convergence does not depend on the dimension of integration. Therefore, the Monte Carlo integration is often an effective option in numerically calculating high-dimensional integration. However, since convergence speed is slow, extremely long calculation time is often required to calculate an integral value with high precision. When integration over common risk variables in an expression of a moment generating function is actually executed by the Monte Carlo integration, in order to highly accurately calculate VaR at a high confidence interval (e.g., 99.97%), the number of integration points needs to be at least equal to or larger than about one million. The moment generating function is represented as formula 25 using integration points and weights related to the integration points. When the moment generating function is calculated on the basis of this equation, it is necessary to calculate a product for all companies at each of the integration points. The number of companies included in a portfolio of an entire bank is typically several tens of thousands to several million. When such calculation is executed by the Monte Carlo integration, extremely long time is required. For example, when the number of integration points is set to be one million and the calculation is executed for a portfolio of one million companies, one trillion times of loop calculation is necessary in total. Such calculation is less practicable.

The inventor has found a method of extremely quickly calculating the value of a moment generating function for a given auxiliary variable by using sector risk factors and discretizing the sector risk factors. Specifically, in this embodiment, the calculation is performed in two steps described below. First, the value of a conditional moment generating function by sector at a discretized valuation point is calculated. The conditional moment generating function by sector is defined as follows:

[Formula 27]

$$\hat{f}_{L_S}(\lambda, \vec{x}) = \prod_{S(i)=S} \{1 - p_i(\vec{x}) + p_i(\vec{x})\exp(-\lambda E_i)\} \quad (27)$$

Subsequently, the calculation is substantially increased in speed by approximately calculating an overall moment generating function by using a result of the calculation of the conditional moment generating function by sector. In a form of carrying out this calculation method using a computer, calculation of the conditional moment generating function by sector and calculation of the overall moment generating function are separated. First, the calculation of the conditional moment generating function by sector is performed for respective discretized valuation points and the result of the calculation is stored in storage means. Data of the conditional moment generating function by sector in the storage means is used in the calculation of the overall moment generating function. A method of calculating a value of a moment generating function using this calculation method is described in detail below. However, the present invention can also be applied to calculation of functions other than the moment generating function if the functions match the definition of a portfolio function. For example, the present invention can also be applied to the following calculation in which an integrand is Laplace transform of a distribution function:

[Formula 28]

$$\hat{F}_L(\lambda) = \frac{1}{\lambda}\hat{f}_L(\lambda) \quad (28)$$

-continued $$= \frac{1}{\lambda}\int_{\vec{x}\in R^{N_F}} \prod_{i=1}^{N}\{1 - p_i(\vec{x}) + p_i(\vec{x})\exp(-\lambda E_i)\}\phi_{N_F}(\vec{x})d\vec{x}$$

Actually, formula 28 can be calculated by calculating a moment generating function with a method described below and, then, performing a division using an auxiliary variable. A distribution function is often easier to treat than a density function in numerical calculation. However, for simplification of explanation, a method of calculating a moment generating function will now be explained as an example. In the practice of risk management, the industry of obligors is often used in setting sectors.

[Rewriting of a Moment Generating Function]

First, as preparation for the two steps described above, a moment generating function is rewritten. Since a sensitivity coefficient is given for each of the sectors, the sensitivity coefficient can be written as follows:

[Formula 29]

$$\alpha_{ij} \Rightarrow \alpha_{S(i)j} \quad (29)$$

S(i): sector to which the firm "i" belongs

This formula indicates that the sensitivity coefficient does not take different values for each of the companies but takes different values for each of the sectors.

The firm value $Z_i$ of the company "i" can be represented by a single factor $Y^S$ given by a linear combination of common risk factors $X_j$ independently from one another as follows:

[Formula 30]

$$Z_i = \beta_{S(i)}Y^{S(i)} + \sqrt{1 - \beta_{S(i)}^2}\,\varepsilon_i \quad (30)$$

$$\beta_S = \sqrt{\sum_{j=1}^{N_F}\alpha_{Sj}^2},$$

$$Y^S = \frac{1}{\beta_S}\sum_{j=1}^{N_F}\alpha_{Sj}X_j$$

The factor $Y^S$ is a random variable set for each of the sectors S and is referred to as sector risk factor.

By introducing the sector risk factor, it is possible to describe the firm values of all companies belonging to the respective sectors using the sector risk factor, which is one common factor. This means that a conditional default probability of the companies belonging to the sector S depends on only a sector variable $y^S$, which is a realization of the sector risk factor $Y^S$. Therefore, in the following explanation, the conditional default probability of the company "i" is represented as pi'($y^S$) The conditional moment generating function by sector shown in formula 27 is also a function of only $y^S$. This means that, when attention is paid to only a specific sector, a loss distribution can be completely described by the one-factor model.

The sector variable $y^S$ can be represented by a realization x (in general, a vector) of the common risk factors X. Therefore, by taking appropriate integration points and a series of weights related to the integration points, a moment generating function that should be calculated can be represented as follows:

[Formula 31]

$$\hat{f}_L(\lambda) \cong \sum_{l=1}^{N_I} w_l \prod_{S=1}^{N_S} \hat{f}'_{L_S}(\lambda, y_l^S) \qquad (31)$$

$$f'_{L_S}(\lambda, y^S) = \prod_{S(i)=S} \{1 - p'_i(y^S) + p'_i(y^S)\exp(-\lambda E_i)\}$$

$$p'_i(y) = \Phi\left(\frac{C_i - \beta_{S(i)} y}{\sqrt{1 - \beta_{S(i)}^2}}\right)$$

$N_S$: number of sectors

When integration points are given, a sector variable $y^S_1$ can be calculated by the following equation:

[Formula 32]

$$y_l^S = \frac{1}{\beta_S} \sum_{j=1}^{N_F} \alpha_{Sj} x_{l,j} \qquad (32)$$

where, $\beta_S$ is a value determined for each of the sectors by the second equation in formula 30 and $X_{1,j}$ is the jth component of the vector of formula 26.

Moreover, it is possible to perform approximate calculation for substantially reducing computational complexity of integration, which is an object of the present invention, while keeping sufficient accuracy through the calculation techniques explained below.

Increase in speed of calculation of a conditional moment generating function Methods for increasing the speed of numerical integration may be roughly divided into two types. One is a method of calculating an integral value with high precision even for a small number of integration points by employing a particular numerical integration algorithm. The other is a method of increasing speed of calculation for calculating a value of an integrand and reducing time for calculation per one integration point. An increase in speed in the present invention includes the increase in speed by the latter method. In this embodiment of the present invention, integration over common risk variables appearing in a portfolio function is quickly calculated by increasing speed of calculation of a conditional portfolio function for each of the integration points. Such a method is also effective when a large number of integration points are used. Therefore, the method can be applied to high-dimensional integration.

A method of calculating a moment generating function in this embodiment will be explained with reference to formulas. First, discretized valuation points used for calculation of a conditional moment generating function by sector are determined. The discretized valuation points in this embodiment are points set on the real straight line. The number of discretized valuation points is represented as $N_g$. A set of discretized valuation points is represented as $G=\{g_1, g_2, \ldots, g_{Ng}\}$ ($g_1 < g_2 < \ldots < g_{Ng}$). A method of determining the set G is described later. Subsequently, values of the conditional moment generating function by sector at the respective discretized valuation points are calculated. In other words,

[Formula 33]

$$f_{L_s}'(\lambda, g_m) \qquad (33)$$

is calculated for all the discretized valuation points for each of the sectors. The result of the calculation is stored in a storage device in association with the sectors and the discretized valuation points. Then, calculation of integration over common risk variables is executed on the basis of the following approximation formula:

[Formula 34]

$$\sum_{l=1}^{N_I} w_l \prod_{S=1}^{N_S} \hat{f}'_{L_S}(\lambda, y_l^S) \cong \sum_{l=1}^{N_I} w_l \prod_{S=1}^{N_S} \hat{f}'_{L_S}(\lambda, g_{m^{S_l}}) \qquad (34)$$

In other words, the following replacement is carried out for a conditional moment generating function by sector appearing in a process of numerical integration:

[Formula 35]

$$f_{L_s}'(\lambda, y^S_1) \Rightarrow f_{L_s}'(\lambda, g_{m^{s_1}}) \qquad (35)$$

where, $g_m^{S}{}_1$ is the value of the $m^S_1$th value of the point sequence and $y^S_1$ is the value of the sector variable for the sector S determined from the lth integration point. To reduce an error due to the approximation of formula 34, it is necessary to specify $m^S_1$ such that $g_m^{S}{}_1$ is close to the value of $y^S_1$. An example of this specifying method is described later. The value of the right side of formula 35 is stored in the storage device and can be retrieved if the sector S and $m^S_1$ are specified. By performing the calculation of formula 34 using this value, it is unnecessary to calculate a conditional moment generating function by sector for each of the integration points and speed of calculation of integration is substantially increased. In this embodiment, a calculation method is described under the assumption that a set of discretized valuation points is identical for all the sectors. However, since processing for determining $g_m^{S}{}_1$ from $y^S_1$ is performed for each of the sectors, the present invention can be carried out even if a set of discretized valuation point is different for each of the sectors. For example, even if the number and values of discretized valuation points are different for each of the sectors, a substantial increase in speed of integration calculation can be realized by a calculation method similar to that in this embodiment.

It is seen from the explanation of the calculation method described above that the calculation accuracy of a moment generating function depends on a method of determining the set G and a method of specifying $m^S_1$. In general, in numerical calculation, there is a tradeoff relation between calculation accuracy and calculation time. It is easy to improve either of the calculation accuracy or the calculation time at the sacrifice of the other. One of the significant characteristics of the present invention is to realize a significant increase in speed of calculation time while keeping high calculation accuracy. It is shown below that an error due to the approximation of formula 34 can be sufficiently reduced. First, in the case of $g_1 < y^S_1 < g_{Ng}$, if $N_g$ is set large, discretized valuation points can be set with sufficiently small intervals. After setting the discretized valuation points in this way, if $m^S_1$ is appropriately specified, the following expression can be always set to be equal to or lower than a fixed value:

[Formula 36]

$$|y^S_1 - g_{m^{s_1}}| \qquad (36)$$

This means that, since the following formula is a continuous function with respect to y:

[Formula 37]

$$f_{L_s}(\lambda, y) \quad (37)$$

it is possible to bring

[Formula 38]

$$f_{L_s}'(\lambda, g_{m^s_1}) \quad (38)$$

as close as possible to the following formula:

[Formula 39]

$$f_{L_s}'(\lambda, y^S_1) \quad (39)$$

In the case of $y^S_1 < g_1$ or $y^S_1 > g_{Ng}$, formula 36 cannot be set lower than a fixed value. However, since $Y^S$ is a random variable conforming to the standard normal distribution, if $g_1$ is set to be a negative value having a sufficiently large absolute value and $g_{Ng}$ is set to be a sufficiently large positive value, contribution from an integration area corresponding to such a sector variable to integration can be reduced to be extremely small. This means that, if appropriate values are set for $g_1$ and $g_{Ng}$ and a numerical integration method having sufficient accuracy is used, an error given by replacement of formula 35 to a result of numerical integration can be reduced to be extremely small. Therefore, if $N_g$ is set to be sufficiently large and the set G is appropriately determined, the right side of formula 34 can approximate the left side with quite high precision.

An existance range of discretized valuation points is set to cover most of a range in which the sector variable y are distributed. Fortunately, since a sector risk factor conforms to the standard normal distribution, when the interval [−5, 5] is set, realizations thereof fall in this range with a probability of higher than or equal to 99.9999%. This means that, even if discretized valuation points $g_m$ distributed in a finite range are used as alternatives to the sector variable y, an error caused by using the discretized valuation points $g_m$ can be controlled to be extremely small. An error involved in approximation of formula 34 is also affected by the number of discretized valuation points and the distribution of $g_m$ in the finite interval. According to examination carried out by the inventor, risk measures can be sufficiently accurately calculated, for example, by equally setting sixty-four discretized valuation points in the interval [−5, 5]. If the number of discretized valuation points is further increased, risk measures can be calculated with higher precision. In the present invention, even when the number of discretized valuation points is set to be several hundred, the calculation can be quickly carried out. Therefore, sufficiently high accuracy can be secured in practice.

The inventor examined a characteristic concerning accuracy of this embodiment from a practical viewpoint and found that a moment generating function can be sufficiently highly accurately calculated by setting the number and a range of discretized valuation points as described below and thereby specifying discretized valuation points used instead of integration points of sector variable.

(1) The number of point sequence $N_g$: about 64 to 256;
(2) A method of determining G: $g_m$ is arranged at equal spacing in the interval [−5, 5]; and
(3) A method of determining m: m that minimizes $|y^S_1 - g_m|$ is set as $m^S_1$.

When these methods are used, a moment generating function can be sufficiently quickly calculated. These methods are irrelevant to the method of selecting integration points and can be applied to an arbitrary numerical integration algorithm. For example, when the number of common risk factors is small, a moment generating function can be calculated by using the Good Lattice Point method. It is also possible to perform numerical integration by a method of Monte Carlo integration, i.e., by generating integration points with random numbers. The interval used in (2) above only has to be an interval that can cover most of the realizations of random variables conforming to the standard normal distribution and is not limited to [−5, 5]. When this interval is set as [Min_g, Max_g] and discretized valuation points are arranged at equal spacing, specific values of the discretized valuation points are given by the following:

[Formula 40]

$$g_m = \frac{\text{Max\_g} - \text{Min\_g}}{N_g - 1} \times (m - 1) + \text{Min\_g} \quad (40)$$

Calculation Process of Laplace Inversion

In this embodiment, calculation of Laplace inversion is performed by using the value of the moment generating function calculated in the calculation process described above. In order to efficiently perform this numerical calculation, first, integration in an infinite interval of Laplace inversion is represented by an infinite series and, then, a convergence acceleration method is used when the infinite series is calculated.

[Integration in an Infinite Interval of Laplace Inversion]

Laplace inversion is performed by the following integration:

[Formula 41]

$$f_L(t) = \frac{1}{2\pi i} \int_{\gamma - i\infty}^{\gamma + i\infty} e^{t\lambda} \hat{f}_L(\lambda) d\lambda \quad (41)$$

$$= \frac{1}{2\pi} \int_{-\infty}^{\infty} \exp[(\gamma + iu)t] \hat{f}_L(\gamma + iu) du$$

where, γ is a parameter for determining an integration path in performing Laplace inversion. An integration interval of this equation is an infinite interval. It cannot be expected that the integrand decays in a far-distant integration interval including infinity. Therefore, employing a particular technique is necessary to execute numerical integration.

In the present invention, first, integration calculation including an infinite interval included in Laplace inversion is represented by an infinite series. Then, a convergence acceleration method is used to realize calculation of the infinite series. Several algorithms for representing integration including an infinite interval appearing in Laplace inversion using an infinite series are known. There are algorithms such as the Gaver method, the Poisson method, the Laguerre method, and the Post-Widder method. In this embodiment, in particular, an integration calculation employing the Poisson method will be explained. However, the present invention is not limited to this.

A formula of Laplace inversion is approximated as an infinite series by using the Poisson method as follows:

[Formula 42]

$$f_L(t) \cong \frac{h}{2\pi}\left[\sum_{k=-\infty}^{\infty} \exp[(\gamma + ikh)t]\hat{f}_L(\gamma + ikh)\right] \quad (42)$$

$$= \frac{h}{\pi}\exp(\gamma t) \cdot \left[\frac{\hat{f}_L(\gamma)}{2} + \sum_{k=1}^{\infty} \mathrm{Re}\{\hat{f}_L(\gamma + ikh)\exp[ikht]\}\right]$$

where, h is a division width of the integration interval. The Poisson method is formally the same as the trapezoidal formula and is a method of approximating integration calculation using an infinite series. It is known that an error of the approximation is often extremely small. For example, in the following approximation by the Poisson method of a distribution function:

[Formula 43]

$$F_L(t) \cong \frac{h}{\pi}\exp(\gamma t) \cdot \left[\frac{\hat{F}_L(\gamma)}{2} + \sum_{k=1}^{\infty} \mathrm{Re}\{\hat{F}_L(\gamma + ikh)\exp[ikht]\}\right] \quad (43)$$

an approximation error in $0 \leq t \leq 2\pi/h$ is bounded above by $\exp(-2\pi\gamma/h)/(1-\exp(-2\pi\gamma/h))$. If the division width h of the integration section is set small, the approximation is extremely satisfactory. However, this approximation error is an expression in the case in which it is assumed that the infinite series of formula 43 can be calculated exactly. In actual numerical calculation, a truncation error caused by truncating the infinite series to a finite sum also has to be taken into account. However, since convergence of an infinite series itself obtained by the Poisson method is extremely slow, to reduce the truncation error to be sufficiently small, a large computational complexity is necessary. Therefore, speed of this calculation is increased by further using a convergence acceleration method.

[Convergence Acceleration Method]

Convergence acceleration method is a technique in calculation for efficiently calculating a series. Various methods are known as the convergence acceleration method. Representative examples of the convergence acceleration method include the $\epsilon$ method, the $\rho$ method, and the QD method. In this embodiment, in particular, the QD method is used. However, the present invention is not limited to this.

In general, to numerically calculate the value of an infinite series, convergence is faster when a formula of the infinite series is deformed into a form of continued fractions corresponding thereto and then the value of the formula is calculated than when respective terms of the infinite series are calculated to calculate a sum and calculate the value of the formula. As an example for explaining the degree of the convergence, using two representations of arctan(x) indicated by an infinite series as follows:

[Formula 44]

infinite series representation (44)

$$\arctan x = x\left\{1 + \sum_{k=1}^{\infty} \frac{(-1)^k x^{2k}}{2k+1}\right\}$$

and arctan(x) indicated by continued fractions as follows:

[Formula 45]

continued fraction representation (45)

$$\arctan x = \cfrac{x}{1 + \cfrac{x^2}{3 + \cfrac{(2x)^2}{5 + \cfrac{(3x)^2}{7 + \cdots}}}}$$

for numerical calculation of $\pi$ according to a formula 4arctan(1)=$\pi$ will be considered. In this example, when a calculation method by the series is used, even if calculation of the series up to one million terms is performed, only five decimal places are accurate. On the other hand, in a calculation method by continued fractions, if continued fractions up to ten layers are calculated, a value correct up to the sixth decimal place can be obtained. In this way, even when convergence is slow in the calculation by a infinite series, convergence may be fast in the calculation by continued fractions. In this embodiment, this characteristic of the representation of continued fractions is used in order to accelerate convergence.

A formula of Laplace inversion represented by an infinite series according to the Poisson method can be represented as follows using continued fractions:

[Formula 46]

$$f_L(t) \cong \frac{h}{\pi}\exp(\gamma t)\mathrm{Re}\left\{\sum_{k=0}^{\infty} c_k z^k\right\} \quad (46)$$

$$= \frac{h}{\pi}\exp(\gamma t)\mathrm{Re}\left\{a_0 \Big/ \left(1 + \left[\frac{a_k z}{1}\right]_{k=1}^{\infty}\right)\right\}$$

$$c_0 = \frac{1}{2}\hat{f}_L(\gamma), \; c_k = \hat{f}_L(\gamma + ikh) \; (k \geq 1), \; z = \exp(iht)$$

If $\gamma$ and h are set as follows ($t_{max}$ is a positive real number and n is a positive integer):

[Formula 47]

$$h = \frac{\pi}{2t_{max}}, \; \gamma = \frac{n+1}{4t_{max}}\ln 10 \quad (47)$$

an error of approximation of a distribution function according to the Poisson method when a loss t is in the interval $[0, 4t_{max}]$ can be controlled to be equal to or smaller than $10^{-n}$. In order to numerically calculate a value of Laplace inversion using formula 46, it is necessary to determine $t_{max}$ and n appearing in formula 47. According to the examination carried out by the inventor, if $\gamma$ and h are given by formula 47 with n set to be about 9 to 15, an error in the interval $[0, t_{max}]$ of the loss t in the case where a loss distribution is calculated by using the Poisson method and the QD method can be reduced to be sufficiently small. However, a method of determining $\gamma$ and h in the present invention is not limited to formula 47. $[t_{max}, 4t_{max}]$ is excluded from the interval for calculating a loss distribution because it is possible that an error increases in this interval because of the influence of a truncation error. The value of $t_{max}$ appearing in formula 47 is set according to a calculation range of a density function and a distribution function. When this value is increased, a range of measurable losses expands and, on the other hand, convergence speed of an infinite series falls. Therefore, if an unnecessarily large value is used for $t_{max}$, computational complexity necessary for attaining fixed calculation accuracy increases.

In this embodiment, in particular, a method called QD (quotient difference algorithm) method is used to calculate continued fractions from an infinite series. In formula 46, since the loss t appears only in z and t is not contained in $c_k$, t is not contained in a coefficient $a_k$ of the continued fractions either. Therefore, calculation can be efficiently performed even if the loss is changed.

If coefficients $\{a_0, a_1, a_2, \ldots\}$ of the continued fractions is calculated by the QD method or the like, a value of a density function can be highly accurately and quickly calculated for an arbitrary loss t. In other words, the following calculation only has to be performed for respective values of the loss t.

[Formula 48]

$$f_L(t) = \frac{h}{\pi} \exp(\gamma t) \operatorname{Re}\left\{ a_0 \Big/ \left(1 + \left[\frac{a_k z(t)}{1}\right]_{k=1}^{\infty}\right) \right\} \quad (48)$$

The QD method is a mathematical method for calculating coefficients of continued fractions in performing continued fraction expansion. Specifically, according to the QD method, coefficients of continued fractions satisfying the following formula:

[Formula 49]

$$a_0 \Big/ \left(1 + \left[\frac{a_k z}{1}\right]_{k=1}^{\infty}\right) = c_0 + \sum_{k=1}^{\infty} c_k z^k \quad (49)$$

is given by the following formula:
[Formula 50]

$a_0 = c_0$ $a_{2k} = -e_k^{(0)}, \ a_{2k-1} = -q_k^{(0)} \ (k=1,2,\ldots) \quad (50)$ where,
[Formula 51]

$$e_0^{(i)} = 0, \ q_1^{(i)} = \frac{c_{i+1}}{c_i} \ (i = 0, 1, \ldots) \quad (51)$$

$$e_k^{(i)} = e_{k-1}^{(i+1)} + q_k^{(i+1)} - q_k^{(i)}, \ q_{k+1}^{(i)} = \frac{q_k^{(i+1)} \cdot e_k^{(i+1)}}{e_k^{(i)}}$$

In representing the continued fractions, the following representation is used.

[Formula 52]

$$b_0 + \frac{a_1}{b_1} + \frac{a_2}{b_2} + \frac{a_3}{b_3} + \ldots + \frac{a_n}{b_n} = b_0 + \left[\frac{a_k}{b_k}\right]_{k=1}^n \quad (52)$$

(finite continued fractions)

$$b_0 + \frac{a_1}{b_1} + \frac{a_2}{b_2} + \frac{a_3}{b_3} + \ldots = b_0 + \left[\frac{a_k}{b_k}\right]_{k=1}^{\infty}$$

(infinite continued fractions)

Figure 12:
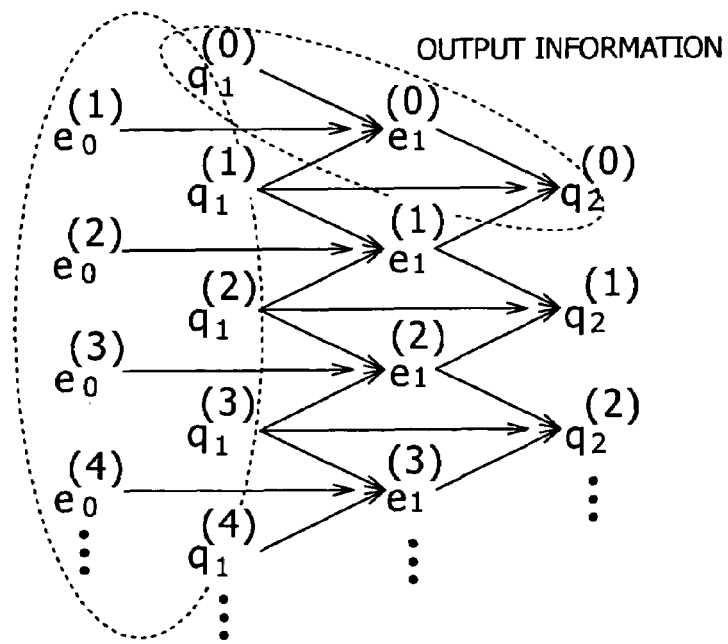
FIG. 12 is an explanatory diagram showing a procedure of processing for calculating a coefficient of continued fractions according to a calculation procedure of QD algorithm.

A procedure for calculating coefficients according to the QD algorithm described here is shown in FIG. 12. According to this calculation procedure, it is seen that values of output data are sequentially determined from input data by a simultaneous recursive formula and coefficients of desired continued fractions are calculated by combining the values and equations of the formula 50.

In actual numerical calculation, it is necessary to truncate continued fractions at a finite layer. According to formula 50 and formula 51, in order to calculate M coefficients of a continued fraction, it is necessary to give M coefficients of a series as initial values. In the following explanation, the number of terms at which calculation of a series is truncated is represented as $N_k$. From the above description, when the number of coefficients of continued fractions to be calculated is represented as M, $N_k = M$. By using the method of continued fractions, it is possible to calculate an approximate value of an infinite series with extremely higher precision than approximating an infinite series using a sum of $N_k$ terms. In general, calculation accuracy becomes higher as $N_k$ is set larger. On the other hand, calculation time becomes longer. Therefore, $N_k$ should be determined with a tradeoff between calculation speed and calculation accuracy taken into account. According to the examination carried out by the inventor, if $N_k$ is set to be about 50 to 200, it is possible to sufficiently highly accurately perform risk measurement. In the Poisson method, $c_k$ is given by the first equation at the bottom of formula 46. Therefore, in order to perform Laplace inversion by combining the Poisson method and the QD method, it is necessary to calculate values of a moment generating function for $N_k$ different values of the auxiliary variable. In this way, in order to numerically perform Laplace inversion, it is necessary to calculate values of the moment generating function for plural values of the auxiliary variable. The calculation of the moment generating function is executed by using the fast calculation method for the moment generating function described above.

After the coefficients of the continued fraction are calculated by the QD method, the value of a density function for the loss t can be calculated by performing calculation on the right side of formula 48. In evaluating the continued fraction necessary for this calculation, a method of using a recursive formula is known. Specifically, when

[Formula 53]

$$g(z, M) = a_0 \Big/ \left(1 + \left[\frac{a_k z}{1}\right]_{k=1}^{M}\right) \quad (53)$$

is defined and sequences $\{A_{-1}, A_0, A_1, \ldots, A_M\}$ and $\{B_{-1}, B_0, B_1, \ldots, B_M\}$ are set as follows:

[Formula 54]

$A_{-1} = 0, \ B_{-1} = 1, \ A_0 = a_0, \ B_0 = 1$ $A_k = A_{k-1} + a_k z A_{k-2}, \ B_k = B_{k-1} + a_k z B_{k-2} \quad (54)$ the following equation holds:

[Formula 55]

$$g(z, M) = \frac{A_M}{B_M} \quad (55)$$

To apply this method to calculation of a moment generating function, in calculation of the recursive formula in formula 54, it is sufficient to use values of formula 50 that are coefficients of the continued fractions obtained by the Poisson method and the QD method as $\{a_0, a_1, a_2, \ldots\}$ and use z determined from the loss t by the equation at the bottom of formula 46 as z. When the coefficients of the continued fractions are determined in this way, calculation for calculating values of the continued fractions can be reduced to calculation by the recursive formula. Since calculation of formula 54 and formula 55 can be executed by only the four arithmetic operations, it is possible to extremely quickly execute the calculation for calculating values of the continued fractions.

[Calculation of a Density Function]

The method of calculating Laplace inversion performed by combining the Poisson method and the QD method is called de Hoog algorithm named after the proposer of the method. The inventor found that, by calculating a density function or a distribution function using the de Hoog algorithm, the density function or the distribution function can be highly accurately calculated including the tail of a distribution. The inventor also confirmed that this calculation method is highly stable with respect to parameters and, for example, even if the number of terms $N_k$ for truncating Ck of the equation at the bottom of formula 46, deficiencies such as a sudden increase in error less easily occur. Moreover, in the de Hoog algorithm, once the coefficients of continued fractions are calculated, the probability for an arbitrary loss can be immediately calculated. Therefore, it is possible to extremely quickly calculate the entire probability distribution.

A density function can be quickly calculated by combining the calculation method for moment generating function and the de Hoog algorithm. For this purpose, it is necessary to calculate the values of moment generating function for $N_k$ auxiliary variables $\lambda_0, \lambda_1, \ldots, \lambda_{Nk-1}$. $\lambda_k$ is given by the following equation:

[Formula 56]

$$\lambda_k = \gamma + ikh \quad (56)$$

Calculation of the values of moment generating function for the $N_k$ auxiliary variables $\lambda_1, \lambda_1, \ldots, \lambda_{Nk-1}$ can be performed by simply repeating the calculation of moment generating function $N_k$ times. The calculation can also be realized by a method of calculating the values of all conditional moment generating functions by sector necessary for executing numerical integration in advance and calculating $N_k$ moment generating functions in parallel in one loop of numerical integration.

When the Nk moment generating functions are calculated in parallel in one loop of numerical integration, all values of conditional moment generating functions by sector necessary in the loop of numerical integration are stored in the storage device. Specifically, the values of all conditional moment generating functions by sector are stored for each of the values of discretized valuation points and for each of the values of the auxiliary variable. For this purpose, it is necessary to store $N_g \times N_k \times N_s$ complex number data in the storage device. Since typical sizes of $N_g$, $N_k$, and $N_s$ are respectively about several tens to several hundred, the complex number data can be sufficiently stored in a main memory. In particular, when it is attempted to realize the present invention with a computer, it is possible to adopt implementation in which the size of the storage area necessary in a calculation process depends on neither the number of obligors nor the number of integration points. Therefore, even when risk measurement for a large portfolio with the number of obligors being as large as several million to several tens of millions and a numerical integration algorithm requiring the number of integration points equal to or larger than one million are used, risk measurement can be carried out without changing the structure of the apparatus. It is one of the significant advantages of the present invention that implementation with a small storage area used in the calculation process is possible.

When the coefficients of continued fractions are calculated by the QD method, the values of a density function can be calculated according to formula 48 and various risk measures can be calculated by a normal method of numerical calculation using the values of the density function. The risk measures are, for example, expected loss and are numerical measures used for actual management of a portfolio. Therefore, the risk measures can be displayed by a display device in a form recognizable by a user from a computer implemented with the calculation method when necessary. In that case, it is also possible that the risk measures are displayed as numerical values or graphs, printed by a printer or the like, or stored in appropriate storage means for later use. Therefore, it is evident that the present invention embodied in this embodiment is sufficiently useful.

A method of approximating formula 41 by formula 42 and calculating a value with formula 46 can be used not only for calculating a density function. To calculate a distribution function, the same calculation only has to be carried out by using formula 43 instead of formula 42. Even when risk contributions on the VaR basis and the CVaR basis, which will be described later, are calculated, representations equivalent to formula 41 can be performed by using integrands corresponding thereto, respectively. Therefore, a method up to formula 48 can be applied in the same manner according to the integrands.

[Characteristics of the Calculation Method According to this Embodiment]

The characteristics of the calculation method described above are further explained in terms of calculation speed and calculation accuracy. First, in order to explain calculation speed, calculation of the value of moment generating function for a certain given auxiliary variable $\lambda$ is considered. To calculate the following moment generating function on the basis of formula 31:

[Formula 57]

$$f_L(\lambda, \vec{x}) \quad (57)$$

(N−1) times of calculation of a product of complex number data is necessary for respective integration points. N is the number of obligors (the number of companies included in the entire portfolio). To calculate the following unconditional moment generating function:

[Formula 58]

$$f_L(\lambda) \quad (58)$$

it is necessary to further multiply the weights corresponding to integration points in the space of common risk variables $x_j$ and calculate a sum for all the integration points. If this is simply converted into a program, when the number of obligors N and the number of integration points $N_I$ are used, $N \times N_I$ times of loop is executed per one auxiliary variable.

In the case of an actual portfolio, the number of obligors N and the number of integration points $N_I$ can be relatively large numbers. In the case of a small portfolio with the number of obligors being as small as about several hundred or when there are only several common risk factors, it is not impossible to calculate a moment generating function even with such a calculation method. However, in the case of a business of operating a real portfolio, these conditions concerning the number of obligors and the number of common risk factors are significant limitations. Actually, in a portfolio of an entire bank, in general, the number of obligors N reaches several tens of thousands to several million. It is not rare that ten to twenty to several tens common risk factors are used. In such cases, Monte Carlo integration is an effective option. However, in order to highly accurately measure the credit VaR at a high confidence interval as high as 99.97% in Monte Carlo integration, it is necessary to prepare at least about one million integration points. Therefore, in the practice of credit risk management, when a moment generating function is calculated by the calculation method based on formula 31, calculation time is enormously long and practicality is low.

As opposed to these conventional methods, one of the important points in the approximation calculation based on the right side of formula 34 in this embodiment is that the following formula:

[Formula 59]

$$f_{L_s}'(\lambda, g_m) \tag{59}$$

does not depend on integration points and can be calculated if discretized valuation points are determined. From a viewpoint of numerical calculation, the method according to this embodiment has an advantage that it is possible to calculate formula 59 in advance on the outside of repeated calculation for integration points and store the formula 59 in the storage means of the computer. In this case, in the loop concerning integration points, $m^s_1$ is simply specified for each of the sectors and the following product is calculated:

[Formula 60]

$$\prod_{S=1}^{N_S} \hat{f}'_{L_s}(\lambda, g_{m_i^s}) \tag{60}$$

This is a product of $N_S$ complex number data and can be extremely quickly calculated. In this way, in the calculation based on formula 34, it is possible to completely separate a loop concerning obligors and a loop concerning integration points and substantially reduce the number of times of repeated calculation. Actually, when calculated by the method described here, the number of times of loop per one auxiliary variable is estimated as about $(N_g \times N + N_S \times N_I)$ times using the number of discretized valuation points $N_g$ and the number of sectors $N_S$. Since typical values of $N_g$ and $N_S$ are about several tens to several hundred, it is evident that computational complexity can be substantially reduced compared with the number of times of loop ($N \times N_I$) in the example described above for comparison.

At the stage when Laplace inversion is executed, it is necessary to calculate the values of moment generating functions for $N_k$ values of the auxiliary variable, respectively. Therefore, to calculate a density function and a distribution function, the number of times of loop which is $N_k$ times as large as the number of times of loop described above is necessary in all the methods.

Calculation accuracy of the present invention will now be explained. In general, in credit risk management, it is important to highly accurately calculate the tail of a loss distribution. For this purpose, it is necessary to extremely highly accurately execute numerical integration over common risk variables. As it is evident from the above explanation, compared with the calculation of a moment generating function based on formula 31, the method of the present invention requires extremely small computational complexity necessary per one integration point. Therefore, even when the number of integration points is substantially increased, calculation time does not increase much. Actually, the method according to this embodiment is sufficiently quickly executable even when the number of integration points is set to be several million. Even when Monte Carlo integration with slow convergence is used, a moment generating function can be highly accurately calculated. Monte Carlo integration is a numerical integration algorithm with slow convergence. On the other hand, Monte Carlo integration has a characteristic that convergence speed does not depend on the dimension of integration. Therefore, when Monte Carlo integration is adopted as a numerical integration algorithm, dependency of calculation speed and calculation accuracy on the number of common risk factors can be reduced to be extremely small. In general, it is extremely difficult to quickly and highly accurately execute high-dimensional numerical integration. Therefore, integration in the space of a multi-dimensional random variable vector $X_t$ involves serious difficulty. By combining the method of the present invention and Monte Carlo integration, i.e., by using Monte Carlo integration for calculation of integration over common risk variables, it is possible to overcome even the difficulty of high-dimensional integration in the multi-factor model.

Measurement accuracy of the present invention is described in comparison with a Monte Carlo simulation, which is a general method in risk measurement. In the Monte Carlo simulation, one loss scenario is generated for one set of common risk variables generated by random numbers. On the other hand, in the method of the present invention, a conditional moment generating function is calculated for one set of common risk variables (integration points). Since information equivalent to a conditional loss distribution under the condition that common risk variables are given is included in the conditional moment generating function, an information amount for one set of common risk variables is much larger in the method of the present invention. Therefore, when compared with the Monte Carlo simulation having the number of scenarios same as the number of integration points used for calculation of a moment generating function, in the method of the present invention, an information amount concerning loss caused by a portfolio is larger and measurement can be more highly accurately performed.

In addition, the calculation method according to this embodiment is a method having a significant advantage in carrying out risk measurement of a large portfolio. As it is evident from the explanation concerning calculation time, in this embodiment, time-consuming calculation of numerical integration can be carried out irrespective of the number of obligors of a portfolio. Therefore, the dependency of total calculation time on the number of obligors is extremely moderate and calculation can be quickly carried out even for a large portfolio. On the other hand, in the calculation based on formula 25 and the Monte Carlo simulation method, overall calculation time is generally proportional to the number of obligors. Therefore, as the number of obligors of a portfolio increases, the effect of a reduction in calculation time by the present invention becomes larger.

In order to realize the method of the present invention represented by the formula using complex numbers as described above using a computer, in the respective embodiments of the present invention, it may be necessary to perform numerical calculation using complex numbers. Specific examples of the numerical calculation include processing of the four arithmetic operations for complex numbers and processing for calculating the value of the exponential function with respect to complex numbers. In this case, the real part and imaginary part of a complex number are represented by real numbers, respectively. Therefore, processing concerning complex numbers can be described on a computer by securing memory areas for the real parts and imaginary parts of complex numbers, respectively, and performing arithmetic operations separetely for the real parts and the imaginary parts. The method of the present invention can also be realized by using other methods of treating complex numbers on a computer. A programming method in carrying out the calculation of complex numbers used for the explanation of the present invention using a computer is not limited to a specific one. This embodiment can be realized by various implementation forms and various programming methods with which numerical calculation can be carried out. For example, in the C++ language, processing for complex numbers can be described in the same manner as processing for real numbers by defining a data type of a complex number type and using overload functions of functions and operators.

Second Embodiment

In another embodiment of the present invention, the present invention can be carried out in calculation of other risk measures in which the same techniques as those in the process for performing risk measurement from information concerning a portfolio is effective. An example of calculation of risk contribution as the risk measure is explained below.

Risk contribution is a numerical value defined by the following equation:

[Formula 61]

$$RC_i^{VaR} = \frac{\partial VaR}{\partial E_i} \quad (61)$$

In other words, risk contribution is the ratio of the amount of change of a credit VaR to a very small change in the exposure $E_i$ of the company "i". Since VaR is a homogeneous function of degree 1 of exposures $E_1, E_2, \ldots, E_N$, the following equation is obtained by applying the Euler's homogeneous function theorem:

[Formula 62]

$$\sum_{i=1}^{N} E_i \cdot RC_i^{VaR} = VaR \quad (62)$$

The respective terms forming the sum on the left side of formula 62 can be interpreted as representing a risk amount for each of the companies. This amount is represented as follows:

[Formula 63]

$$EC_i = E_i \cdot RC_i \quad (63)$$

This is called the economic capital of the company "i" and has an important meaning in credit risk management.

In the following description, the distribution function of a loss distribution is represented as $F_L(E_i, t)$, where t is the loss caused by an entire portfolio and Ei is the exposure of the company "i". When the confidence interval used for calculation of VaR is represented as p, the following equation holds:

[Formula 64]

$$F_L(E_i, VaR) = p \quad (64)$$

The following expression of the risk contribution is obtained by differentiating this equation by $E_i$:

[Formula 65]

$$\frac{\partial VaR}{\partial E_i} = -\frac{\partial F_L}{\partial E_i}\bigg|_{t=VaR} / f_L(VaR) \quad (65)$$

The numerator on the right side of this equation is written in a form of partial differential of the distribution function. From formula 28, this can be explicitly written as follows:

[Formula 66]

$$\frac{\partial F_L}{\partial E_i} = \frac{-1}{2\pi i} \int_{-\infty+i\gamma}^{\infty+i\gamma} \exp(\lambda t) \quad (66)$$

$$\int_{\vec{x} \in R^{N_F}} \frac{p_i(\vec{x}) \exp(-\lambda E_i)}{1 - p_i(\vec{x}) + p_i(\vec{x}) \exp(-\lambda E_i)} \hat{f}_L(\lambda, \vec{x}) \phi_{N_F}(\vec{x}) d\vec{x} d\lambda$$

where,

[Formula 67]

$$\hat{f}_L(\lambda, \vec{x}) = \prod_{i=1}^{N} \{1 - p_i(\vec{x}) + p_i(\vec{x}) \exp(-\lambda E_i)\} \quad (67)$$

The value of VaR necessary for calculating formula 65 and the like can be calculated by the method of calculating a distribution function according to the first embodiment.

From formulas 62 and 65, the following equation holds:

[Formula 68]

$$f_L(VaR) = -\frac{\sum_i E_i \frac{\partial F_L}{\partial E_i}\bigg|_{t=VaR}}{VaR} \quad (68)$$

Therefore, the economic capital of the company "i" can also be represented as follows:

[Formula 69]

$$EC_i = \frac{E_i \frac{\partial F_L}{\partial E_i}|_{t=VaR}}{\sum_i E_i \frac{\partial F_L}{\partial E_i}|_{t=VaR}} \cdot VaR \qquad (69)$$

Since, The denominator of formula 65 is a density function per se, the denominator can be calculated by the method according to the first embodiment. When the risk contributions of all the obligors are calculated, formula 69 can be used. The right side of formula 66 is written in a form of Laplace inversion. If the calculation method of the following formula is given:

[Formula 70]

$$\frac{\partial \hat{F}_L(\lambda)}{\partial E_i} = -\int_{\vec{x} \in R^{N_F}} \frac{p_i(\vec{x})\exp(-\lambda E_i)}{1 - p_i(\vec{x}) + p_i(\vec{x})\exp(-\lambda E_i)} \hat{f}_L(\lambda, \vec{x}) \phi_{N_F}(\vec{x}) d\vec{x} \qquad (70)$$

the right side of formula 66 can be calculated by using the Poisson-QD method (de Hoog algorithm) explained in relation to the first embodiment. Actually, as described below, formula 70 can be extremely quickly calculated.

A method of quickly executing the calculation of formula 70 by applying discretization of sector risk factors of the present invention is described. First, the following quantity is defined:

[Formula 71]

$$R_i(\lambda, \vec{x}) = -\frac{p_i(\vec{x})\exp(-\lambda E_i)}{1 - p_i(\vec{x}) + p_i(\vec{x})\exp(-\lambda E_i)} \qquad (71)$$

When this quantity is used, by using the following appropriate sequence of weight sand integration points:

[Formula 72]

$$(w_l, \vec{x}_l) \qquad (72)$$

formula 70 can be represented as follows:

[Formula 73]

$$\frac{\partial \hat{F}_L(\lambda)}{\partial E_i} = \sum_{l=1}^{N} w_l R_i(\lambda, \vec{x}_l) \hat{f}_L(\lambda, \vec{x}_l) \qquad (73)$$

where,

[Formula 74]

$$R_i(\lambda, \vec{x}) \qquad (74)$$

includes only the probability of loss occurrence of the company "i". Therefore, this depends on common risk factors only through the sector risk factor of the sector to which the company "i" belongs. Therefore, a function concerning a sector variable can be defined as follows:

[Formula 75]

$$R'_i(\lambda, y) = -\frac{p'_i(y)\exp(-\lambda E_i)}{1 - p'_i(y) + p'_i(y)\exp(-\lambda E_i)} \qquad (75)$$

The functions represented by formulas 71 and 75 are examples of risk contribution measure function.

In order to increase speed of calculation by discretizing the sector risk variable appearing in the above equation, the following symbol is introduced:

[Formula 76]

$$R_i^{(m)}(\lambda) \equiv R'_i(\lambda, g_m) \qquad (76)$$

Then, the following approximate formula of formula 73 is obtained:

[Formula 77]

$$\frac{\partial \hat{F}_L(\lambda)}{\partial E_i} \cong \sum_{l=i}^{N} w_l R_i^{(m^{S(i)}_l)}(\lambda) \hat{f}_L(\lambda, \vec{x}_l) \qquad (77)$$

In the equation,

[Formula 78]

$$m^{S(i)}_l \qquad (78)$$

appearing in the right side of formula 77 is the same as $m^S_l$ appearing in formula 60 and is a suffix for specifying a discretized valuation point. This takes at most the following number of different values only:

[Formula 79]

$$N_g \qquad (79)$$

A point for increasing speed of risk contribution calculation is that, in the sum of formula 77, the terms with

[Formula 80]

$$R_i^{(m)}(\lambda) \qquad (80)$$

taking an identical value are factorized. The following symbols are introduced:

[Formula 81]

$$L^S_m = \{l \mid y^S_l = g_m, g_m \in G\} \qquad (81)$$

$$P^S_m = \sum_{l \in L^S_m} w_l \hat{f}_L(\lambda, \vec{x}_l)$$

$$\cong \sum_{l \in L^S_m} w_l \prod_{S'=1}^{N_S} \hat{f}'_{L_{S'}}(\lambda, g_{m^{S'}_l})$$

When these equations are used, the right side of formula 77 can be rewritten as follows:

[Formula 82]

$$\sum_{l=i}^{N} w_l R_i^{(m^{S(i)}l)}(\lambda)\hat{f}_L(\lambda, \vec{x}_l) \cong \sum_{m=1}^{N_S} R_i^{(m)}(\lambda) P_m^{S(i)} \quad (82)$$

where,

[Formula 83]

$$P_m^S \quad (83)$$

does not include the suffix "i" representing individual companies. This means that it is unnecessary to calculate

[Formula 84]

$$P_m^S \quad (84)$$

for each of the companies and only has to be calculated once for a portfolio. Moreover, to calculate

[Formula 85]

$$P_m^S \quad (85)$$

the following formula is necessary:

[Formula 86]

$$f_{L_s}'(\lambda, g_{m^s 1}) \quad (86)$$

This is calculated at the time of risk measurement (i.e., at the time when the first embodiment is carried out) (see formulas 34 and 35). Therefore, it is possible to efficiently execute the calculation of formula 70 by calculating and storing

[Formula 87]

$$P_m^S \quad (87)$$

in a memory simultaneously with risk measurement.

The number of terms is $N_g$ on the right side of formula 82. It is a significant advantage of this calculation method that calculation can be performed in $N_g$ times of loop. On the other hand, in the calculation based on formula 73, $N_I$ times of loop equivalent to the number of integration points is necessary. It is likely that $N_I$ is of the order from several tens of thousands to several million and, on the other hand, $N_g$ is of the order from several tens to several hundred. This is a significant factor of an increase in speed of calculation. The number of times of loop can be set irrespective of the number of integration points in this way because discretization of sector risk variables, i.e., approximation using discretized valuations point is performed.

It is possible to calculate formula 66 by combining the calculation method of formula 70 and the Poisson-QD method (the de Hoog algorithm) described above. For this purpose, it is necessary to execute the calculation of formula 70 for the $N_K$ auxiliary variables $\lambda_0, \lambda_1, \ldots, \lambda_{Nk-1}$ given by formula 56 and calculate coefficients used in the QD method. To execute this calculation, first, the following array is calculated and stored in the storage device at the time of risk measurement:

[Formula 88]

$$P_{m,k}^S = \sum_{l \in L_m^S} w_l \prod_{S'=1}^{N_S} \hat{f}_{L_{S'}}'(\lambda_k, g_{m S'_l}) \quad (88)$$

To perform calculation concerning, for example, the company "i", the following equations are calculated with respect to $k=0, 1, \ldots, N_k-1$:

[Formula 89]

$$c_0 = \frac{1}{2}\sum_{m=1}^{N_S} R_i^{(m)}(\lambda_0) P_{m,0}^{S(i)}, \quad c_k = \sum_{m=1}^{N_S} R_i^{(m)}(\lambda_k) P_{m,k}^{S(i)} \quad (k=1, \ldots, N_k-1) \quad (89)$$

The QD algorithm of formulas 50 and 51 is executed by using these equations. Then, formulas 54 and 55, which are calculation of evaluation of continued fractions, only have to be executed and multiplied by the coefficient appearing in front of the continued fractions of formula 46.

The array of formula 88 is $N_g \times N_k \times N_s$ complex numbers and has a size that can be sufficiently stored in a main memory. When a main memory is used as the storage device for storing formula 88, it is possible to quickly retrieve the array and extremely quickly execute the calculation itself. Moreover, since the computational complexity of formula 88 does not depend on the number of integration points, once formula 88 is calculated at the time of risk measurement, the calculation time necessary for calculation of risk contributions does not depend on the number of integration points. Therefore, when the calculation method according to the present invention is used, it is possible to extremely quickly and highly accurately calculate risk contributions.

In this way, the method of calculating risk contributions according to the present invention is extremely fast. Therefore, even in a portfolio having a size of several hundred companies, risk contributions or economic capitals can be calculated for all the obligors.

Third Embodiment

As still another embodiment of the present invention, a calculation method for calculating risk contribution on the CVaR basis will be explained. In the case of CVaR, risk contribution is represented as follows by a representation similar to formula 61:

[Formula 90]

$$RC_i^{CVaR} = \frac{\partial CVaR}{\partial E_i} \quad (90)$$

Concerning risk contribution on the CVaR basis, a calculation method with the Monte Carlo simulation method is known. However, even the Monte Carlo simulation method is not a practical method because an enormous number of trials is necessary to accurately calculate risk contributions in particular at a high confidence interval. Here, again, by using the method of fast Laplace inversion, it is possible to quickly and highly accurately calculate risk contributions on the CVaR basis.

First, CVaR is rewritten as follows:

[Formula 91]

$$CVaR \equiv \frac{1}{1-p} \int_{VaR}^{\infty} t f_L(t) dt$$

$$= \frac{1}{1-p} \left\{ EL - \int_0^{VaR} t f_L(t) dt \right\}$$

$$= \frac{1}{1-p} \left\{ EL - p \cdot VaR + \int_0^{VaR} F_L(t) dt \right\}$$

where,

[Formula 92]

$$EL = \sum_{i=1}^{N} E_i \cdot PD_i = \int_0^{\infty} t f_L(t) dt \qquad (92)$$

Consequently, the following equation holds:

[Formula 93]

$$\frac{\partial CVaR}{\partial E_i} = \frac{1}{1-p} \left\{ PD_i - p \cdot \frac{\partial VaR}{\partial E_i} + \frac{\partial VaR}{\partial E_i} \cdot F_L(VaR) + \int_0^{VaR} \frac{\partial F_L}{\partial E_i} dt \right\} \qquad (93)$$

$$= \frac{1}{1-p} \left\{ PD_i + \int_0^{VaR} \frac{\partial F_L}{\partial E_i} dt \right\}$$

The second term in braces on the right side of the second row of formula 93 can be represented as follows from formula 66 and the formula of Laplace transform of integration:

[Formula 94]

$$\int_0^{VaR} \frac{\partial F_L}{\partial E_i} dt = -\frac{1}{2\pi i} \int_{-\infty+i\gamma}^{\infty+i\gamma} \left[ \frac{\exp(\lambda \cdot VaR)}{\lambda} \int_{\vec{x} \in R^*} \frac{p_i(\vec{x}) \exp(-\lambda E_i) \hat{f}_L(\lambda, \vec{x}) \phi_n(\vec{x})}{1 - p_i(\vec{x}) + p_i(\vec{x}) \exp(-\lambda E_i)} d\vec{x} \right] d\lambda \qquad (94)$$

$$= L_\lambda^{-1} \left[ \frac{1}{\lambda} \frac{\partial \hat{F}_L(\lambda)}{\partial E_i} \right]_{t=VaR}$$

$L_\lambda^{-1}[\ldots]$ of the second equation indicates that the expression in braces is subjected to Laplace inversion with respect to $\lambda$. The expression in braces is obtained by simply dividing the integrand on the right side of formula 66 by the auxiliary variable $\lambda$. Therefore, completely in the same manner as the calculation of formula 66, formula 94 can be highly accurately and quickly calculated by the calculation of the present invention.

Fourth Embodiment: Implementation by Fourier Transform

In the present invention, as still another embodiment, an embodiment in which Fourier transform is used instead of Laplace transform is also possible. As is obvious for those skilled in the art, when the characteristic function obtained by subjecting a probability density function to Fourier transform is used, the mathematic discussion indicated by executing Laplace transform on a probability density function can be developed in the same manner. The same applies when a function related to the probability distribution of losses other than probability density function is calculated. In this embodiment, all the kinds of processing for executing Laplace transform in the respective embodiments described above are changed to processing for executing Fourier transform. All the kinds of processing for executing Laplace inversion in the embodiments are changed to processing for executing inverse Fourier transform. Therefore, the flow of the processing is the same as that in the embodiments. In Fourier transform, instead of the auxiliary variable used for Laplace transform, the same auxiliary variable multiplied by the imaginary unit are used. Therefore, the integration paths of inverse transform are also different. Because of these differences, a part of the processing is different from the processing based on Laplace transform indicated by the respective embodiments described above. However, the change from the processing for Laplace transform to the processing for Fourier transform is easy for those skilled in the art. Techniques in calculation specific to the Fourier transform method are also possible. For example, in order to quickly execute inverse Fourier transform, it is also possible to use a method of fast Fourier transform such as a butterfly computation. In the following description, unless specifically noted otherwise, the embodiments in which Laplace transform is used are described. However, the same applies to this embodiment in which Fourier transform is used.

EXAMPLES

A specific method for implementing the calculation methods according to the respective embodiments described above on a computer and a result of the specific method will be explained below with reference to the accompanying drawings.

Example 1

Example 1 is an example of implementation of an embodiment of the present invention and indicates a form of implementation in the case of the default mode. However, unless specifically noted otherwise, characteristics applicable to the MtM mode as well are included in the example. FIG. 1 is a block diagram showing a configuration of a computer used in common in examples of the embodiment of the present invention in which Laplace transform is used. Bridge circuits 112 and 114 that provide interfaces with a memory, a graphics card, and an input and output are connected to arithmetic means 102 such as an appropriate microprocessor unit (MPU). The bridge circuit 112 connects the arithmetic means 102 to a main memory 108 and a graphic processing unit 110 through CPU buses 104 and 106 that have sufficient band widths. The bridge circuit 114 is connected to the bridge circuit 112 by a dedicated bus 116. The bridge circuit 114 is further connected to a hard disk drive 118 and an optical drive 120 by busses 132 and 134 such as IDE interfaces and connected to external input/output terminals 122 and 124 such as USBs by busses 136 and 138. A sound processing circuit 128, a network interface 130, and a card slot 126 are connected to the bridge circuit 114 by a bus 140 such as a PCI bus.

A hardware configuration of the computer for implementing the respective embodiments of the present invention is not specifically limited to this configuration. The computer may be configured to perform an arithmetic operation through cooperation of plural MPUs, may include one or more dedicated numerical arithmetic units according to a form of a numerical arithmetic operation, or may be configured in clusters divided in plural housings and connected to one another through a network. Functional means distinguishingly described not only in example 1 but also in the entire present invention are substantially realized by an arbitrary component that plays such distinguished functions. In this case, the present invention is not limited by attributes that are not limitations in performing the functions, such as how many components are physically provided or, when there are plural components, what kind of a positional relation the components have. For example, execution of plural distinguished functions at different times by a single component is included as an embodiment of the present invention.

A software configuration for performing numerical calculation in the computer implemented with the functional processing according to the respective embodiments of the present invention can be an arbitrary configuration as long as the numerical information processing according to the respective embodiments of the present invention is realized. The computer is mounted with software for hardware control such as a basic input/output system (BIOS) and managed by an operating system (OS) that operates in cooperation with the software and performs file input and output and allocation of hardware resources. The OS can execute, on the basis of, for example, an explicit command, an indirect command from the user, and commands from other programs, an application program that operates in cooperation with the OS and the hardware. The application program is appropriately programmed to depend on a procedure defined by the OS or not to depend on the OS such that the application program makes such operations possible and operates in relation to the OS. When the respective embodiments of the present invention are implemented, in general, processing such as numerical calculation and file input and output is implemented in a form of a dedicated application program. However, the present invention is not limited to only a dedicated application program. The present invention can also be realized by using plural dedicated or general-purpose application programs or using an existing numerical calculation library partly, can be realized by a network programming method to be processed by hardware of other computers, or can be realized by other arbitrary implementation forms. Therefore, software representing a series of commands for implementing the calculation methods on the computer according to the respective embodiments of the present invention is simply referred to as a calculation program. The calculation program is represented by an arbitrary form executable by the computer or an arbitrary form that can be finally converted into such a form.

Calculation programs according to the respective embodiments of the present invention are configured such that the arithmetic means such as an MPU as a hardware resource receives commands from the calculation programs through the OS or not through the OS, cooperates with storage means such as a main memory or an auxiliary storage device as a hardware resource, and performs arithmetic processing trough an appropriate bus as a hardware resource. In other words, the calculation programs are implemented such that information processing by the software for realizing the calculation methods according to the respective embodiments of the present invention is realized by these hardware resources. Storing means or a storage unit means a part of all of computer-readable information storage media logically sectioned in an arbitrary unit or a combination of the information storage media. The storage means is realized by an arbitrary hardware resource such as a cache memory in the MPU, a main memory connected to the MPU, and a nonvolatile storage medium such as a hard disk drive connected to the MPU by an appropriate bus. The storage means includes an arbitrary one that is realized by an arbitrary form such as an area in a memory defined by an architecture of the MPU, a file or a folder on a file system managed by the OS, a list or a record in a database management system that is provided in the same computer or any one of computers on a network and accessible, or a record managed in plural lists having a relation with one another by a relational database, logically distinguished from other storage means, and can distinguishably and at least temporarily store or record information.

Figure 2:
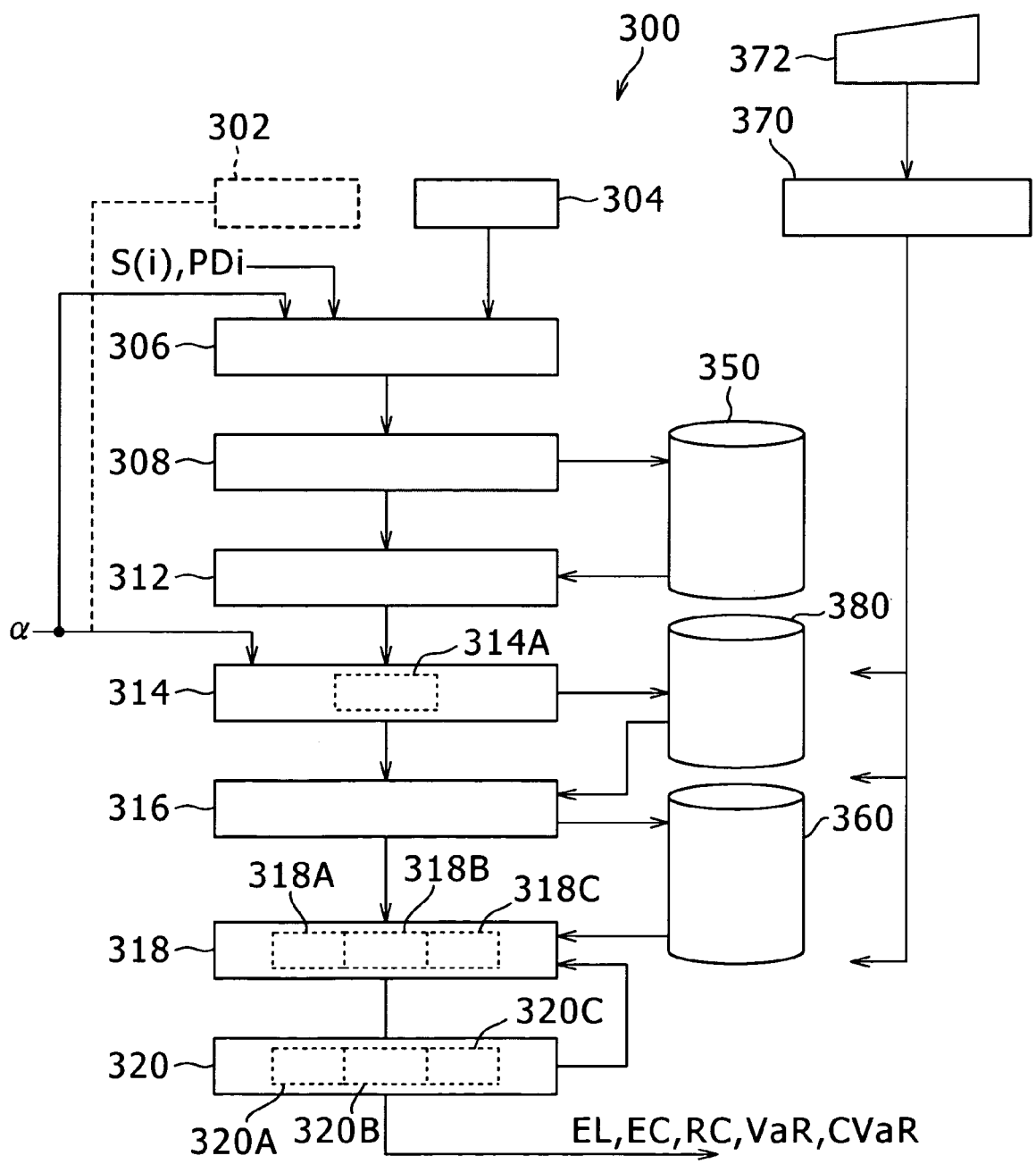
FIG. 2 is a functional block diagram showing the structure of a dedicated computer realized by the calculation method according to the embodiment of the present invention.
Figure 5:
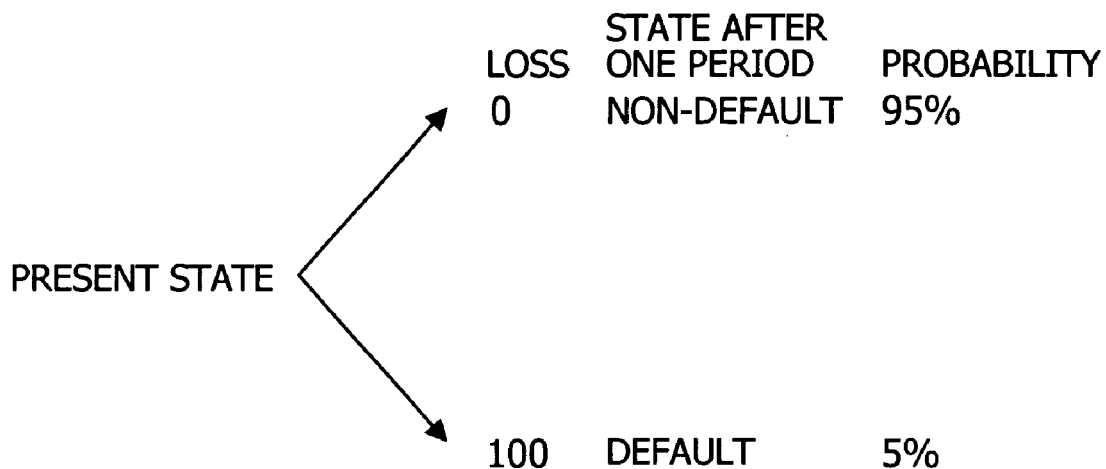
FIG. 5 is an explanatory diagram for explaining, using a specific example, a concept of the default mode for taking into account loss.
Figure 6:
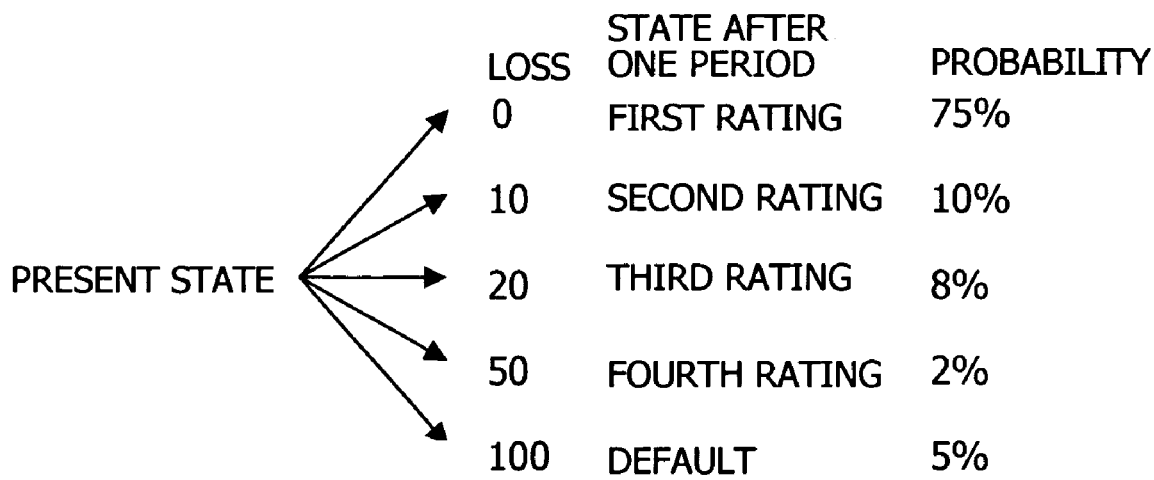
FIG. 6 is an explanatory diagram for explaining, using a specific example, a concept of the MtM mode for taking into account loss.
Figure 7:
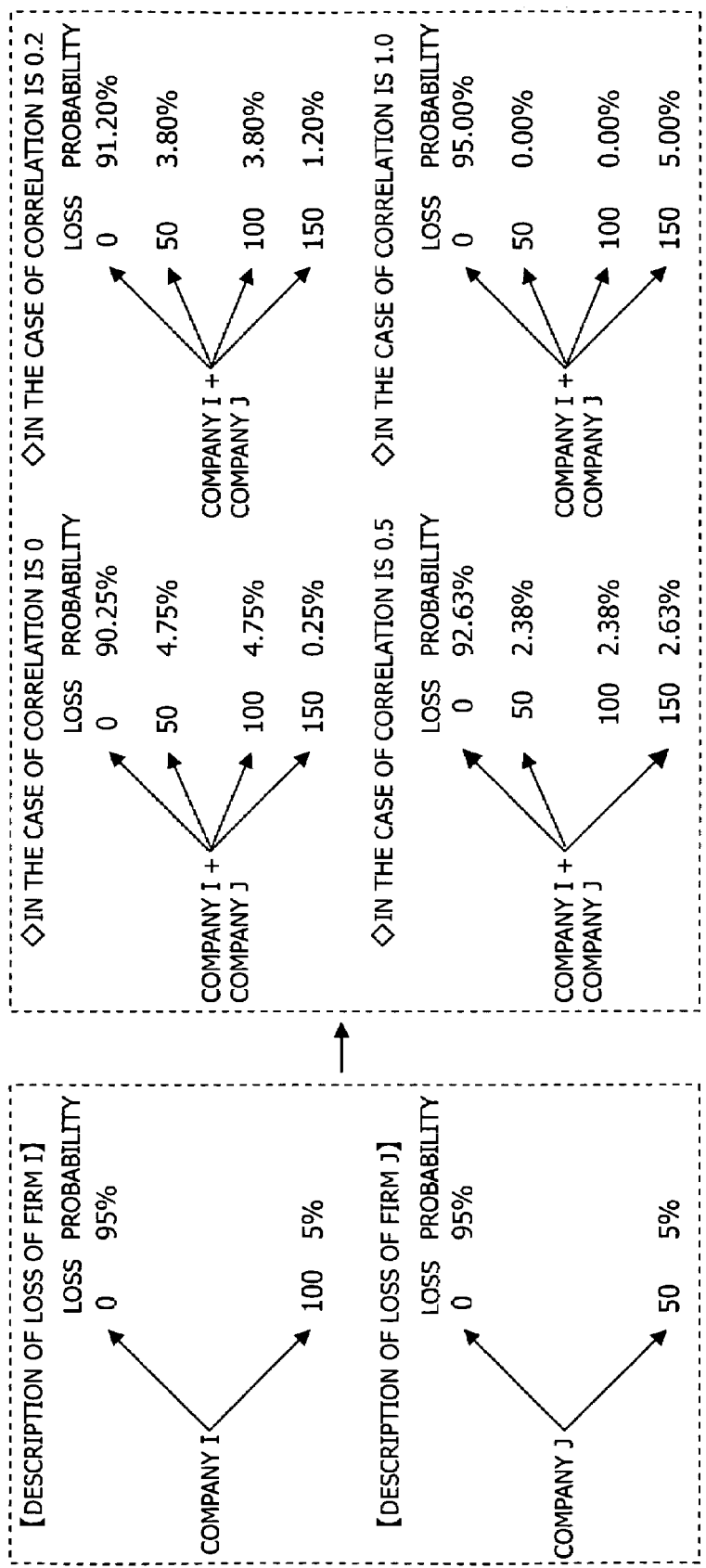
FIG. 7 is an explanatory diagram for comparing probability distributions of losses in the case of a single company and plural companies.
Figure 8:
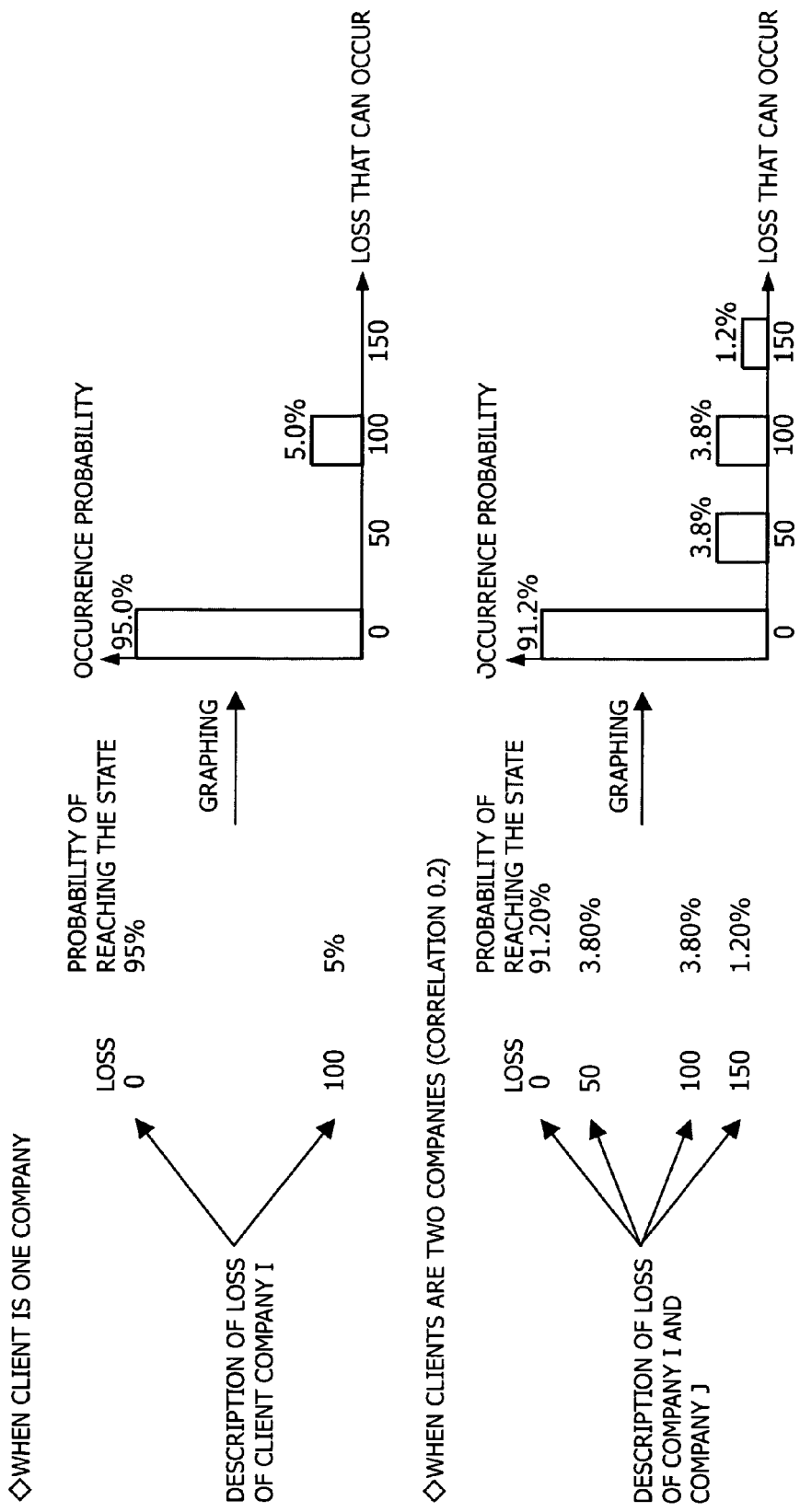
FIG. 8 is an explanatory diagram for explaining a probability distribution of losses using a distribution function.
Figure 9:
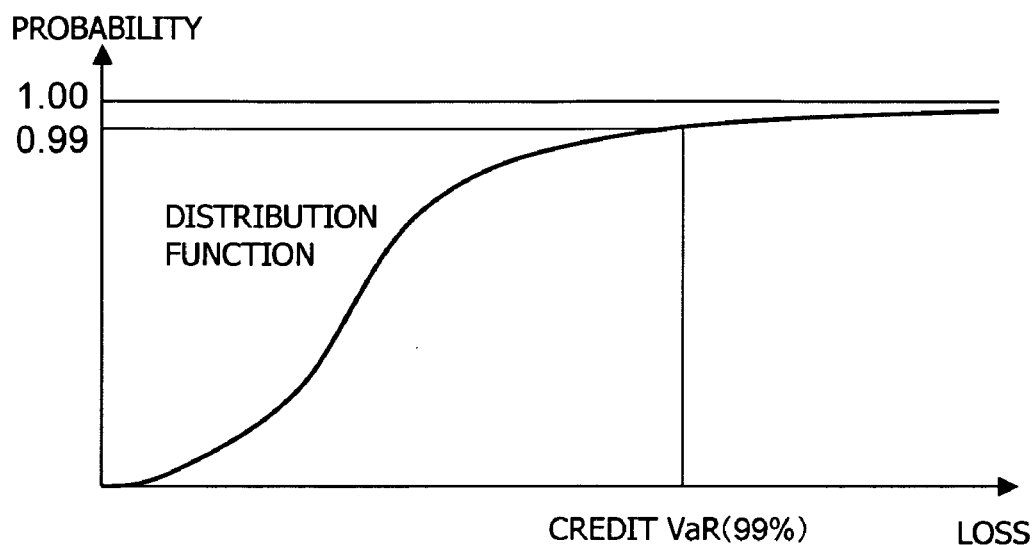
FIG. 9 is a graph of a distribution function.
Figure 10:
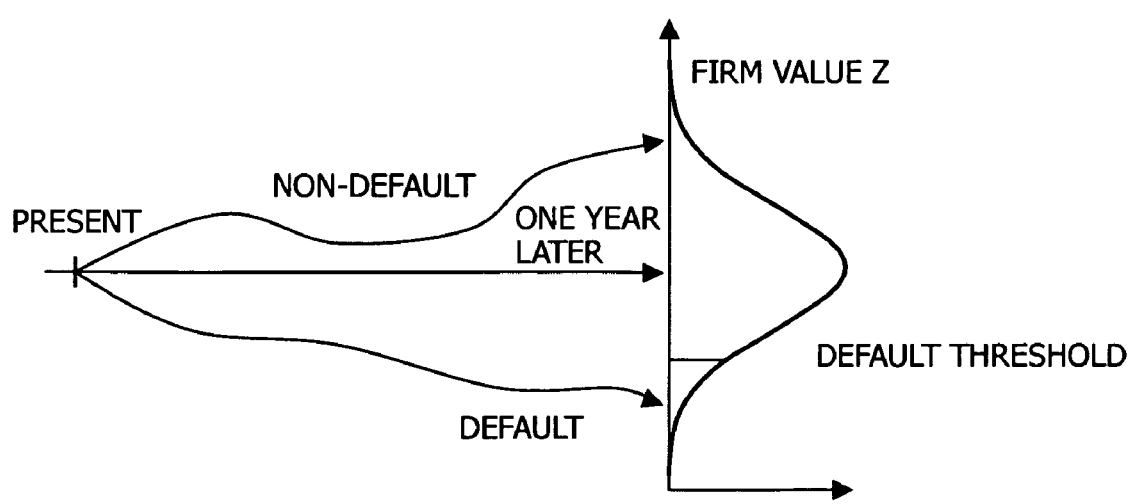
FIG. 10 is an explanatory diagram showing a state of occurrence of a loss after a fixed period in the case of a default mode.
Figure 11:
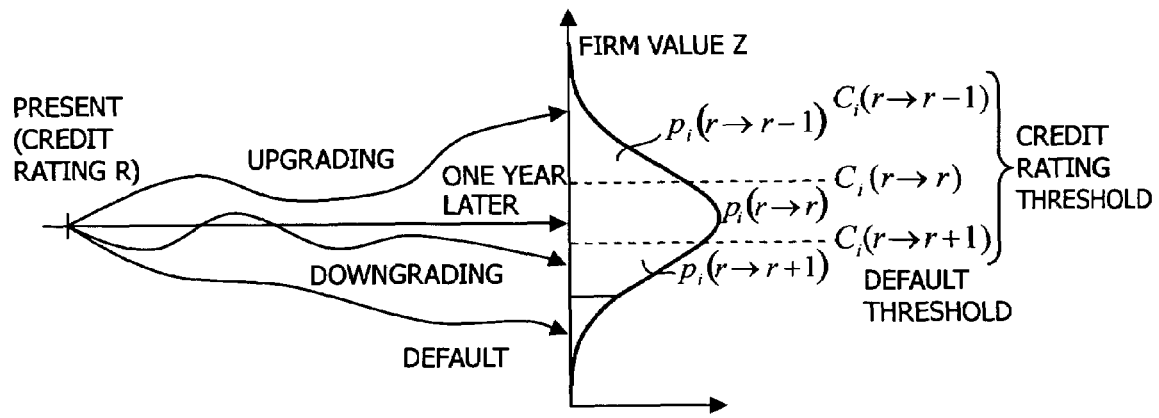
FIG. 11 is an explanatory diagram showing a state of occurrence of a loss after a fixed period in the case of an MtM mode.

FIG. 2 is a block diagram showing a functional configuration of a calculating device 300 for a risk measure according to an embodiment in which Laplace transform functionally realized in the computer is used. FIG. 2 specifically shows functional processing, which is one of the modes for carrying out the present invention, in a relation with hardware. The risk measure calculating device 300 for losses of a portfolio including credits given to plural companies includes, as functional means, a discretized valuation point calculating unit 304, a loss-index-function calculating unit 306, a sector-function-data calculating nit 308, a sector-function-data storage unit 350, a sector multiplying unit 312, a weight multiplying unit 314, a narrow-sense-portfolio-function calculating unit 316, an Laplace inversion unit 318, and a risk-measure calculating unit 320. The weight multiplying unit 314 and the narrow-sense-portfolio-function calculating unit 316 are collectively referred to as portfolio-function calculating unit. As arbitrary selection in the embodiments, a portfolio-function-data storage unit 360, a parameter storage unit 370, a sum-data storage unit 380, and a sector-risk-factor-coefficient calculating unit 302 may be provided. Data stored in the parameter storage unit 370 is received from a user through an input device such as a keyboard 372 or prepared by other means and stored in the parameter storage unit 370. As arbitrary selection, it is also possible that a parameter calculating unit (not shown) is prepared and data received from the user is processed and stored in the parameter storage unit 370.

The loss-index-function calculating unit 306, the sector-function-data calculating unit 308, the sector multiplying unit 312, the weight multiplying unit 314, the narrow-sense-portfolio-function calculating unit 316, the Laplace inversion unit 318, and the risk-measure calculating unit 320 are functional means for realizing numerical information processing specific thereto, respectively. Typically, a computer program for realizing the functional means are retrieved from storage means for storing the programs in advance, at least a part of the program is loaded to arithmetic means, the program is decoded by a decoder in the arithmetic means, a command is issued on the basis of an instruction from the decoder, and the command is executed by an execution unit in the arithmetic means, whereby the functional means are functionally realized. An arithmetic processing unit can be configured by using a numerical arithmetic processing unit such as an ALU (arithmetic logical unit). However, an architecture mounted thereon is not limited to a specific one. According to the execution of the computer program, numerical calculation specific to respective calculating units realized through cooperation of the arithmetic device and the storage means is realized. The present invention includes functional means in which equivalent functions are realized by a compiled executable program, subroutines such as functions and procedures in a program, and a dynamically-linked calculation module such as a dynamic link library. The present invention also includes functional means that includes, in a part or entirety thereof, an arbitrary application specific processor, an ASIC (Application Specific Integrated Circuit), a DSP (Digital Signal Processor), an FPGA (Field Programmable Gate Array), or the like that realizes equivalent functions with hardware.

Data stored in the parameter storage unit 370 is data used for calculation by the other functional means. Examples of the data include parameters for determining values of the auxiliary variable used for calculation of Laplace inversion, parameters necessary for determination of discretized valuation points, a parameter for determining the number of coefficients of a series to be calculated, and parameters used for calculation of risk measures. Parameters necessary for carrying out the present invention are different depending on a method of series-approximating Laplace inversion, a convergence acceleration method, risk measures to be calculated, or a method of carrying out the other functional means. Parameters necessary according to the embodiments of the present invention are stored in the parameter storage unit 370. The other functional means retrieve the parameters from the parameter storage unit 370 at a point when the parameters are necessary. The parameter storage unit 370 is realized by a predetermined area in the main memory 108 or a file managed by the OS in the hard disk drive 118.

In carrying out the present invention, means for giving data stored in the parameter storage unit 370 is not limited to a specific method. For example, it is also possible to prepare parameters necessary in a calculation process as an external file and read the parameters. The user may input or select parameters using the keyboard 372. A parameter calculating unit (not shown) may calculate parameters necessary for calculation from numerical values inputted from the keyboard 372. Moreover, some of these methods may be combined to give parameters.

In example 1, examples of the data stored in the parameter storage unit 370 include a set of auxiliary variables $\{\lambda_k\}$ used for calculation of Laplace inversion and the number of auxiliary variables $N_k$, Max_g (a maximum of discretized valuation points), Min_g (a minimum of discretized valuation points) and $N_g$ (the number of discretized valuation points), that are parameters used for determination of discretized valuation points, and a set of losses to be calculated $\{t_0, t_1, \ldots, t_{NT}\}$ and NT as a parameter for specifying the number of losses. When VaR is calculated as a risk measure, a confidence interval p is stored as additional data. Additional data may be stored by the Laplace inversion method or the numerical integration method used for calculation. For example, when the Poisson method and the QD method are used for the Laplace inversion method, parameters γ and h (formula 47) used for calculation of Laplace inversion and a maximum $t_{MAX}$ of losses to be calculated are stored. Concerning γ and h, it is possible that $t_{MAX}$ and n are inputted from the keyboard and γ and h are calculated by the parameter calculating unit according to formula 47 and stored in the parameter storage unit 370. When Monte Carlo integration is used as the numerical integration method in calculating a portfolio function, the number of integration points $N_I$ and a random number seed rs necessary for generating integration points are stored. In example 1, a function obtained by subjecting a portfolio function to inverse transform is assumed to be a function of a loss such as a density function and a distribution function of a loss distribution.

A sector risk factor Y is represented as a linear combination of at least one common risk factor X that affects plural firm values. Coefficients α (at the bottom of formula 30) for defining the sector risk factor Y are calculated in advance by using other means or given to each of the sectors by the sector-risk-factor-coefficient calculating unit 302 as arbitrary selection. Since the coefficients a are a set of values different for each of the sectors, a sector risk factor is uniquely determined if a sector is set (see the second equation at the bottom of formula 30, the expression of Y). In example 1, sensitivity coefficients are calculated for each of the sectors and stored in the storage means in advance and the sensitivity coefficients are retrieved. Examples of the data stored in the storage means include data of sensitivity coefficients (at the bottom of formula 30, α) of the respective sectors with respect to common risk factors. This example is shown in FIG. 13. As another implementation form, the sector-risk-factor-coefficient calculating unit 302 is included. In this case, the sector-risk-factor-coefficient calculating unit 302 carries out statistic analysis such as principal component analysis using time series data of a stock price index by sector or time series data of a default probability by sector as input data to thereby calculate data same as that shown in FIG. 13.

In FIG. 13, to each of the sectors distinguished by a sector number or a sector ID, coefficient (sensitivity coefficients) for generating the sector risk factor Y used in the sector from the common risk factors X are given.

The discretized valuation point calculating unit 304 retrieves parameters necessary for determination of discretized valuation points from the parameter storage unit and decides a set G of discretized valuation points. The set G of discretized valuation points is a finite number of point sequence used as an alternative of the sector variable y in a process of calculation. A method of determining the discretized valuation points G that can be used in the present invention is not limited to a specific method. For example, the processing of the discretized valuation point calculating unit 304 may be processing for retrieving the maximum Max_g and the minimum Min_g of discretized valuation points and the number $N_g$ of discretized valuation points from the parameter storage unit 370 and calculating values of the discretized valuation points according to formula 40. As specific numerical values, if Min_g is set to −5, Max_g is set to 5, and $N_g$ is an integer value of about 64 to 256, risk measures can be highly accurately calculated. In example 1, the calculation method is described on the assumption that a set of discretized valuation points is identical for all the sectors. However, the present invention can be carried out even if a set of discretized valuation points is different for each of the sectors.

The number of integration points necessary for highly accurately calculating a portfolio function may reach several million. However, in the present invention, the number of discretized valuation points necessary for realizing sufficient accuracy is about several tens to several hundred. Therefore, by using a discretized valuation point as an alternative of the sector variable y, it is possible to save resources such as a storage area of a computer and substantially increase speed of calculation. As in the case of the sector-risk-factor-coefficient calculating unit 302, the discretized valuation point calculating unit 304 is included in the risk measure calculating device 300 according to this embodiment. However, the present invention is not limited to the case in which the discretized valuation point calculating unit 304 is used. For example, an implementation form in which discretized valuation points are calculated and stored in the storage means in advance and sequentially retrieved can be an implementation form of the present invention.

A probability of loss occurrence is calculated on the basis of a probability distribution of firm values at the end point of a risk measurement period and a judgment criterion on which recognition concerning loss is reflected. A firm value of a certain company can be written using a sector risk factor of a sector to which the company belongs. Therefore, a probability of loss occurrence of a company belonging to the sector S is a function of a sector variable $y^S$. In the case of the default mode of example 1, the judgment criterion is given by $C_i$ of formula 7 and the probability of loss occurrence is given by the third equation of formula 31. PDi that is an argument on the right side of formula 7 is an average default probability of the company "i" and can also be calculated from time series data of a default occurrence ratio of a credit rating to which the company "i" belongs. In the case of the MtM mode described later, a judgment criterion is calculated from information on an average rating transition probability over one period. These kinds of information necessary for calculation of a judgment criterion is prepared in advance and given to the loss-index-function calculating unit 306 as an input. In example 1, the average default probability is a value determined for each of the credit ratings to which the respective companies belong rather than for each of the companies. However, the present invention can also be carried out when the average default probability is given to each of the companies. Input data used in this embodiment in the case of each of the default mode of example 1 for taking into account only a default in recognizing loss and the MtM mode for taking into account a credit rating as well for comparison is shown in FIG. 15. FIG. 15(1) shows an example of average default probability data used in the default mode. Respective spaces indicate average default probabilities by credit rating in a risk measurement period. A rating number is used for identifying a credit rating in the computer. A rating ID is an arbitrary identification code for identifying a credit rating. For example, the rating ID can be an arbitrary identification code used in an organization of a financial institution by the financial institution. FIG. 15(1) indicates that, for example, in a company classified into a rating ID "D", a probability that the company falls into a default in a risk measurement period is 0.65%. In this way, information concerning how high default probability a company of which rating ID has is given as data. FIG. 15(2) shows an average rating transition probability used in the MtM mode described later.

A portfolio function is a function of an auxiliary variable. Data of the portfolio function obtained by the portfolio-function calculating unit is calculated in association with a value of the auxiliary variable. In example 1, in the processing of the Laplace inversion unit 318, data of a portfolio function corresponding to respective elements of a set of auxiliary variables $\{\lambda_k\}$ is used. In explanation of the loss-index calculating unit 306 to the narrow-sense-portfolio-function calculating unit 316, processing for calculating data of a portfolio function corresponding to a certain element $\lambda'$ of the set $\{\lambda_k\}$ is described.

The loss-index-function calculating unit 306 calculates data of a loss index function set for each of the companies using a probability of loss occurrence and the exponential function of a value obtained by multiplying the auxiliary variable by the exposure of the company. A probability of loss occurrence of a company belonging to the sector S is a function of the sector variable $y^S$. Therefore, a loss index function of the company is also a function of the sector variable $y^S$. $\lambda'$ that is an element of the set of auxiliary variables $\{\lambda_k\}$ and a set of discretized valuation points $\{gm\}$ obtained by the discretized valuation point calculating unit 304 are inputted to the loss-index-function calculating unit 306 from the parameter storage unit. The loss-index-function calculating unit 306 calculates, for each of the companies, with respect to each of the discretized valuation points, a value of a loss index function in the case in which a value of the auxiliary variable is $\lambda'$ and a value of the sector variable is a value of the discretized valuation point. In the case of the default mode in example 1, since a probability of loss occurrence is given by the third equation of formula 31, in the calculation, the inverse function of the distribution function of the standard normal distribution needs to be calculated. The loss-index-function calculating unit 306 includes a subroutine or a module that can execute this calculation. In order to calculate a probability of loss occurrence, for each of the companies, data indicating to which sector the company belongs, data that gives sensitivity coefficients for each of the sectors, and data concerning the exposure of the company and the average default probability of the company are necessary. These data are given to the loss-index-function calculating unit 306 as input information. An example of information given to each of the companies is shown in FIG. 14. For each of the companies, a credit rating and a sector to which the company belongs are given as data. A loss expected when the company falls into a default is also given (an exposure). Information on average default probabilities of the respective companies is obtained from rating IDs in this table by using the data shown in FIG. 15. An example of data that gives sensitivity coefficients for each of the sectors is shown in FIG. 13. Sensitivity coefficients of the respective companies are specified by sector IDs in FIG. 14 and the information on the sensitivity coefficients by sector. A transaction balance and a loss-at-default probability may be input information instead of the exposure. The exposure is calculated from the transaction balance and the loss-at-default probability.

When the average default probability is given for each of the credit ratings as in example 1, under a situation in which values of all the sector variables are given, all probabilities of loss occurrence of companies having an identical credit rating belonging to an identical sector are the same value. This means that, when data of probabilities of loss occurrence for each of the sectors, each of the credit ratings, and each of the discretized valuation points are calculated, the probability of loss occurrence used for the calculation described above always coincides with any one of these values. Therefore, when an average default probability is given through the credit ratings, it is also possible to add a probability-of-loss-occurrence-data calculating unit (not shown) and a probability-of-loss-occurrence-data storage unit (not shown) to the configuration of the calculating device 300 and store the data of the probabilities of loss occurrence in the probability-of-loss-occurrence-data storage unit. In this case, the sector information shown in FIG. 13, the default probability information by credit rating shown in FIG. 15, and the set of discretized valuation points $\{g_m\}$ obtained by the discretized valuation point calculating unit 304 are given to the probability-of-loss-occurrence-data calculating unit as input data. By adopting such a configuration, it is unnecessary to perform calculation of a probability of loss occurrence for each of the companies and it is possible to more quickly execute calculation of a loss index function.

The sector-function-data calculating unit 308 performs, for each of the sectors and each of the discretized valuation points, processing for taking the product of the data of the loss index functions calculated by the loss-index-function calculating unit 306 for all the companies in the sector. For the respective sectors, a value of sector function data is calculated for each of the discretized valuation points $g_m$ by using a result of the processing. For example, when a loss index function is the conditional moment generating function for each of the companies (the function in braces on the right side of the second equation of formula 31), the conditional moment generating function by sector defined by the second equation of the formula 31 is calculated for all the discretized valuation points $g_m$.

The sector-function-data storage unit 350 stores the value of the sector function data calculated by the sector-function-data calculating unit 308 as data in association with the sectors S and the discrete evaluation values $g_m$. As an example, the sector-function-data storage unit 350 can be realized by a predetermined area in the main memory 108 or a file managed by the OS in the hard disk drive 118 shown in FIG. 1. When the sector-function-data storage unit 350 is configured by the file of the hard disk drive 118, as shown in FIG. 1, the value of the sector function data is stored in association with the respective sectors S and the respective discretized valuation points $g_m$. In the figure, values of $g_m$ themselves are clearly shown. However, since the discretized valuation points $g_m$ are specified by designating the suffix m, the discretized valuation points $g_m$ may be stored together with values of m. The sector-function-data storage unit 350 can also be realized by other forms of storing values of the sector function data that associate the values with the sectors S and the discretized valuation points $g_m$ (or the suffix m).

In carrying out the present invention, it is not always necessary to perform processing of the sector-function-data calculating unit after calculating data of loss index functions for all the companies. It is also possible to adopt an implementation form for performing, for each of the companies, processing of calculation of loss index functions data and calculation of sector function data. For this purpose, before performing the processing for calculating loss index function data, a storage area for sector function data corresponding to sectors and discretized valuation points in the sector-function-data storage unit 350 is secured and values of all the sector function data are initialized to a real number value 1. Then, as processing for one company, processing for calculating data of loss index functions for all discretized valuation points and multiplying, for each of the discretized valuation points, sector function data corresponding to the sector of the company and the discretized valuation point by data of the loss index function corresponding to the discretized valuation point is performed. By applying this processing to all the companies, all sector function data can be calculated. In such an implementation form, it is unnecessary to store values of loss index functions of all the companies and it is possible to reduce a storage area such as a memory used in the processing. In the example described here, the loss-index calculating unit is retrieved from the sector-function-data calculating unit and calculation is performed. Such a processing method can be an embodiment of the present invention.

By using the sector-function-data storage unit 350, in later calculation, a value of sector function data calculated in advance by the loss-index-function calculating unit 306 and the sector-function-data calculating unit 308 can be obtained by simply designating the sector S and a discretized valuation point. It is unnecessary to perform a new calculation every time. In order to obtain the value of the sector function data, the calculation by the sector-function-data calculating unit 308 is performed by the number of times that corresponds to a product of the number $N_S$ of the sectors S and the number of elements of $N_g$ of the set of discretized valuation points $\{g_m\}$. In the calculation for each of the sectors in the loss-index-function calculating unit 306, for each of the sectors, calculation by the number of companies belonging to the sector is executed. Therefore, until a value necessary for the sector-function-data storage unit 350 is stored, eventually, the calculation is executed by the number of times that corresponds to the product of the number N of the company and the number of elements of $N_g$ of the set of discretized valuation points $\{g_m\}$.

The sector multiplying unit 312 performs, for each of the integration points, processing for specifying, for each of the sectors S, a discretized valuation points $g_{m_1}^S$ corresponding to a sector variable $y_1^S$ (formula 32, $\beta_S$ is calculated from the second equation of formula 30) corresponding to the integration point from a set of discretized valuation points, retrieving sector function data corresponding to the sector and the specified discretized valuation point from the sector-function-data storage unit, and taking product of the sector function data of all the sectors. An approximate value of a conditional portfolio function is calculated for each of the integration points by using a result of the processing. For example, when a sector function is the conditional moment generating function by sector (the second equation of formula 31), for each of the integration points, a value of the product on the right side of formula 34 is calculated. When the calculation is not performed by the calculation method of the present invention, it is necessary to calculate sector function data with respect to the value $y_1^S$ of the sector variable for each of the integration points. However, in this embodiment, such calculation is not repeated every time. It is possible to extremely quickly perform calculation by using the sector function data at the respective discretized valuation points stored in advance in the sector-function-data storage unit 350. The sector function data stored in the storage means in advance is calculated from a value at a discretized valuation point of a loss index function. Therefore, except the case in which a sector variable coincides with the discretized valuation point, the sector function data is an approximate value including a slight error caused by the fact that the sector variable and the discretized valuation point do not completely coincide with each other. However, an error due to this approximation can be reduced to be sufficiently small if the set of discretized valuation points $\{g_m\}$ is appropriately set and the discretized valuation point $g_{m_1}^S$ corresponding to the sector variable $y_1^S$ is appropriately specified.

Information concerning integration points is given to the sector multiplying unit 312 as an input. The present invention can be carried out by using an arbitrary algorithm as a numerical integration algorithm for calculating integration points and weights related to the integration points. It goes without saying that accuracy of risk measures to be calculated depends on a selected numerical integration algorithm. However, for example, if Monte Carlo integration is used for the numerical integration algorithm and the number of integration points is set to be equal to or larger than one million, it is possible to calculate various risk measures with the highest precision. Further, in the present invention, means for giving information on integration points and weights related to the integration points is not limited to a specific one. For example, it is possible to simultaneously read integration points and weights related to the integration points from an external file. In such a configuration, by changing the external file, it is possible to execute the processing of the sector multiplying unit 312 and the weight multiplying unit 314 using integration points generated by an arbitrary numerical integration algorithm and weights related to the integration points. FIG. 16 shows an example of integration point information read from the external file. In FIG. 16, an integration point number indicates an integer corresponding to a suffix 1 for specifying an integration point. A weight indicates a weight value related to the integration point. Values of respective common risk variables are given for each of the integration point numbers by being associated with a common risk factor ID shown at the top. Besides, it is also possible to incorporate a module for generating integration points in the inside of the sector multiplying unit 312 and execute processing of sector multiplication in cooperation with the module. In such a configuration, several parameters are necessary to generate integration points. These parameters are stored in the parameter storage unit and retrieved when the processing of the sector multiplying unit 312 is executed. For example, when the Good Lattice Point method is used as a numerical integration algorithm, the number of integration points and data of a good lattice vector are given to the parameter storage unit and integration points are calculated by retrieving the data.

Processing for calculating integration points and weights in the sector multiplying unit 312 in the case in which Monte Carlo integration is used as a numerical integration algorithm will be explained. First, $N_F$ uniform random numbers are generated, where $N_F$ is the number of the common risk factors. Integration points are determined by setting numbers obtained by converting the random numbers with the inverse function of the distribution function of the standard normal distribution as respective common risk variables. In this case, the sector multiplying unit 312 can include a module that generates uniform random numbers with the Mersenne Twister method and a module that calculates an inverse function value of the distribution function of the standard normal distribution. Weights related to the integration points are $w_1 = 1/N_I$ with respect to all the integration points, where $N_I$ is the number of integration points. In calculation of weights and generation of normal random numbers, the number $N_I$ of integration points and the data of the random number seeds rs stored in the parameter storage unit 370 are used. The number $N_F$ of the common risk factors is obtained from the sector information shown in FIG. 13.

The sector multiplying unit 312 also performs processing for specifying the discretized valuation point $g_{m}^{S}{}_1$ used in retrieving sector function data from a value of sector variable determined for each of the integration points. Whereas the sector function data should be calculated by using a value of a sector function with respect to the sector variable $y^{S}{}_1$, in order to reduce an error caused by replacement with sector function data with respect to $g_{m}^{S}{}_1$, it is necessary to set $g_{m}^{S}{}_1$ sufficiently close to $y^{S}{}_1$. In the present invention, a method of specifying the discretized valuation point $g_{m}^{S}{}_1$ is not specifically limited. For example, it is possible to adopt an implementation form in which m for minimizing $|y^{S}{}_1 - g_m|$ is set as $m^{S}{}_1$ and $g_{m}^{S}{}_1$ is selected from $\{g_m\}$. By using such a specifying method, if a set of discretized valuation points is determined to set intervals of the discretized valuation points sufficiently small, it is possible to reduce an error caused by the replacement to be sufficiently small as well. When the sector function data is stored in the sector-function-data storage unit 350 in association with the suffix m for specifying a discretized valuation point rather than a value of the discretized valuation point, the sector function data is retrieved by using $m^{S}{}_1$ instead of $g_{m}^{S}{}_1$.

The weight multiplying unit 314 performs processing for obtaining, for each of the integration points specified by the suffix 1, an approximate value of a conditional portfolio function from the sector multiplying unit 312 and multiplying the approximate value by a weight value $w_1$ related to the integration point. Consequently, weighted data is obtained. For example, when a sector function is the conditional moment generating function by sector (the second equation of formula 31), the weighted data is respective terms of the sum on the right side of formula 34.

The narrow-sense-portfolio-function calculating unit 316 performs processing for adding up the weighted data calculated by the weight multiplying unit 314 for all the integration points and processing for calculating a product of the added-up value and a value in $\lambda$' of a portfolio auxiliary variable function. The processing for adding up the weighted data may be processing for calculating a sum after calculating weighted data of all the integration points or may be processing for securing an area in which portfolio function data is stored and initializing the area to 0 in advance, performing the processing of the sector multiplying unit 312 and the processing of the weight multiplying unit 314 for each of the integration points to calculate weighted data, and adding the weighted data to data in the storing area for the portfolio function data. In the latter case, the processing is advanced by retrieving the sector-function-data calculating unit from the portfolio-function calculating unit. Such a processing method can be an implementation form of the present invention. A value of the portfolio auxiliary variable function is calculated with a value of an auxiliary variable set to $\lambda$' and multiplying the added-up value by the value of the portfolio auxiliary variable function, whereby portfolio function data corresponding to $\lambda$' is calculated. A portfolio function can be, for example, a moment generating function of an entire portfolio (formula 13) or a function obtained by subjecting a distribution function of a loss distribution to Laplace transform (formula 28). When weights of all the integration points are equal as in Monte Carlo integration, it is possible to perform processing for calculating data of the portfolio function by multiplying a value, which is obtained by adding up sector function data with respect to all the integration points with the portfolio-function calculating unit 316 and then dividing the added-up sector function data by the number $N_I$ of integration points, by a value in $\lambda$' of the portfolio auxiliary variable function without performing the processing of the weight multiplying unit 314.

According to the processing described above, data of a portfolio function corresponding to the auxiliary variable $\lambda$' is calculated. In order to numerically calculate Laplace inversion of the portfolio function, data of portfolio functions corresponding to all elements of the set of auxiliary variables $\{\lambda_k\}$ is necessary. The data can be calculated by executing the processing while changing a value of $\lambda$'. In a certain implementation form of the present invention, processing for calculating data of portfolio functions with respect to all the elements of the set of auxiliary variables $\{\lambda_k\}$ in parallel can be adopted. Examples of such an implementation form are described in example 2, example 10, example 11, and example 12.

The portfolio-function-data storage unit 360 stores the data of the portfolio function calculated by the portfolio-function calculating unit 316 as data in association with a value of the auxiliary variable $\lambda$ or the suffix k for specifying an auxiliary variable. As an example, the portfolio-function-data storage unit 360 can be realized by a predetermined area in the main memory 108 or a file managed by the OS in the hard disk drive 118 shown in FIG. 1.

The Laplace inversion unit 318 performs numerical calculation of integration for the auxiliary variable $\lambda$ on the basis of the portfolio function data stored in the portfolio-function-data storage unit 360. The calculation of integration for an auxiliary variable is a calculation necessary in the processing of Laplace inversion for deriving a certain function from values of Laplace transform of the function. When the original function is a probability density function, the calculation is given by formula 41. Consequently, a function for a loss such as a probability density function and a distribution function can be calculated.

Processing in configuring the Laplace inversion unit 318 on the basis of the Poisson method and the QD method is described. In this case, the Laplace inversion unit 318 includes a continued-fraction-coefficient calculating unit 318A that calculates coefficients of continued fractions from data of a portfolio function, a continued-fraction evaluating unit 318B that calculates values of the continued fractions from the coefficients of the continued fraction and a loss, and an inverse-transform-function calculating unit 318C. When integration of Laplace inversion of a portfolio function is approximated by the Poisson method, each of coefficients of an approximate infinite series is represented by a value of the portfolio function in the auxiliary variable $\lambda_k$ calculated from $\gamma$ and h by the formula 56. Therefore, data of the portfolio function corresponding to the respective elements of the set of auxiliary variables $\{\lambda_k\}$ conforming to formula 56 is inputted to the continued-fraction-coefficient calculating unit 318A. Processing performed in the continued-fraction-coefficient calculating unit 318A is to calculate coefficients of continued fractions from the inputted data of the portfolio function according to the QD method (formulas 50 and 51). For example, when the portfolio function is a moment generating function, processing for calculating coefficients $c_k$ of a series from portfolio function data according to the equation at the bottom of formula 46, substituting the coefficients $c_k$ in the second equation of formula 51, then, executing arithmetic operations of the recursive formula of formula 51, and calculating values of the coefficients of the continued fractions shown in formula 50 is performed. The coefficient calculated by the continued-fraction-coefficient calculating unit 318A is received by the continued-fraction evaluating unit 318B and used for calculation of values of the continued fractions. The continued-fraction evaluating unit 318B sequentially retrieves respective elements of a set of losses $\{t_0, t_1, \ldots, t_{NT}\}$ from the parameter storage unit 370, calculates z from the losses according to the equation at the bottom of formula 46, performs the recursive formula of formula 54 and the calculation of formula 55 using the coefficients calculated by the continued-fraction-coefficient calculating unit 318A, and calculates values of continued fractions corresponding to the respective losses. Finally, the inverse-transform-function calculating unit 318C receives the values of the continued fractions calculated by the continued-fraction evaluating unit 318B and calculates approximate values of the values in the respective losses of a function obtained by subjecting the portfolio function to inverse transform. Processing performed by the inverse-transform-function calculating unit 318C is to calculate a coefficient before braces in formula 48 and perform multiplication with a value of a real part of the continued fraction calculated by the continued-fraction evaluating unit 318B.

Arithmetic operations used in the processing of the continued-fraction-coefficient calculating unit 318A and the continued-fraction evaluating unit 318B are only the four rules of arithmetic and can be extremely quickly executed. Since the processing of the inverse-transform-function calculating unit 318C can also result in calculation of an elementary function and the four rules of arithmetic, the processing can be extremely quickly executed. Therefore, the arithmetic operations of the Laplace-inverse transform unit 318 can be extremely quickly executed as a whole.

A value of the loss t is not included in coefficients of an approximate series of Laplace inversion obtained by the Poisson method. Therefore, after calculating the coefficients in the continued-fraction-coefficient calculating unit 318A, it is possible to calculate a value of a function related to risks of a probability density function and a distribution function with respect to different losses t according to formula 48 by repeatedly actuating the continued-fraction evaluating unit 318B and the inverse-transform-function calculating unit 318C with respect to values of plural losses t. It is also possible to store data of the coefficients of the continued fractions obtained by the continued-fraction-coefficient calculating unit 318A in the storage device. By adopting such a configuration, it is possible to retrieve the continued fraction coefficients from the storage device, actuate only the continued-fraction evaluating unit 318B and the inverse-transform-function calculating unit 318C, and calculate a value of Laplace inversion of a portfolio function with respect to arbitrary losses.

When an approximate series of Laplace inversion obtained by a method other than the Poisson method is used, a value of the loss t may be included in coefficients of the series. As an example for giving such an approximate series, there is the Gaver method. In such a case, with respect to respective losses to be calculated, values of auxiliary variables necessary for Laplace transform are stored in the parameter storage unit 370. For each of the losses, calculation of portfolio function data corresponding to the respective auxiliary variables and processing of Laplace inversion are performed.

The risk-measure calculating unit 320 calculates risk measures indicating a risk for losses of a portfolio from the data of the function related to the risk corresponding the set of losses $\{t_0, t_1, \ldots, t_{NT}\}$ calculated by the Laplace inversion unit 318. The risk measure calculated here is not always limited to one kind but includes plural risk measures or a further risk measure calculated by using the risk measure calculated by the embodiment. Depending on the contents of calculation, the loss t is desired to be determined. As an example, there is calculation for calculating VaR when a confidence coefficient p is given. In such a case, convergence calculation such as a bisection algorithm is effective. In implementation, in this embodiment, it is also possible to retrieve the Laplace inversion unit 318 from the risk-measure calculating unit 320 in order to actuate the Laplace-inverse transform unit 318 again according to a calculation result of the risk-measure calculating unit 320.

The embodiment of the present invention can be modified according to calculation of various risk measures in the scope of the present invention. Examples of the modification are explained below.

Example 2

As one of the examples, it is possible to calculate data of portfolio functions with respect to all the elements of the set of auxiliary variables $\{\lambda_k\}$ in parallel. In this case, the loss-index-function calculating unit 306 can calculate, for each of the companies, data of loss index functions with respect to the respective auxiliary variables and respective discretized valuation points. The sector-function-data calculating unit 308 can calculate sector function data for each of the auxiliary variables and for each of the discretized valuation points and store the sector function data in the sector-function-data storage unit 350 as data in association with respective values of the auxiliary variables $\lambda$ of Laplace transform in addition to the sectors S and the discretized valuation points $g_m$. The sector multiplying unit 312 performs, for the respective values of the auxiliary variables, processing for taking product of the sector function data of all the sectors and calculate an approximate value of a conditional portfolio function for each of the auxiliary variables. Moreover, the portfolio-function calculating unit 316 can perform processing for calculating data of a portfolio function for each of the auxiliary variables using the approximate value of the conditional portfolio function for each of the auxiliary variables. The Laplace inversion unit 318 can execute numerical calculation of Laplace inversion using the data of the portfolio function for each of the auxiliary variables.

In example 2, as in example 1, it is unnecessary to perform calculation of sector function data after calculating data of loss index functions with respect to all the companies and it is possible to carry out the calculation with a method of performing, for each of companies, calculation of a value of a loss index function and multiplying the value by sector function data. It is unnecessary to perform calculation of a portfolio function for each of the auxiliary variables after calculating data of a conditional portfolio function for each of the auxiliary variables with respect to all the integration points. It is possible to perform, for each of the integration points, processing for performing calculation of a value of the conditional portfolio function for each of the auxiliary variables and adding the value to the portfolio functions for each of the auxiliary variables. By carrying out the present invention using these processing methods, it is possible to reduce a storage area in use and, at the same time, prevent useless repeated calculation. Even a normal desktop computer can quickly calculate risk measures of a large portfolio including the number of companies as large as several million.

Example 3

As one of the examples, a loss index function calculated by the loss-index-function calculating unit 306 can be set as the conditional moment generating function (the function in braces on the right side of the second equation of formula 31) for each of the companies, a sector function calculated by the sector-function-data calculating unit 308 can be set as the conditional moment generating function by sector (the second equation of formula 31), which is a product of loss index functions for all companies in a sector, a conditional portfolio function calculated by the sector multiplying unit 312 can be set as the conditional moment generating function, which is a product of sector functions for all sectors, and a portfolio function calculated by the portfolio function calculating unit can be set as the moment generating function (formula 67) of an entire portfolio. In this case, a value calculated by subjecting a portfolio function to Laplace inversion in the Laplace inversion unit 318 is data of the probability density function (formula 41) that gives a probability distribution of losses. The risk-measure calculating unit 320 calculates risk measures on the basis of the data of the probability density function. As the risk measure, various risk measures that can be calculated from the probability density function concerning losses can be selected. In example 3, a portfolio auxiliary variable function is an identity function.

For example, the risk measure can be set as the expected loss. In this case, the risk-measure calculating unit 320 calculates the expected value of losses from a density function to obtain the expected loss.

Example 4

An example in which a portfolio auxiliary variable function is set to $1/\lambda$ and the other kinds of processing are the same as those in example 3 is also possible. In example 4, a value calculated by subjecting a portfolio function to Laplace inversion in the Laplace inversion unit 318 is data of the distribution function (formula 43) of a probability distribution of losses. The risk-measure calculating unit 320 calculates risk measures on the basis of the data of the distribution function. As the risk measure, various risk measures that can be calculated from the distribution function of a probability distribution of losses can be selected.

Example 5

As another example, risk measures can include the credit VaR amount corresponding to a predetermined confidence interval. The credit VaR amount is a loss, a value of a distribution function of which is a predetermined value (confidence interval). For example, the credit VaR amount can be calculated by calculating values of a distribution function with respect to losses determined in advance and appropriately interpolating the values. Since the distribution function is a monotonically increasing function, it is also possible to search for a loss, a value of a distribution function of which coincides with a confidence interval, and calculate the credit VaR amount using repeated calculation such as the dichotomy. In all the cases, the credit VaR amount can be calculated by using data of a distribution function calculated by the Laplace inversion unit 318.

Example 6

As another example, in the embodiment in which a distribution function is used, the weight multiplying unit 314 can include a sum-data calculating unit 314A that is the first additional-calculation processing unit that calculates, for each of the discretized valuation points and for each of the sectors, a weighted sum $P^S_m$ of the conditional moment generating function according to the right side of the second equation of formula 81. The weight multiplying unit 314 can also include a sum-data storage unit 380 that is an additional storage device that stores the sum data $P^S_m$ calculated by the sum-data calculating unit 314A in association with the sectors S and discretized valuation points $g_m$.

In this case, the risk-measure calculating unit 320 can include an additional calculation unit 320A that calculates, concerning each of companies "i" in a portfolio, for each of the discretized valuation points $g_m$, risk contribution measure function data (formula 80) that is a value at each of the discretized valuation points of a risk contribution measure function $R_i$ (formula 71) defined by using the probability of loss occurrence (the third equation of formula 31) and an exponential function of a value obtained by multiplying the auxiliary variable $\lambda$ by the exposure $E_i$ of the credit to the company, retrieves the sum data $P^S_m$ specified by the sector of the company and the discretized valuation point from the sum-data storage unit 380, multiplies the sum data $P^S_m$ with the risk contribution measure function data, calculates a sum of results of the multiplication for all the discretized valuation points, to thereby calculates Laplace transform data of a partial differential value of the distribution function by the exposure. The Laplace inversion unit 318 can perform, in addition to calculation of a distribution function, processing for calculating, for all the companies, partial differential value data of the distribution function by the exposure of the companies from the Laplace transform data of the partial differential value calculated by the additional calculation unit 320A and the credit VaR amount calculated by the risk-measure calculating unit 320. Moreover, the risk-measure calculating unit 320 can include an additional-risk-measure calculating unit 320B that substitutes the credit VaR amount, partial differential value data, and exposure data in representation of an economic capital of each of the companies (formula 69) based on the credit VaR amount, which is defined by including the credit VaR amount, the partial differential value data by the exposure of each of the companies of the distribution function, and the exposure, and calculates the economic capital of the company based on the credit VaR amount. The additional-risk-measure calculating unit 320B can also calculate risk contribution (formula 61) by dividing the economic capital of each of the companies obtained in this way by the exposure of the company. The risk contribution based on the credit VaR amount means a ratio of a change of a VaR amount to a change of an exposure of a certain company at the time when the change of the exposure is very small (formula 61). The economic capital is a value obtained by multiplying the risk contribution by the exposure of the company (formula 63).

Example 7

Processing for dividing the Laplace transform data of the partial differential value of the distribution function by an exposure with the auxiliary variable can also be additionally performed in the processing of the additional calculation unit 320A in example 6. The Laplace inversion unit 318 can perform processing for calculating, for all the companies, data obtained by integrating the partial differential value of the distribution function by the exposure of the company with respect to a loss in a interval of [0, VaR] (formula 94) using data obtained by further dividing the Laplace transform data of the partial differential value of the distribution function by the exposure with the auxiliary variable in the additional calculation unit 320A and the credit VaR amount calculated by the credit-risk calculating unit 320. In this case, the risk-measure calculating unit 320 can further include an additional-risk-index calculating unit 320C that performs processing for calculating a sum of an average default probability of the company and integration data of the partial differential value of the distribution function calculated by the Laplace inversion unit 318 and dividing the sum by the subtraction of a confidence interval from all interval to thereby calculate risk contribution (formula 93) based on a conditional VaR amount CVaR. The conditional VaR amount (CVaR) is a conditional expected value of the losses of a portfolio under the condition that loss exceeding the credit VaR amount has occurred.

Example 8

In an embodiment of the present invention, the loss judgment criterion can be a criterion including the default threshold $C_i$ (formula 7) that gives an upper limit of a firm value where a company falls into a default. In this case, a loss index function is defined, for the company "i" included in the sector S, including the exposure $E_i$ representing loss at default and a conditional default probability $p_i(y)$, which is decided by the default threshold, under the condition in which the sector variable y is given (the function in braces on the right side of the second equation of formula 31). According to example 8, it is possible to take into account loss on the basis of the default mode in the embodiment.

Example 9

In example 7, it is also possible to implement a modification in which, in addition to the criterion, the loss judgment criterion is a criterion further including at least one rating threshold, which is a value of a firm value with which a credit rating of a company changes, and the loss index function is defined by further including, concerning the company "i" included in the sector S, $L_i(r{=}{>}s)$ representing profits and losses at rating transition time and at default, and a conditional rating transition probability $p(r{=}{>}s)$ (formula 9) of the company under the condition in which the sector variable y is given. In this case, it is possible to perform calculation in the MtM mode taking into account a change in a credit rating in addition to occurrence of a loss due to a default same as that in the case of the default mode. Usually, a lowest rating among credit ratings used in the MtM mode corresponds to a default. Therefore, a loss judgment criterion in the MtM mode includes both the default threshold and the rating threshold. As explained later, plural default states may be present.

A method of appropriately reflecting a characteristic of a default when the loss judgment criterion in the MtM mode is given as, for example, a transition probability from an r rating to an s rating (both including a default) as described above will be explained. An example of input data in the case of the MtM mode is shown in FIG. 15(2). As described in respective spaces of FIG. 15(2), in the MtM mode, a probability of transition to each of credit ratings shown at the top at an end point of a risk measurement period is given as a numerical data for each of the credit ratings at a point when risk measurement is executed. For example, it is read from this table that, for a company having a rating C at the point of risk measurement, probabilities that the company has credit ratings A, B, . . . , and G, and falls into a default after an object period are 0.4%, 1.5%, . . . , 0.4%, and 0.3%, respectively. In order to more appropriately perform calculation in the MtM mode using such input data according to an actual situation of a credit transaction, information of addition for reflecting a special characteristic of a default, i.e., a characteristic that, unlike the other credit ratings, the default does not transition to the other credit ratings once the company falls into the default is used. This information is shown in FIG. 17.

FIG. 17 is data indicating an example in which a default probability of falling into default by each of points is given for each of the credit ratings. The default probability at each of the points indicates a cumulative default probability, i.e., a probability that a company falls into a default by that point at the latest. Each of columns "default 1" to "default N" is the cumulative default probability classified as a default state of a obligor taking into account time until the obligor falls into a default. For example, when N is set to 12 and one year period is equally sectioned, a cumulative default probability on a monthly basis is given as data for each of the points in FIG. 17.

The cumulative default probability at each of the points increases as time elapses because of the nature of defaults. The time dependency of cumulative default probability can be set in various ways with market conditions and economic conditions reflected thereon. For example, the cumulative default probability can be increased in proportion to elapsed time from an evaluation point. When the cumulative default probability is not in a simple proportional relation with time, the cumulative default probability can be interpolated and given by, for example, a spline function from an initial value, a value at a middle point, and a value at a final point to give time dependency thereto.

The transition information of credit ratings and a default given by FIGS. 15B and 17 is used together with data of a loss shown in FIG. 18. FIG. 18 is a table showing, concerning the MtM mode, an example of information given to each of companies same as the information explained with reference to FIG. 14 in example 1 in which the default mode is explained. In FIG. 18, "profit and loss amount in each of states after one year" represents the profit and loss amount after one year when a obligor is in a credit rating corresponding to the states. As signs affixed to amounts, plus represents a loss and minus represents a profit. A unit is a currency unit (Japanese yen). For example, a description in a space designated by a label "1" of a obligor number and a label "B" of loss and profits in each of states after one year means an event "when a credit rating of a obligor with a obligor number 1 is a B rating after one year, loss of 2,000,000 yen occurs". In general, plural credits are present for one obligor. In FIG. 18, profits and losses caused by plural credits are totaled for each obligor as input data. However, in carrying out the present invention, a profit and loss by credit can also be used as input data.

It is necessary to take into account the transition information to the respective default states shown in FIG. 17 in addition to the rating transition information shown in FIG. 15(2) because maturity of a credit is taken into account in the MtM mode, i.e., a loss can be different depending on time when a obligor falls into a default. For example, when credit maturity is six months, a loss occurs when the obligor falls into a default after five months from a risk measurement point. On the other hand, a loss does not occur when the obligor falls into a default at some time after six months pass (e.g., after eleven months). Therefore, as shown in a row of a obligor number 2 as an example, it is possible that a loss occurs in an early default and a profit due to refund of principal is generated in a default after maturity.

In this way, in addition to the default probability in the case of the MtM mode shown in FIG. 15(2), more detailed information, i.e., the information concerning the transition of the obligors having the respective credit ratings to a default by the respective points shown in FIG. 17 is given. In addition, the losses with respect to the credit ratings and the default states at the respective points shown in FIG. 18 are given. Consequently, it is possible to calculate a loss distribution in the MtM mode that appropriately reflects fluctuation in market values of credits due to fluctuation in credit ratings.

A method of calculating a density function of a loss distribution in the MtM mode using the data shown in FIG. 18 will now be explained. A loss at the time when an ith obligor is in a jth state after one year is represented as $L_{ij}$. In other words, $L_{ij}$ represents a variable corresponding to a numerical value of an "i" row (j+4) column of the table in FIG. 18. In the case of the MtM mode, it is likely that, depending on states of all obligors of a portfolio, a profit is generated rather than a loss. This means that, even if a loss is in a negative area, a loss distribution has a value. Usually, the Laplace transform method can be applied to only a function with a support equal to or larger than 0. Therefore, the Laplace transform method cannot be directly applied to calculation of a density function of a loss distribution in the MtM ode. However, it is possible to give the support equal to or larger than 0 to the function by appropriately translating the loss distribution. Therefore, actually, the Laplace transform method can be applied. Specifically, a function $f_L^*(t)$ is defined by the following formula:

[Formula 95]

$$f_L^*(t) \equiv f_L^{MtM}\left(t + \sum_{i=1}^{N} L_i^{min}\right) \quad (95)$$

where,

[Formula 96]

$$f_L^{MtM}(t): \text{density function of a loss distribution in the } MtM \text{ mode} \quad (96)$$

$$L_i^{min} \equiv \min_j \{L_{ij}\}$$

Since a support of the function $f_L^*(t)$ is equal to or larger than 0, the function can be calculated by applying the Laplace transform method. In actual calculation, Laplace transform of $f_L^*(t)$ is performed as follows:

[Formula 97]

$$\hat{f}_L^*(\lambda) = \int_0^\infty e^{-\lambda t} f_L^*(t) dt \quad (97)$$

$$= \int_{\sum_{i=1}^{N} L_i^{min}}^{\infty} \exp\left[-\lambda\left(t' - \sum_{i=1}^{N} L_i^{min}\right)\right] f_L^{MtM}(t') dt'$$

$$= \int_{\vec{x} \in R^{N_F}} \prod_{i=1}^{N} \left\{\sum_j p_{ij}(\vec{x}) \exp(-\lambda\{L_{ij} - L_i^{min}\})\right\}$$

$$\phi_{N_F}(\vec{x}) d\vec{x}$$

where,

[Formula 98]

$$p_{ij}(\vec{x}) \quad (98)$$

is a conditional state transition probability and represents a probability that the company "i" transits to the jth state under the condition that "values of common risk factors are components of vector x". In the firm-value model, the conditional state transition probability can be calculated from the information shown in FIGS. 13, 15(b), and 17. The conditional transition probability is also necessary in, for example, performing risk measurement in the MtM mode in a Monte Carlo simulation. Since a formula for the conditional transition probability is widely known to those skilled in the art, explanation of the formula is omitted. Since the equation at the bottom of formula 97 satisfies a condition of a portfolio function, the equation can be quickly calculated by applying the method of the present invention. $f_L^*(t)$ can be calculated by subjecting this to Laplace inversion. When $f_L^*(t)$ is obtained in this way, a value of a density function of a loss distribution in the MtM mode can be calculated as follows:

[Formula 99]

$$f_L^{MtM}(t) = f_L^*\left(t - \sum_{i=1}^{N} L_i^{min}\right) \quad (99)$$

In order to calculate a loss for each of the states shown in FIG. 18, it is necessary to calculate a present value of a credit at a risk measurement point and a future value for each of the credit ratings after a risk measurement period (e.g., after one year). For this purpose, the discounted cash flow method that is a method of calculating a present value obvious for those skilled in the art, i.e., calculation for calculating a present value by discounting a cash flow from a credit in future taking into account a predetermined discount rate is performed. In this case, in order to appropriately take into account the cash flow, contract conditions including maturity, a nominal interest rate, and an interest payment/refund of principal schedule can be taken into account. Moreover, a method obvious to those skilled in the art can be used. For example, as the discount rate, a discount rate set by adding an interest rate of a spread by credit rating, on which risks of the respective credit ratings excluding the default are reflected, to an interest rate on a risk-free (no risk) credit (e.g., an interest on government bond) can be used. As a method of calculating the spread by credit rating, there is known a method of calculating the spread by credit rating from information on a yield of a bond, information on a premium of a credit default swap, and the like.

Figure 19:
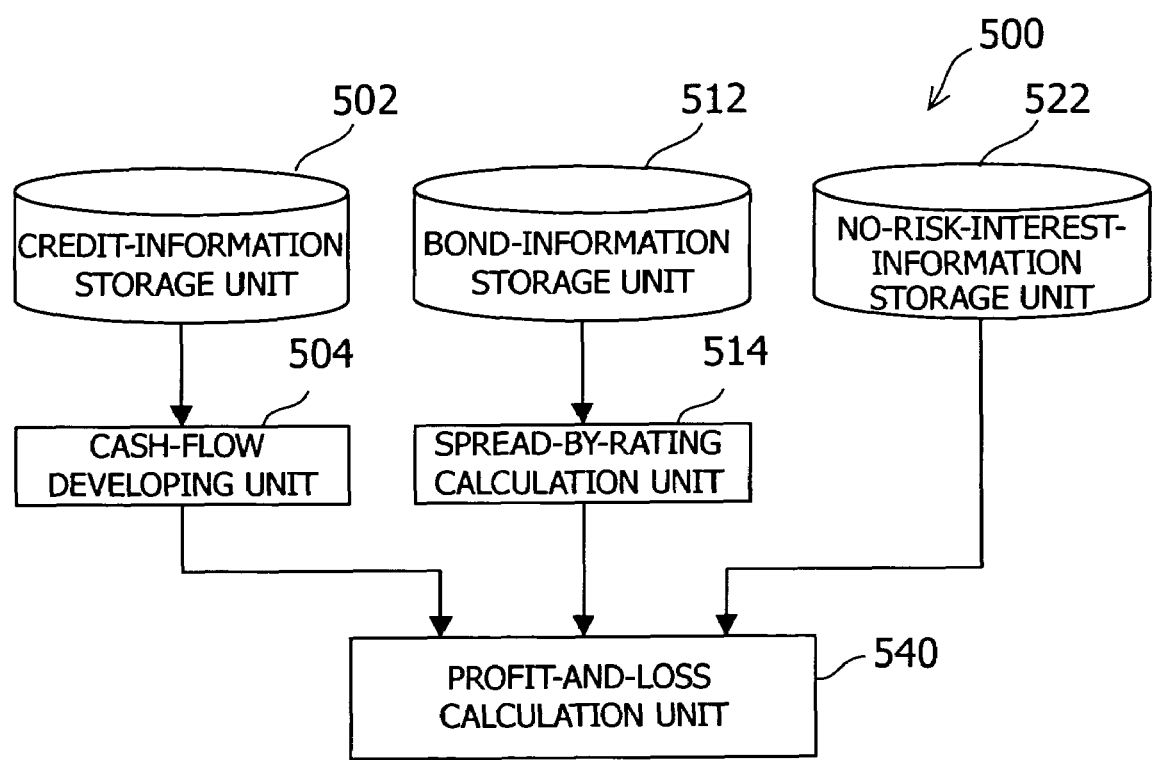
FIG. 19 is a block diagram showing the structure of a computer that calculates a profit and loss amount for each of the states used in measurement in the MtM mode.

A computer in example 9 can include means for performing such calculation in addition to the respective functional means described above. For example, as shown in FIG. 19, information necessary for cash flow development is prepared in a credit-information storage unit 502 and information on a cash flow, i.e., data of the cash flow at respective points is generated by a cash-flow development unit 504 by using the information necessary for cash flow development. Information including yield information of a bond and information on a premium of a credit default swap is prepared in a bond-information storage unit 512. A spread by credit rating is calculated by a spread-by-rating calculating unit 514 by using the information. Moreover, interest rate information of a risk-free credit is prepared in a no-risk-interest-information storage unit 522. Data of the cash flow at the respective points from the cash-flow developing unit 504, data of the spread by credit rating from the spread-by-rating calculating unit 514, and data of the interest rate information of the risk-free credit from the no-risk-interest-information storage unit 522 are combined by a profit-and-loss calculating unit 540 to calculate a present value at a calculation point and a future value for each of the states (credit ratings) after one year. By calculating a result of the calculation for each of the credit ratings, as shown in FIG. 18, a loss (a profit and loss amount) for each of the credit ratings excluding the default is obtained.

The information shown in FIG. 18 can also be created by using an output of an existing system that calculates a present value and future values of a credit. The computer of example 9 can be configured to read data which corresponds to that shown in FIG. 18, supplied externally.

Example 10

An example for performing implementation of a form different from that explained according to example 1 will now be explained. In example 10, specifically, a portfolio function is Laplace transform of a distribution function of a loss distribution. As a form of carrying out the present invention, the structure of a computer program in carrying out calculation according the computer program will be explained using a functional block diagram and flowcharts. In the flowcharts used for explanation of the example below, all initial values of variables and arrays, for which processing for initialization is not clearly described specifically, are set to 0. In the following explanation, notations substantially same as the variables described by the formulas are adopted. However, some of the variables are changed for convenience of implementation in the computer program. Therefore, correspondence between formulas and variables used therein is described when necessary. Specifications of variables necessary in numerical calculation in implementing on a computer are summarized in drawings as appropriate.

Figure 20A:
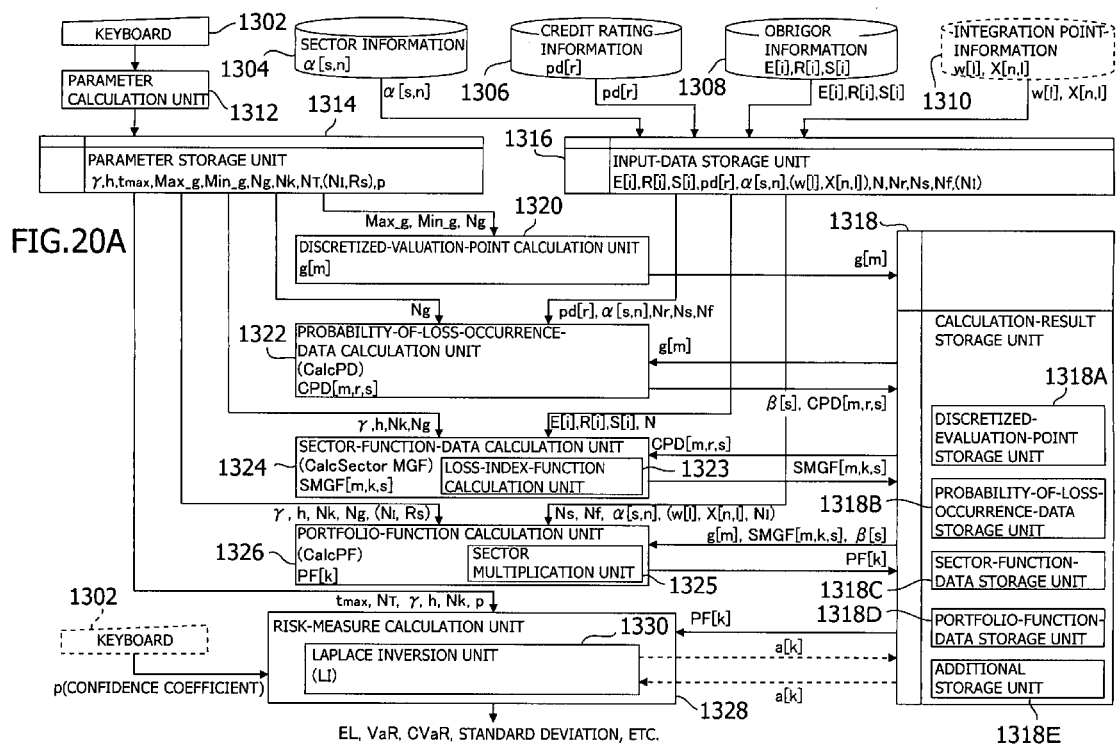
FIG. 20A is a functional block diagram of a computer realized by a program according to an example of the present invention.

FIG. 20A is a block diagram showing the structure of a computer realized by a program according to example 10. In example 10, the computer finally calculates risk measures such as EL, VaR, and CVaR from various parameters inputted from a keyboard 1302 and input data stored in databases 1304 to 1310. Various parameters necessary for calculation are stored in a parameter storage unit 1314. In example 10, the parameters stored in the parameter storage unit 1314 are inputted from the keyboard 1302. However, a method of giving the parameters is not essential in carrying out the present invention. Values set in the program in advance may be used as some of the parameters or the parameters may be calculated by a parameter calculating unit 1312 on the basis of information inputted from the keyboard 1302. Necessary data is stored in an input-data storage unit 1316 from the respective databases 1304, 1306, 1308, and 1310. The parameter storage unit 1314, the input-data storage unit 1316, and a calculation-result storage unit 1318 can be realized by an area secured in a main memory or files and the like managed by an OS in a hard disk drive. In example 10, default, probabilities of respective obligors (companies) are given by credit ratings and default probabilities by credit rating of the obligors as shown in FIGS. 14 and 15(a).

In example 10, in order to specify a obligor or a credit rating in the program, a variable (an index) that takes continuous integer values is used instead of IDs such as obligor IDs or credit rating IDs. Examples of the index include a obligor number "i" that is an index for specifying a obligor (a company), an auxiliary variable number "k" that is an index for specifying an auxiliary variable used for Laplace inversion, an integration point number "l" that is an index for specifying an integration point, an evaluation point number "m" that is an index for specifying a discretized valuation point, a credit rating number "r" that is an index for specifying a credit rating, a sector number "s" that is an index for specifying a sector, and a factor number "n" that is an index for specifying a set of common risk factors. Indexes used in example 10 are shown in (1) in FIG. 20B. These indexes are used for specifying elements of array or control of loops in the program. In the following explanation and the flowcharts referred to below, the indexes shown in (1) in FIG. 20B are used. In the following explanation, to avoid confusion with the index "i" representing a obligor number, an imaginary unit is represented by a character (2) in FIG. 20B is a table for explaining variables representing the parameters shown in the parameter storage unit 1314 in FIG. 20A. A column of "type" in the table indicates representation of a variable in the computer. For example, "double" indicates a variable treated as a double precision floating point number and "long" indicates a variable treated as a double precision integer. However, the variable types described above are only examples. It is possible to carry out the present invention even if different variable types are used. Among these parameters, γ and h that are parameters used for Laplace inversion can be calculated by the parameter calculating unit 1312 according to the equations of formula 47 by inputted a parameter n for defining approximation accuracy of the Poisson method and an upper limit value $t_{max}$ of a loss used for calculation from the keyboard 1302.

FIG. 20C is a table showing the contents of the variables representing the input data shown in the input-data storage unit 1316. A column of "input DB" indicates which of the databases (DBs) in FIG. 20A the respective variables are obtained. Concerning a variable treated as an array, information on an subscript of the array is described in a column of "subscript". In a column of "relation with an input data example", a relation between the input data examples shown in FIGS. 13 to 18 and the respective variables is briefly explained.

The calculation-result storage unit 1318 is a storage device that stores data obtained in a calculation process. The calculation-result storage unit 1318 can be realized by using, for example, an area secured in the main memory. The calculation-result storage unit 1318 includes a discretized valuation point storage unit 1318A that stores data of discretized valuation points, a probability-of-loss-occurrence-data storage unit 1318B that stores probability of loss occurrence data, a sector-function-data storage unit 1318C that stores sector function data, and a portfolio-function-data storage unit 1318D that stores data of portfolio functions. Further, the calculation-result storage unit 1318 also includes an additional storage unit 1318E that stores data other than those described above.

The discretized valuation point calculating unit 1320 calculates g[m] that is an array in which values of discretized valuation points are stored. g[m] is discretized valuation point data in example 10. Values indicated by the variable $g_m$ of formula 40 are stored in respective elements of the g[m]. In order to calculate g[m], a maximum Max_g of the discretized valuation points, a minimum Min_g of the discretized valuation points, and the number $N_g$ of the discretized valuation points stored in the parameter storage unit 1314 are inputted to the discretized valuation point calculating unit 1320. In the processing of the discretized valuation point calculating unit 1320, the discretized valuation point calculating unit 1320 calculates respective elements of the array g[m] with respect to all discretized valuation point numbers "m" on the basis of the equation on the right side of formula 40 and stores a result of the calculation in the calculation-result storage unit 1318.

The probability-of-loss-occurrence-data calculating unit 1322 calculates conditional default probabilities by discretized valuation point, by credit rating, and by sector on the basis of inputs of $N_g$, an array pd[r] of default probabilities by credit rating, an array α[s, n] of sensitivity coefficients for each of the sectors, the number Nr of credit ratings, the number $N_s$ of the sectors S, the number Nf of common risk factors, and g[m], outputs an array CPD[m, r, s] having the discretized valuation point number "m", the credit rating number "r", and the sector number "s" as subscripts and an array β[s] that stores a value of βs of the second equation of formula 30. An equation for a conditional default probability is indicated by the third equation of formula 31. In the present invention, since sector variable is made discrete to execute calculation, conditional default probabilities appearing in later calculation take only a finite number of values. CPD[m, r, s] is an array in which values of all conditional default probabilities appearing in the later calculation are stored and is probability of loss occurrence data in example 10. Specifically, values of respective elements of β[s] and CPD[m, r, s] are calculated on the basis of the following equations, respectively:

[Formula 100]

$$\beta[s] = \sqrt{\sum_{n=1}^{N_f} (\alpha[s, n])^2} \qquad (100)$$

$$CPD[m, r, s] = \Phi\left(\frac{\Phi^{-1}(pd[r]) - \beta[s] \cdot g[m]}{\sqrt{1 - (\beta[s])^2}}\right)$$

In this module, the calculation of formula 100 is performed for all combinations [m, r, s] satisfying $1 \leq m \leq N_g$, $1 \leq r \leq Nr$, $1 \leq s \leq N_s$. Inputted $N_g$ is stored in the parameter storage unit 1314, pd[r], α[s, n], Nr, $N_s$, and Nf are stored in the input-data storage unit 1316, and g[m] is stored in the calculation-result storage unit 1318. Calculated β[s] and CPD[m, r, s] are stored in the calculation-result storage unit 1318 and retrieved from other modules and used for calculation later. In the processing of the probability-of-loss-occurrence-data calculating unit 1322, it is necessary to calculate values of a distribution function of the standard normal distribution and the inverse function thereof. However, since a method of configuring a module for calculating these function values are widely known, the module is omitted from the block diagram.

In example 10, in order to increase speed of calculation of a loop later, the probability-of-loss-occurrence-data calculating unit 1322 calculates data of a probability of loss occurrence. However, this processing is not essential in carrying out the present invention. For example, a sector-function-data calculating unit 1324 explained next may perform processing for calculating a probability of loss occurrence.

The sector-function-data calculating unit 1324 calculates data of the conditional moment generating function by sector for each of the discretized valuation points and for each of the auxiliary variables on the basis of inputs of γ and h that are parameters used for calculation of Laplace inversion, the number $N_k$ of auxiliary variables used for Laplace inversion, $N_g$, an array E[i] in which exposures of obligors are stored, an array R[i] in which credit ratings of the obligors are stored, an array S[i] in which sectors of the obligors are stored, the number of obligors N, and CPD[m, r, s] and outputs an array SMGF[m, k, s] having the discretized valuation point number "m", the auxiliary variable number "k", and the sector number "s" as subscripts. Respective elements of SMGF[m, k, s] are values calculated as λ=γ+jkh (j is an imaginary unit) and $y^S$=g[m] on the second equation of formula 31, and are calculated by the following equation:

[Formula 101]

$$SMGF[m, k, s] = \prod_{S[i]=s} \{1 - CPD[m, R[i], S[i]] + \qquad (101)$$

$$CPD[m, R[i], S[i]] \times \exp[(\gamma + jkh)E[i]]\}$$

γ, h, $N_k$, and $N_g$ inputted to this module are stored in the parameter storage unit 1314, E[i], R[i], S[i], and N are stored in the input-data storage unit 1316, and CPD[m, r, s] is stored in the calculation-result storage unit 1318. The processing of the sector-function-data calculating unit 1324 is processing of a CalcSectorMGF module. The processing of the CalcSectorMGF module will now be explained in more detail using the flowcharts of FIGS. 21A and 21B. SMGF[m, k, s] calculated by this module is sector function data in example 10.

Figure 21A:
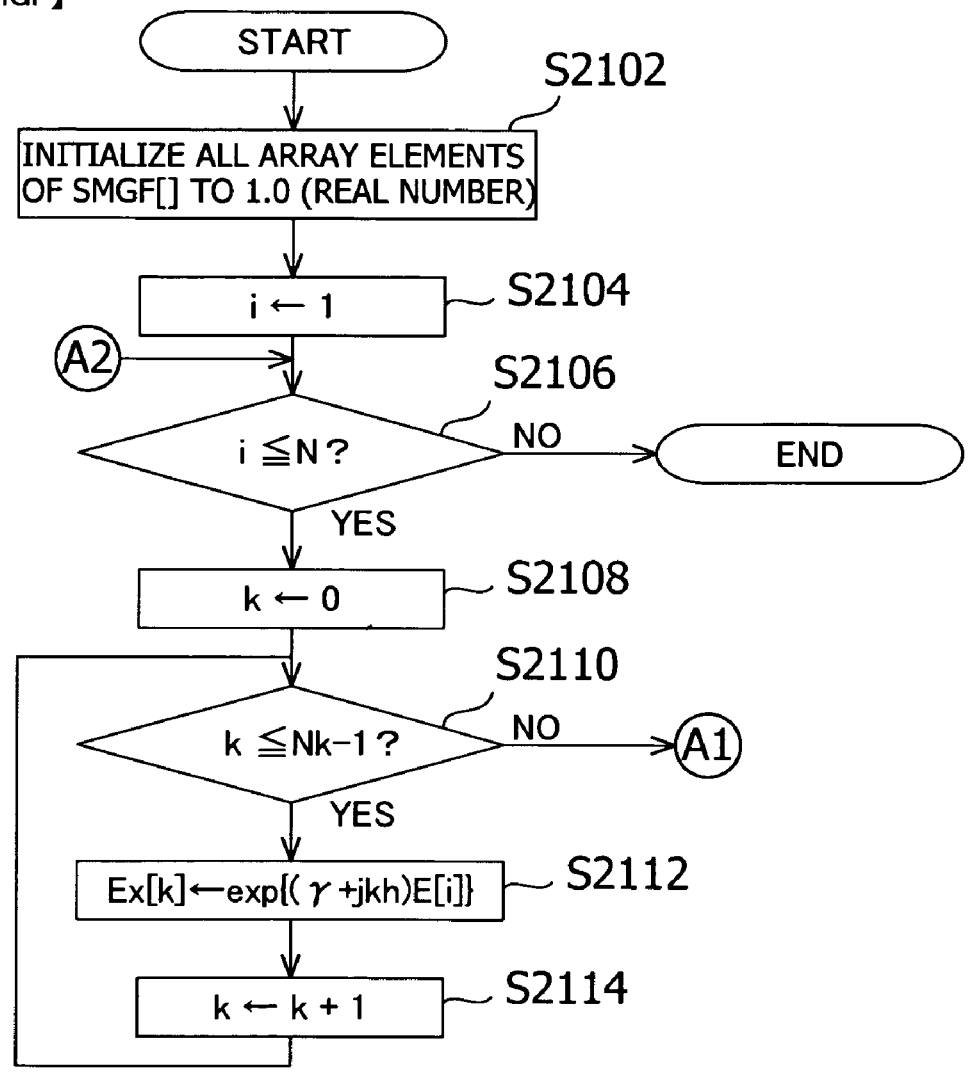
FIG. 21A is a flowchart representing a processing flow of the program according to the example of the present invention.
Figure 21B:
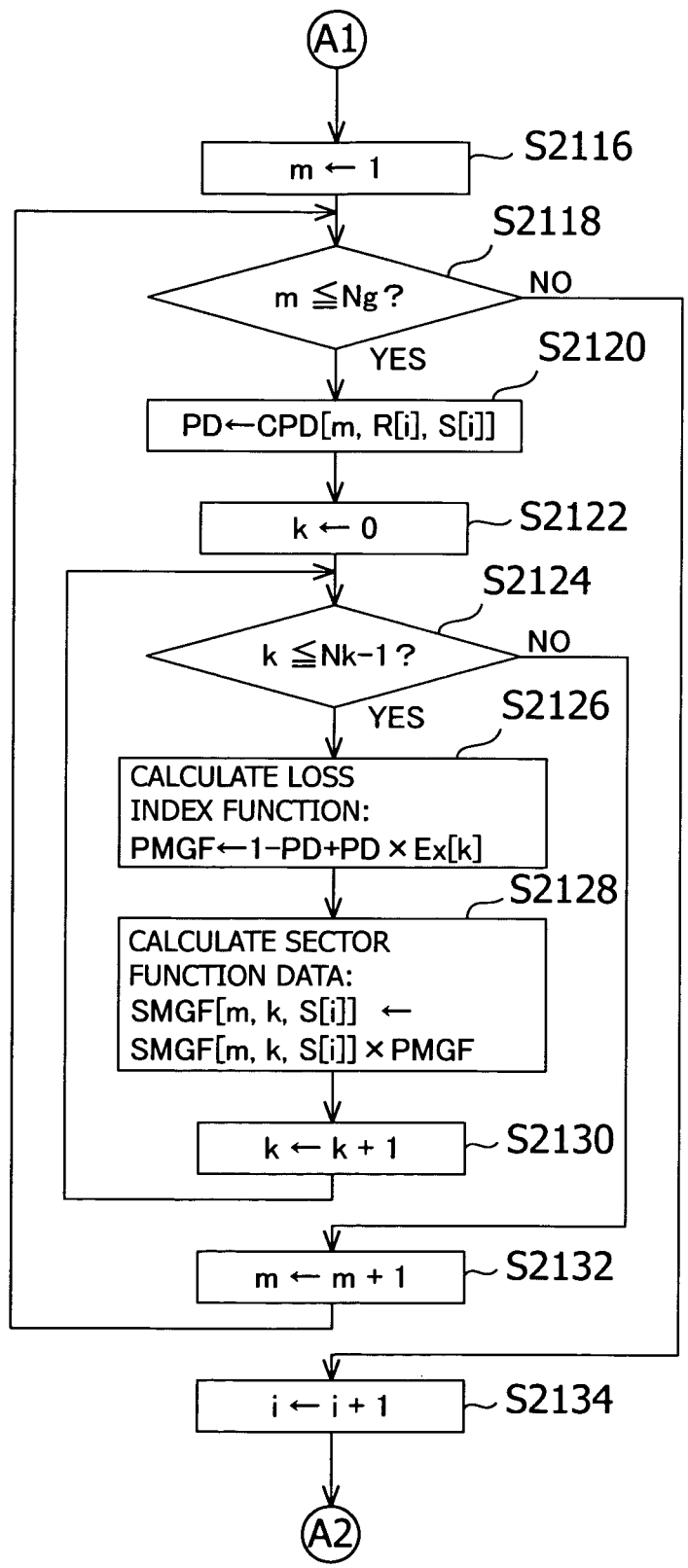
FIG. 21B is a flowchart representing the processing flow of the program according to the example of the present invention.

FIGS. 21A and 21B are flowcharts showing a processing flow of the CalcSectorMGF module that calculates data of the conditional moment generating function by sector. In the processing of the CalcSectorMGF module, first, the CalcSectorMGF module initializes all elements of the array SMFG [m, k, s] to a real number 1 (S2102), initializes the index "i" indicating a obligor number to 1 (S2104), and compares the index "i" with the variable N representing the number of obligors of a measurement object portfolio to perform final judgment (S2106). When the index "i" indicating a obligor number is equal to or smaller than the variable N representing the number of obligors, the CalcSectorMGF module initializes the index "k" indicating an auxiliary variable number to 0 (S2108). The CalcSectorMGF module substitutes, as long as the index "k" is a value equal to or smaller than $N_k$−1, a value exp[{γ+jkh}E[i]] in an array Ex[k] representing a coefficient of an exponential function of a complex number (S2112) and increments "k" (S2114).

Subsequently, the CalcSectorMGF module initializes the index "m" designating a discretized valuation point to 1 (S2116) and, for "m" equal to or smaller than Ng (S2118), substitutes CPD[m, R[i], S[i]] in a local variable PD (S2120).

While increasing "k" in a range of 0 to $N_k-1$ (S2122, S2124, S2130), the CalcSectorMGF module calculates 1−PD+PD× Ex[k] and substitutes the same in a variable PMGF (S2126) and multiplies an array element SMGF[m, k, S[i]] with PMGF (S2128). By performing the processing while incrementing "m" (S2132), the calculation concerning the obligor "i" in a product on the right side of formula 101 is finished. By applying this processing to all obligors included in a portfolio (S2134), all array elements SMGF[m, k, s] are calculated.

In the processing of the CalcSectorMGF module, the array Ex[k] representing a coefficient of the exponential function of a complex number gives a value of the exponential function (a complex number value) in the third term of the product on the right side of formula 101. This is calculated earlier and obtained as a numerical array is to, since the auxiliary variable number "k" is looped (S2122 to S2130) in the inside of a loop for scanning the discretized valuation point number "m" (S2118 to S2132), remove processing of numerical calculation of the exponential function with a high load from the loop of "m" and reduce computational complexity.

PMGF calculated in the process of the processing of the CalcSectorMGF module is loss index function data in example 10. The respective steps S2108 to S2114, S2120, and S2126 are processing steps for calculating PMGF that is the loss index function data. In other words, in example 10, the sector-function-data calculating unit 1324 includes the loss-index-function calculating unit 1323 (FIG. 20A). In this way, in the techniques for improving calculation processing speed, a certain arithmetic unit may advance processing while retrieving other arithmetic units. Such cases are also included in implementation forms of the present invention.

The portfolio-function calculating unit 1326 calculates a portfolio function on the basis of input of $\gamma$, h, $N_k$, $N_g$, $N_s$, Nf, $\alpha$[s, n], weight values w[l] related to integration points, an array X[n, l] of integration points having meaning as common risk variables, the number $N_I$ of integration points, g[m], $\beta$[s], and SMGF[M, k, s] and outputs an array PF[k] having the auxiliary variable number "k" as an subscript. PF[k] is a portfolio function data in example 10. Respective elements of the array PF[k] are values calculated as $\lambda=\gamma+jkh$ on the right side of formula 34 and further divided with $\gamma+jkh$. Inputted $\gamma$, h, $N_k$, and $N_g$ are stored in the parameter storage unit 1314, $N_s$, Nf, $\alpha$[s, n], w[l], X[n, l], and $N_I$ are stored in the input-data storage unit 1316, and g[m], $\beta$[s], and SMGF[m, k, s] are stored in the calculation-result storage unit 1318. The processing of the portfolio-function calculating unit 1326 is processing of a CalcPF module. The processing of the CalcPF module will now be explained in more detail using the flowcharts of FIGS. 22A and 22B.

Figure 22A:
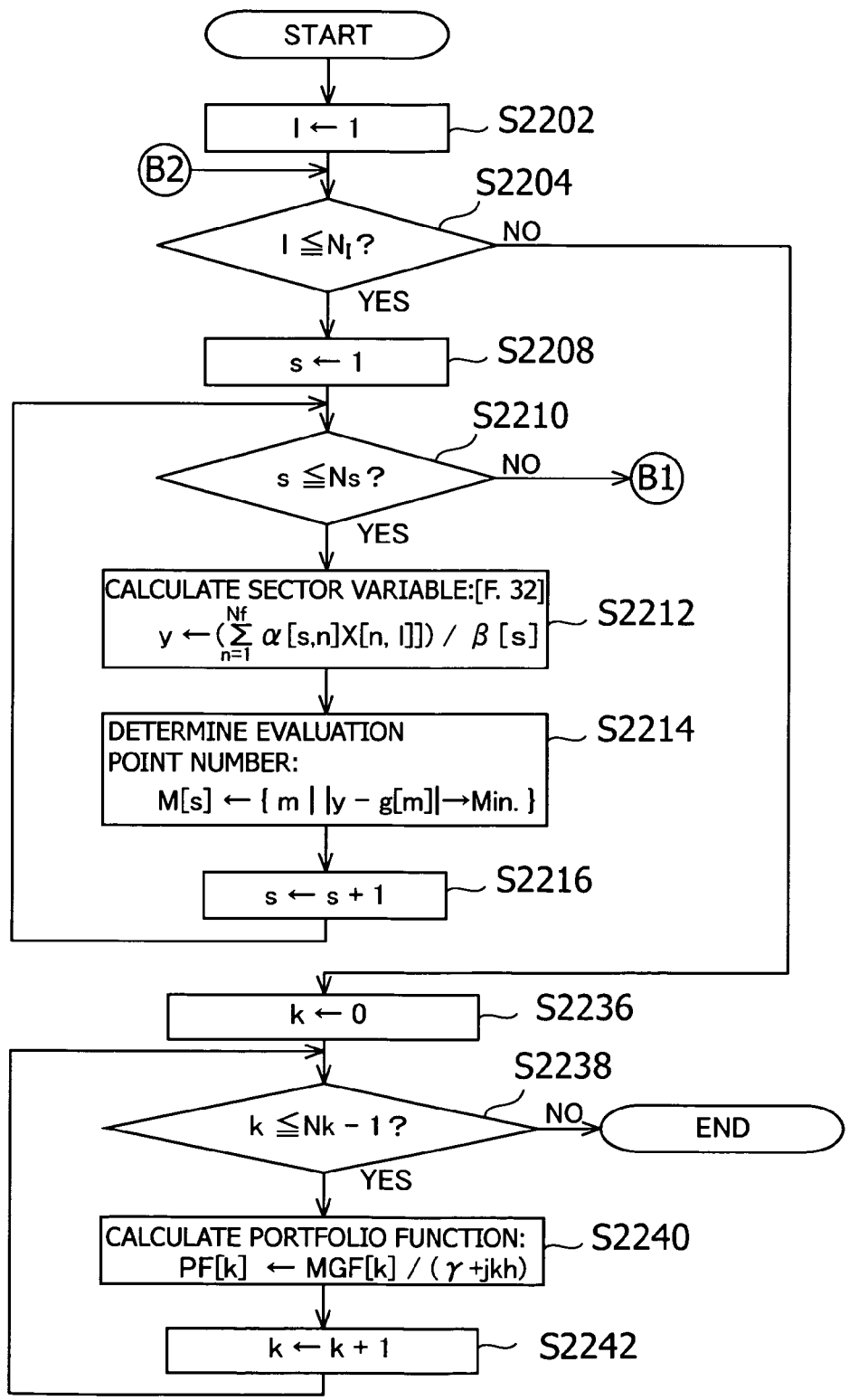
FIG. 22A is a flowchart representing a processing flow of the program according to the example of the present invention.
Figure 22B:
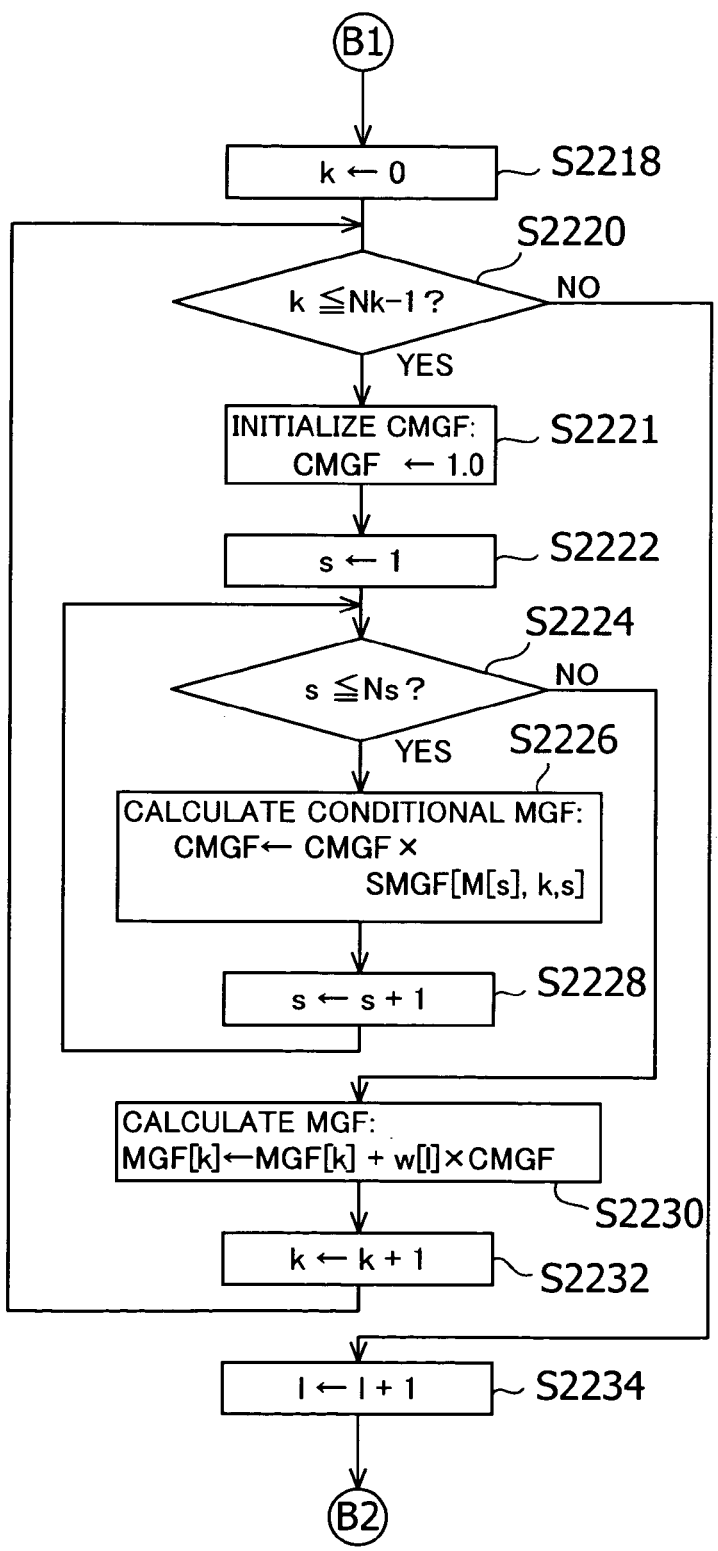
FIG. 22B is a flowchart representing the processing flow of the program according to the example of the present invention.

FIGS. 22A and 22B are flowcharts showing a processing flow of the CalcPF module that calculates the array PF[k]. In the processing of the CalcPF module, first, the CalcPF module calculates, with respect to each of the integration points, an evaluation point number, which is an index for designating a discretized valuation point, for each of the sectors (S2208 to S2216) and, then, calculates products of conditional moment generating functions by sector of all the sectors and calculates a value of the conditional moment generating function (S2222 to S2228). The CalcPF module multiplies the conditional moment generating function with a weight incidental to the integration point and adding up them for all the integration points (S2230) to thereby calculate data MGF[k] of the moment generating function. Finally, the CalcPF module divides the data MGF[k] of the moment generating function with a value of an auxiliary variable corresponding to the auxiliary variable number "k" to calculate data PF[k] of the portfolio function (S2236 to S2242).

In the processing of the CalcPF module, the CalcPF module executes calculation for each of the integration points. First, the CalcPF module initializes the index "l" for a loop indicating an integration point to 1 (S2202) and, while comparing the index "l" with the variable $N_I$ representing the number of integration points to perform final judgment (S2204), increments the index "l" (S2234).

When the index "l" is incremented to a new value, first, the CalcPF module determines an array M[s], which represents a discretized valuation point number, having the index "s" representing a sector as an subscript (S2208 to S2216). M[s] corresponds to $m^S_1$ appearing on the right side of formula 34. To determine M[s], the CalcPF module only has to calculate a sector variable with formula 32 and substitute the sector variable in y (S2212) while increasing the index "s" in a range up to the variable $N_s$ representing a sector number (S2208, S2210, and S2216) and specify an array number "m", which minimizes |y−g[m]| and set M[s] to "m" (S2214). Consequently, an evaluation point number M[s] that gives a discretized valuation point $g_m$, which best approximates a value of a sector risk factor $y^s$, is determined for each of the sector numbers s. Consequently, only if the sector number "s" is designated, a discretized valuation point number corresponding to an integration point is determined and the sector function data SMGF[m, k, s] calculated by the sector-function-data calculating unit 1324 can be retrieved.

Subsequently, the CalcPF module calculates the conditional moment generating function corresponding to the integration point and calculates a weighted sum in a weight incidental to the integration point. In the processing in example 10, calculation of $N_k$ values of the moment generating function necessary for Laplace inversion is performed in one integration point loop. First, the CalcPF module initializes the index "k" indicating the auxiliary variable number to 0 (S2218) and, with respect to "k" equal to or smaller than $N_k-1$ (S2220), calculates the conditional moment generating function (S2221 to S2228). In the calculation of the conditional moment generating function, first, the CalcPF module initializes a variable CMGF that stores data of the conditional moment generating function to a real number 1 (S2221), initializes the index "s" representing the sector number to 1 (S2222), and, while incrementing "s" (S2228), multiplies CMGF with sector function data SMGF[M[s], k, s] (S2226). By executing this calculation on all the sectors (S2224), CMGF that is data of the conditional moment generating function corresponding to the integration point number "l" and the auxiliary variable number "k" is calculated. Moreover, after multiplying CMGF by the weight value w[l] corresponding to the integration point, the CalcPF module adds CMGF to a component MGF[k] of the auxiliary variable number "k" of the moment generating function (S2230). By executing this calculation on all k's (S2232), calculation of contribution from one integration point to the integral value is finished.

By applying the calculation to all the integration points (S2234), data MGF[k] of the moment generating function is obtained. Moreover, for each of the auxiliary variable numbers "k" (S2236, S2238, and S2242), the CalcPF module divides the data MGF[k] of the moment generating function with $\gamma+jkh$ (S2240) to thereby calculate data PF[k] of the portfolio function. PF[k] calculated in this way is stored in the calculation-result storage unit 1318 (FIG. 20A).

CMGF calculated in the process of the CalcPF module is an approximate value of the conditional portfolio function in example 10. Steps S2208 to S2216 and S2221 to S2228 are processing steps for taking a product of the sector function data to calculate CMGF, i.e., processing of a sector multiplying step. In this way, in example 10, the portfolio-function calculating unit 1326 includes the sector multiplying unit 1325 (FIG. 20A). Steps S2202, S2204, S2218, S2220, and S2230 to S2234 are processing steps for multiplying CMGF that is the data of the conditional portfolio function by the weight w[l] related to the integration point and adding up CMGF. MGF[k] calculated by these kinds of processing is an average over the common risk factors of the conditional portfolio function. Moreover, in steps S2236 to S2242, MGF[k] is divided by $\gamma+jkh$. This is because the portfolio auxiliary variable function in example 10 is given by an inverse of the auxiliary variable.

A risk-measure calculating unit 1328 calculates risk measures such as VaR, CVaR, and EL on the basis of input of $\gamma$, h, $t_{max}$, $N_k$, $N_T$, p, and PF[k]. $N_T$ is a parameter for determining the number of losses for calculating a value of the distribution function and p is a confidence coefficient in calculating VaR and CVaR. The risk-measure calculating unit 1328 includes an Laplace inversion unit 1330 that executes Laplace inversion. When risk measures are calculated, the outputs of the Laplace inversion unit 1330 are used. Inputted $\gamma$, h, $t_{max}$, $N_k$, $N_T$, and p are stored in the parameter storage unit 1314 and PF[k] is stored in the calculation-result storage unit 1318.

In example 10, the Poisson-QD method (the de Hoog algorithm) is used in executing Laplace inversion. the inputs of the Laplace inversion unit 1330 are $\gamma$, h, t, and $N_k$ and an array C[k] of a complex number type having $N_k$ elements and an output of the Laplace inversion unit 1330 is a value of a function in t. The processing of the Laplace inversion unit 1330 is processing of an Laplace inversion module LI. In the following explanation, a function for calculating a value with the Laplace inversion unit 1330 is represented as f(t) and processing of the Laplace inversion module LI in example 10 will now be explained. Note that f(t) is a Laplace-transformable function that takes a real number value on the real axis.

According to the Poisson method, f(t) can be approximated by the following series:

[Formula 102]

$$f(t) = \frac{h}{\pi}\exp(\gamma t)\text{Re}\left\{\sum_{k=0}^{\infty} c_k z^k\right\} \quad (102)$$

$$\hat{f}_L(\lambda) = \int_0^{\infty} e^{-\lambda t} f_L(t) dt,$$

$$c_0 = \frac{1}{2}\hat{f}(\gamma),$$

$$c_k = \hat{f}(\gamma + jkh)$$

$$(k \geq 1),$$

$$z = \exp(jht)$$

A value of a function obtained by subjecting f(t) appearing in the series of formula 102 to Laplace transform is given to respective elements of the array C[k] that is the input of the Laplace inversion module LI. In other words,

[Formula 103]

$$C[k]=\hat{f}(\gamma+jkh) \; (k=0, 1, \ldots, N_k-1) \quad (103)$$

First, the Laplace inversion module LI calculates coefficients of continued fractions from the array C[k] of coefficients according to the QD algorithm. Specifically, the Laplace inversion module LI executes the calculation of the recursive formula of formula 51 with $c_0$ set to C[0]/2 and $c_k$ set to C[k] (k=1, ..., $N_k$–1) and obtains coefficients $a_k$ of formula 50. Then, the Laplace inversion module LI executes the calculation of formula 54 using the calculated coefficients $a_k$ of the continued fractions and the inputted t and calculates $A_M$ and $B_M$, where z appearing in formula 54 is calculated from the input value t according to the fifth equation of formula 102. Finally, the Laplace inversion module LI outputs, as an approximate value of f(t),

[Formula 104]

$$\frac{h}{\pi}\exp(\gamma t)\text{Re}\left\{\frac{A_M}{B_M}\right\} \quad (104)$$

The calculation of the recursive formula of formula 51 and formula 54, which is main processing of the Laplace inversion module LI, can be executed by only the four rules of arithmetic. Therefore, the processing of the module can be extremely quickly executed. Therefore, values f(t) of functions with respect to various t's can be quickly calculated. Among the kinds of processing performed by the Laplace inversion module LI, the processing of formula 51 does not depend on the variable t. Therefore, when a value of f(t) is calculated with respect to plural values $t_0$, $t_1$, etc. of t, it is possible to execute the processing of formula 51 only when a value for $t_0$ is calculated, store the obtained coefficients $a_k$ of continued fractions in the calculation-result storage unit 1318 as an array a[k], and, when values after $t_1$ are calculated, use the array a[k] stored in the calculation-result storage unit 1318, and omit the processing of formula 51. By adopting such processing, processing time in calculating a value of a function with respect to plural t's can be further reduced.

The present invention can also be carried out in another form of example 10. In example 10, data of the distribution function can also be calculated by, with the processing for dividing the data MGF[k] of the moment generating function by $\gamma+jkh$ in the portfolio-function calculating unit 1326 (S2236 to S2242) omitted and the data MGF[k] of the moment generating function set as an output of the portfolio-function calculating unit 1326, performing processing for dividing MGF[k] by $\gamma+jkh$ in the risk-measure calculating unit 1328 and inputting a result of the processing to the Laplace inversion module LI. In this case, processing up to the processing for dividing MGF[k] by $\gamma+jkh$ in the risk-measure calculating unit 1328 can be interpreted as a portfolio-function calculating step. Therefore, the processing performed in this way is also included in the implementation forms of the present invention.

From formula 43, by setting the portfolio function data PF[k] obtained by the portfolio-function calculating unit 1326 as an input of the Laplace inversion module LI, it is possible to calculate a value of the distribution function of the loss distribution. In other words, with C[k] set as follows:

[Formula 105]

$$C[k]=PF[k] \; (0 \leq k \leq N_k-1) \quad (105)$$

It is possible to calculate values of the distribution function in a wide range of losses by repeatedly executing the processing of the Laplace inversion module LI while changing the loss t. Therefore, risk measures such as EL, VaR, CVaR, and a standard deviation can be easily calculated. For example, EL as an average of the distributions can be calculated as follows:

[Formula 106]

$$EL = \sum_{W=0}^{N_T-1} \frac{t_W + t_{W+1}}{2}[F_L(t_{W+1}) - F(t_W)] + t_{N_T} \times (1 - F_L(t_{N_T})) \quad (106)$$

$$t_W = \frac{W}{N_T} t_{max} (W = 0, \ldots N_T)$$

If an $N_T$ value is set to about 1,000, EL can be sufficiently accurately calculated. To calculate VaR of a confidence coefficient p, a loss t with which a value of the distribution function is p only has to be calculated by an iterative method of the dichotomy. To calculate CVaR, the following calculation only has to be performed.

[Formula 107]

$$CVaR = \qquad (107)$$
$$\frac{1}{1-p}\left\{\sum_{W=0}^{N_T-1} \frac{t'_W + t'_{W+1}}{2}[F_L(t'_{W+1}) - F(t'_W)] + t'_{N_T} \times (1 - F_L(t'_{N_T}))\right\}$$

$$t'_W = \frac{W}{N_T}(t_{max} - VaR) + VaR \ (W = 0, \ldots N_T)$$

It is easy to calculate statistic values such as variance, a standard deviation, a degree of distortion, a degree of sharpness, a median, and a quartile of a loss distribution. All of such statistic values can be outputs of the risk-measure calculating unit 1328.

The risk-measure calculating unit 1328 can be configured in various ways according to risk measures to be calculated, a method of using a system, and the like. For example, when VaR and CVaR of a certain fixed confidence coefficient are reported every time, the risk-measure calculating unit 1328 may be given with the confidence coefficient p in a program in advance and calculate risk measures. The risk-measure calculating unit 1328 may be inputted with the confidence coefficient p from the keyboard 1302, calculate VaR and CVaR, and displays the VaR and CVaR on a display or may be inputted with the loss t, calculate a value of the distribution function corresponding to t and display the value on the display.

In this way, according to example 10, various risk measures such as EL, VaR, and CVaR are appropriately calculated. Specifications of the variables appearing in the flowcharts used for the explanation of the CalcSectorMGF module and the CalcPF module are summarized in FIGS. 23, 24A, and 24B. In the tables of the specifications of the variables, variables with "complex" in a column "type" are variables treated as complex numbers in the program. Various methods of treating complex numbers in a computer program are known. The present invention can be carried out whatever method is used.

In example 10, the processing in performing Laplace inversion with the Poisson-QD method (the de Hoog algorithm) is described. However, it is easy to perform processing using other fast Laplace inversion methods. For example, when an infinite series method other than the Poisson method is used, a value of the portfolio function with respect to a value of the auxiliary variable different from formula 56 is necessary in calculating a coefficient of a series. However, since the method of calculating the portfolio function according to example 10 does not depend on a value of the auxiliary variable, the processing according to example 10 can be used even in such a case. When the processing is changed to only the processing of the Laplace inversion unit 1330, it is also easy to use a series acceleration method other than the QD method. In this way, the present invention can be carried out by being combined with various Laplace inversion methods. Moreover, if a portfolio function to be calculated is a characteristic function or a function obtained by dividing the characteristic function by a product of an auxiliary variable of Fourier transform and an imaginary unit and the processing of the Laplace inversion unit 1330 is changed to processing of Fourier transform, in the same manner as example 10, it is possible to calculate the density function or the distribution function with Fourier transform.

As a significant advantage of example 10, sizes of arrays stored in the calculation-result storage unit 1318 are sufficiently small and storage means that can be quickly accessed like an area secured in the main memory can be used as the calculation-result storage unit 1318. By adopting such a configuration, it is possible to quickly perform the processing of the CalcSectorMGF module and the CalcPF module. Moreover, in example 10, sizes of all arrays stored in the calculation-result storage unit 1318 do not depend on the number of obligors N. Therefore, even a large portfolio including the number of obligors as large as several million can be processed by using the calculation-result storage unit 1318 as an area secured in the main memory.

Example 11

In example 11, as a modification of example 10, processing performed by using the Monte Carlo integration method in the calculation of the portfolio-function calculating unit 1326 will now be explained. Therefore, a CalcPF_MC module is used instead of the CalcPF module in example 10. Otherwise, example 11 is the same as example 10. In example 11, the database 1310 in which integration point information is stored is unnecessary and w[l], X[n, l], and $N_I$ are not stored in the input-data storage unit 1316. On the other hand, the number of integration points $N_I$ and a random number seed Rs are inputted from the keyboard 1302. These variables are stored in the parameter storage unit 1314 and, then, used in the portfolio-function calculating unit 1326.

In the calculation of the portfolio-function calculating unit 1326 that uses the Monte Carlo integration method, the portfolio-function calculating unit 1326 calculates portfolio function data on the basis of inputs of γ, h, $N_k$, $N_g$, $N_s$, Nf, $N_I$, Rs, α[s, n], g[m], β[s], and SMGF[m, k, s] and outputs an array PF[k] having the auxiliary variable number "k" as an subscript. Respective elements of PF[k] are values calculated as λ=γ+jkh (j is an imaginary unit) on the right side of formula 34 and further divided by γ+jkh. PF[k] is a portfolio function data in example 11. Unlike the CalcPF module explained with reference to FIGS. 22A and 22B, the weight w[l] is calculated in the CalcPF_MC module.

Figure 25A:
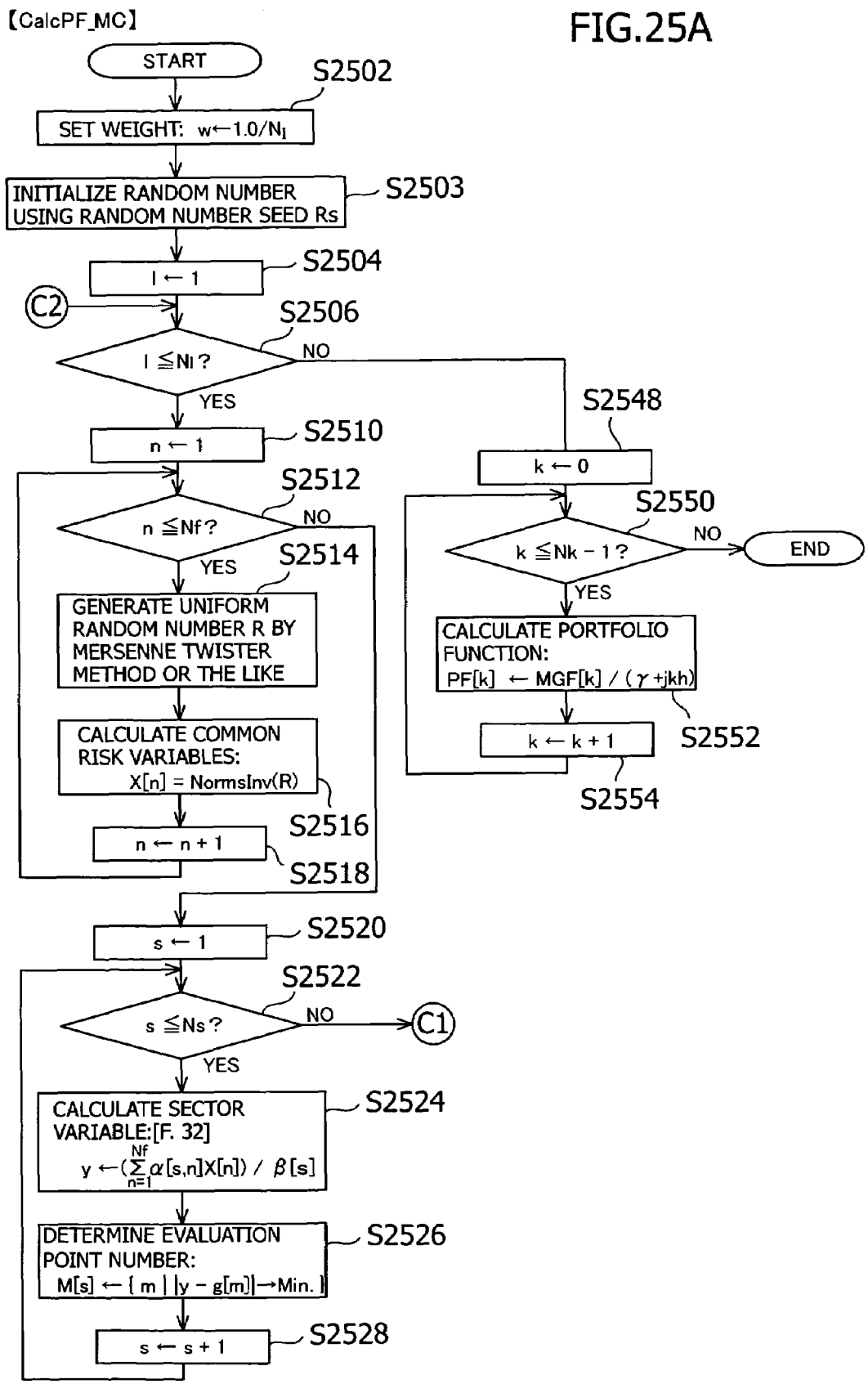
FIG. 25A is a flowchart representing a processing flow of a program according to an example of the present invention.
Figure 25B:
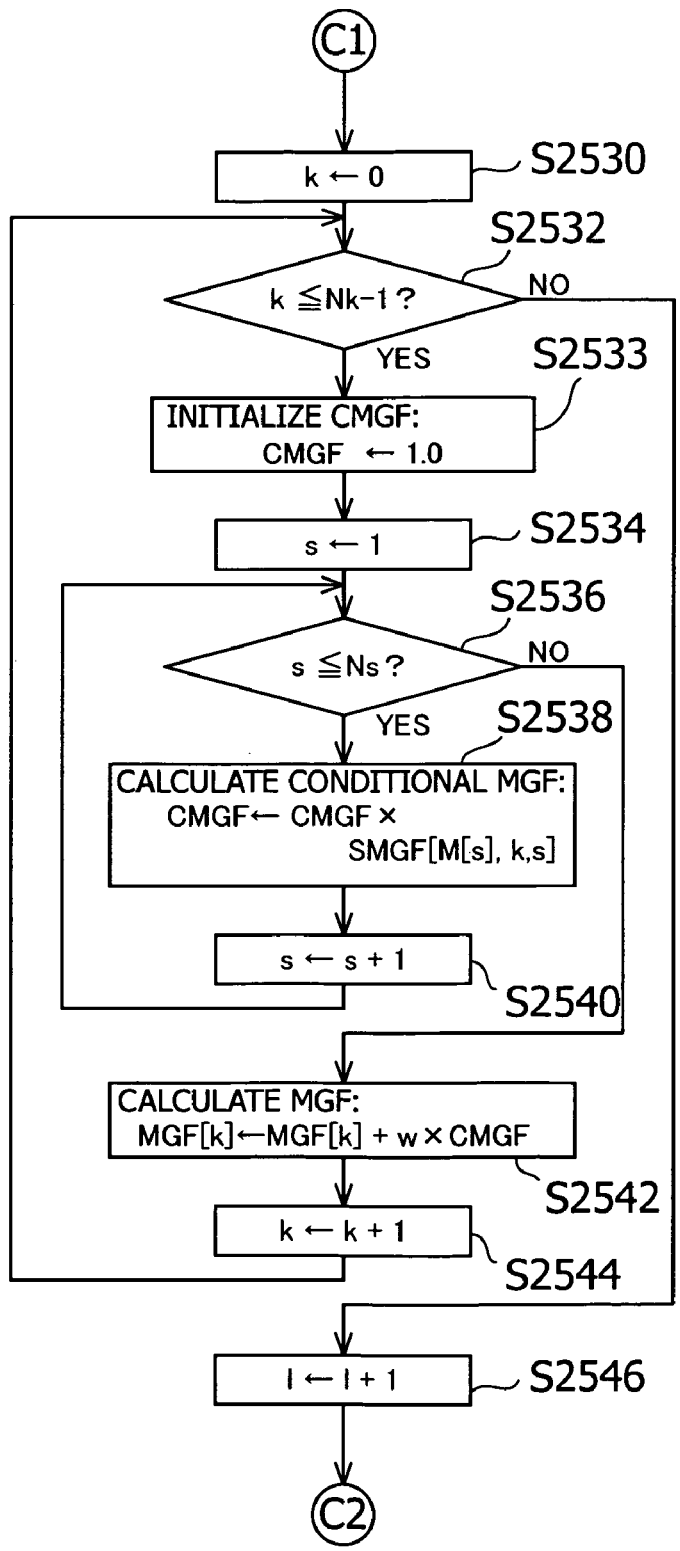
FIG. 25B is a flowchart representing the processing flow of the program according to the example of the present invention.

FIGS. 25A and 25B are flowcharts showing operations of the CalcPF_MC module. Differences from the operations of the CalcPF module shown in FIGS. 22A and 22B are only that the CalcPF_MC module sets a weight that is uniform in the number of integration points $N_I$ (S2502), performs processing for initializing a random number (S2503), and performs processing for generating random numbers and calculates common risk variables (S2510 to S2518). The other processing is the same as the processing shown in FIGS. 22A and 22B. Specifications of variables used by the CalcPF_MC module are summarized in FIGS. 26A and 26B.

As described above, the uniform weight is used in Monte Carlo integration. Therefore, first, the CalcPF_MC module performs processing for setting a weight (S2502). In step S2542, which is processing for using this weight, the CalcPF_MC module uses the weight calculated in step S2502. Following the setting of the weight, the CalcPF_MC module performs processing for initializing a random number, which is used in Monte Carlo integration, using the random number seed Rs (S2503). In example 11, uniform random numbers are used. As a method of generating the uniform random numbers, various methods such as the Mersenne Twister method are known. It is easy for those skilled in the art to implement the methods. The present invention does not limit a method of generating random numbers to a specific method. It is also possible to carry out the present invention using quasi-random numbers instead of random numbers.

In the processing for generating random numbers and calculating the common risk variables, the CalcPF_MC module generates a uniform random number while incrementing the factor number n, which is an index for specifying the common risk factor, from 1 to a variable Nf that gives the number of common risk factors (S2514) and calculates common risk factors (S2516). Processing for calculating a common risk variable from a uniform random number is the processing for calculating $x_j$ from $\eta_j$ in formula 21. The uniform random number only has to be transformed with the inverse function of the distribution function of the standard normal distribution. A function NormSInv( ) shown in S2516 represents the inverse function of the distribution function of the standard normal distribution.

Processing other than the above, i.e., processing in steps S2504 to S2506 and S2520 to S2554 is the same as that of the CalcPF module shown in FIGS. 22A and 22B. Processing of functional units other than the portfolio-function calculating unit 1326 is the same as that in example 10. Consequently, calculation same as that in example 10 can be performed. In the implementation in which the CalcPF_MC module is used, information on integration points is generated in the inside thereof. Therefore, there is an advantage that, even when the number of common risk factors and the number of integration points are changed, calculation can be performed without changing input data and the processing of the respective modules. Further, since it is unnecessary to store information on integration points in the input-data storage unit 1316, even when the number of integration points is set extremely large, an area secured in the main memory can be used as the input-data storage unit 1316. Therefore, it is one of advantages of example 11 that it is possible to quickly execute calculation even when the number of integration points is set extremely large.

Example 12

Figure 27:
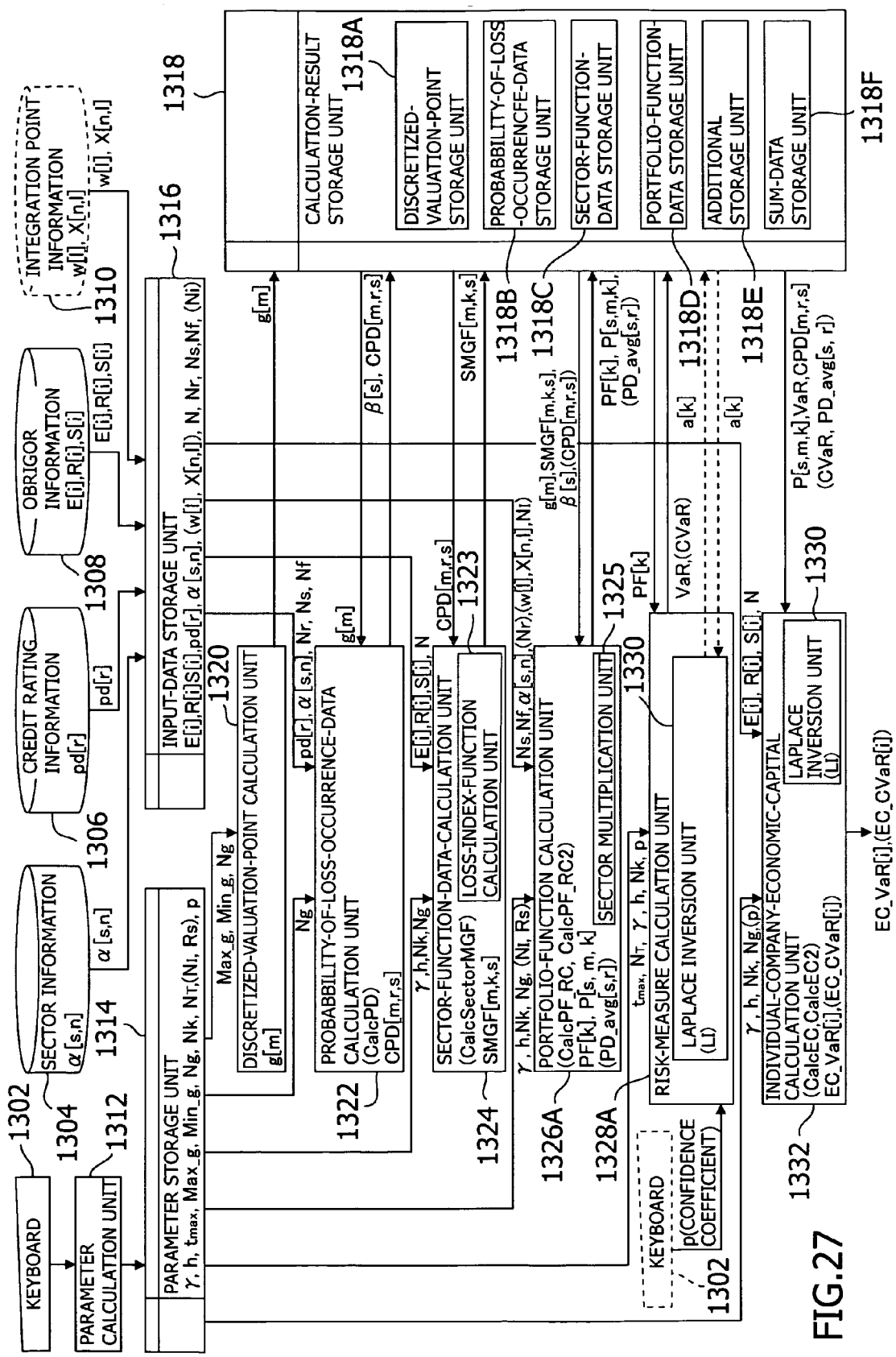
FIG. 27 is a functional block diagram of a computer realized by a program according to an example of the present invention.
Figure 28A:
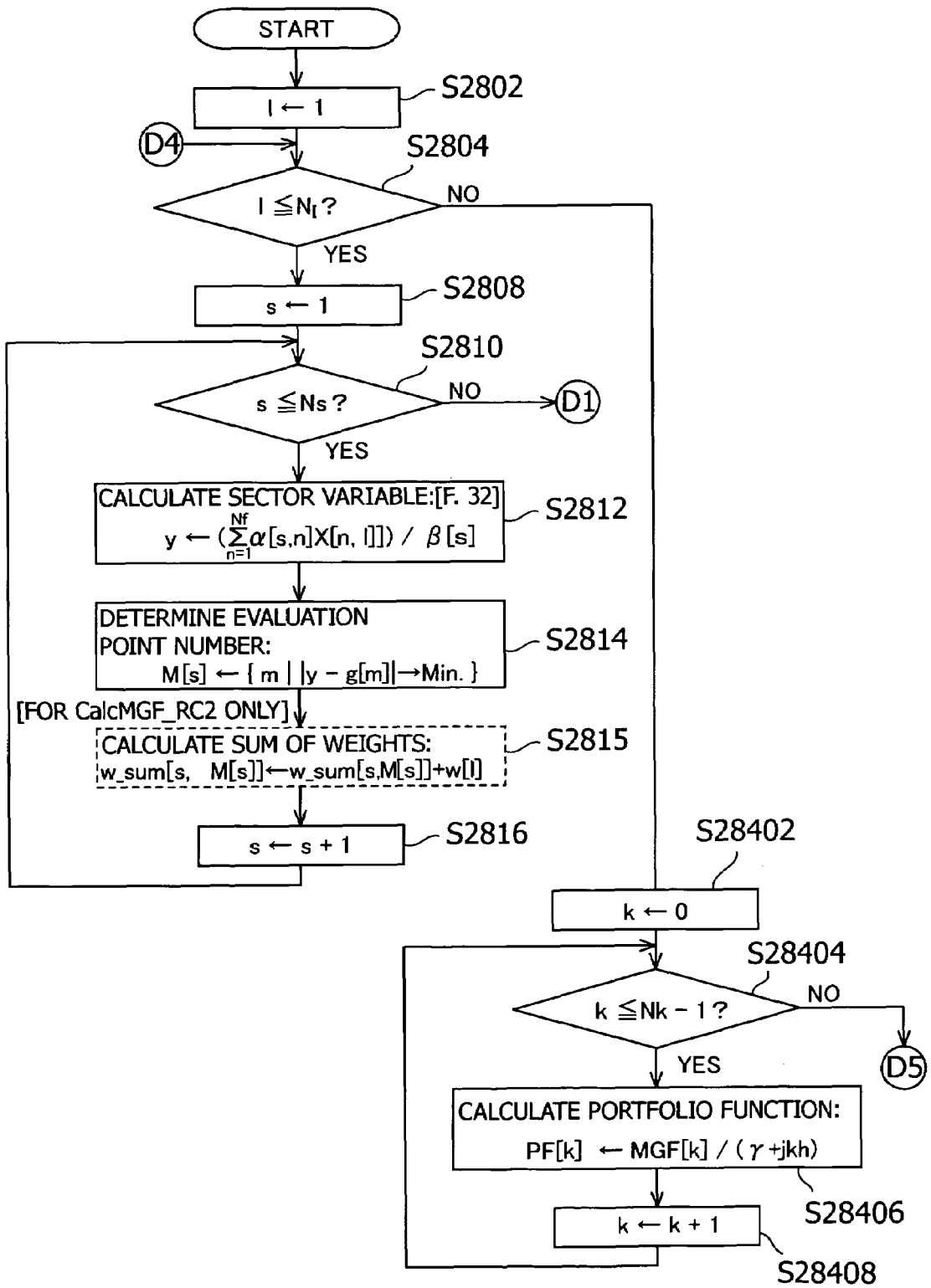
FIG. 28A is a flowchart representing a processing flow of the program according to the example of the present invention.
Figure 28B:
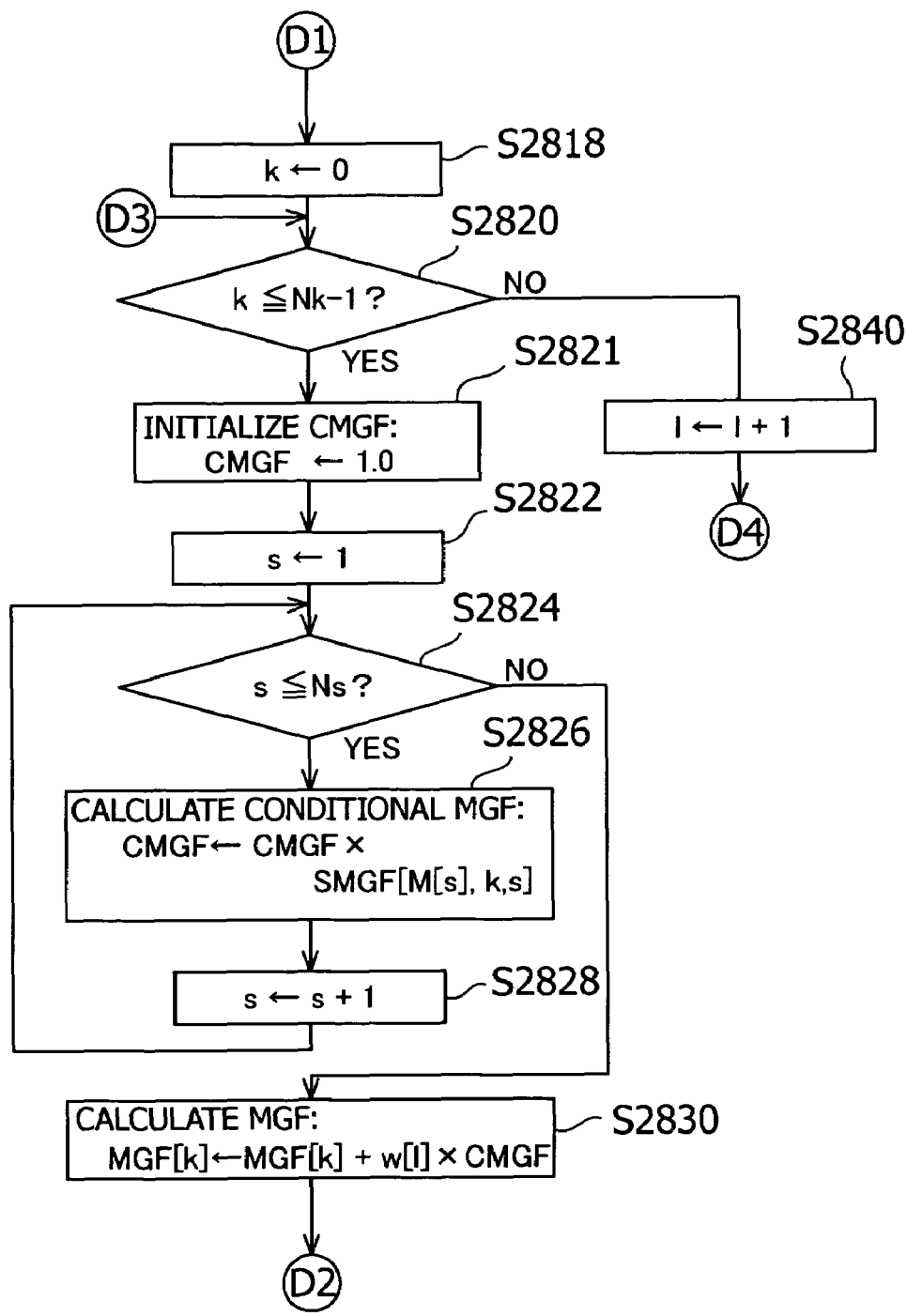
FIG. 28B is a flowchart representing the processing flow of the program according to the example of the present invention.
Figure 28C:
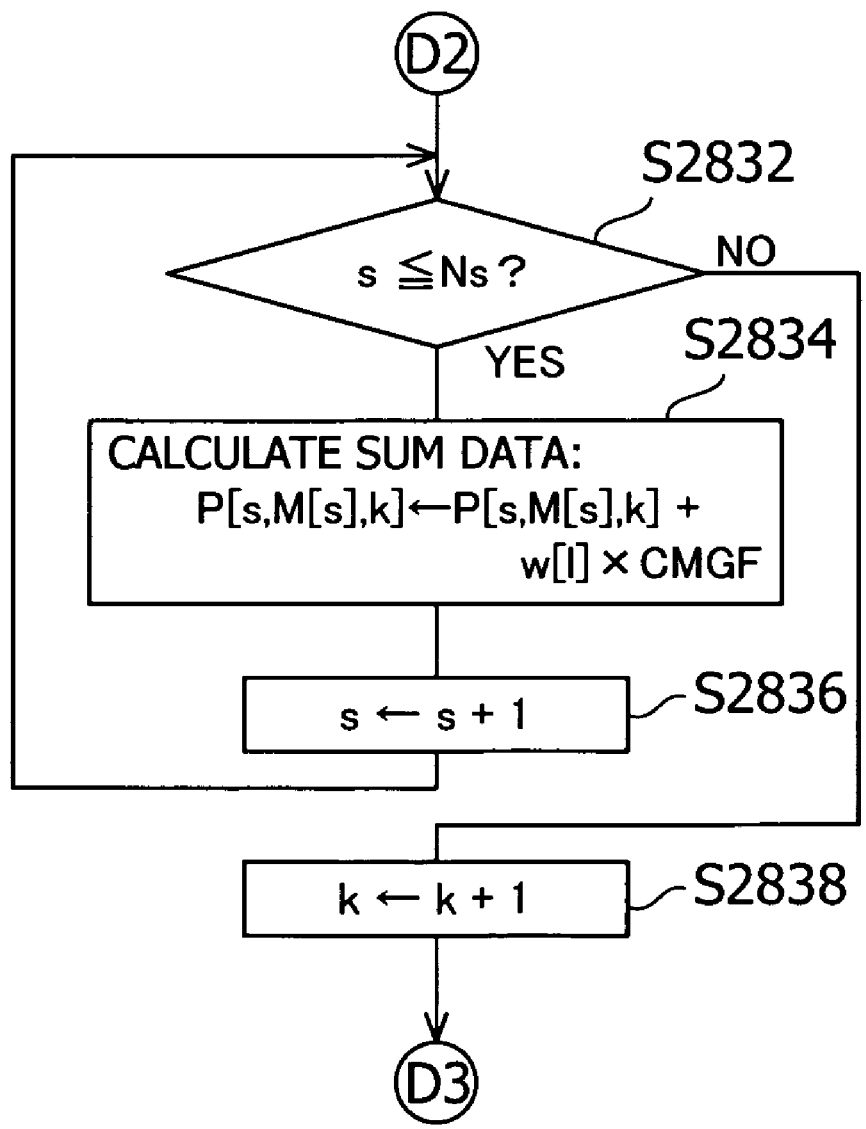
FIG. 28C is a flowchart representing the processing flow of the program according to the example of the present invention.
Figure 28D:
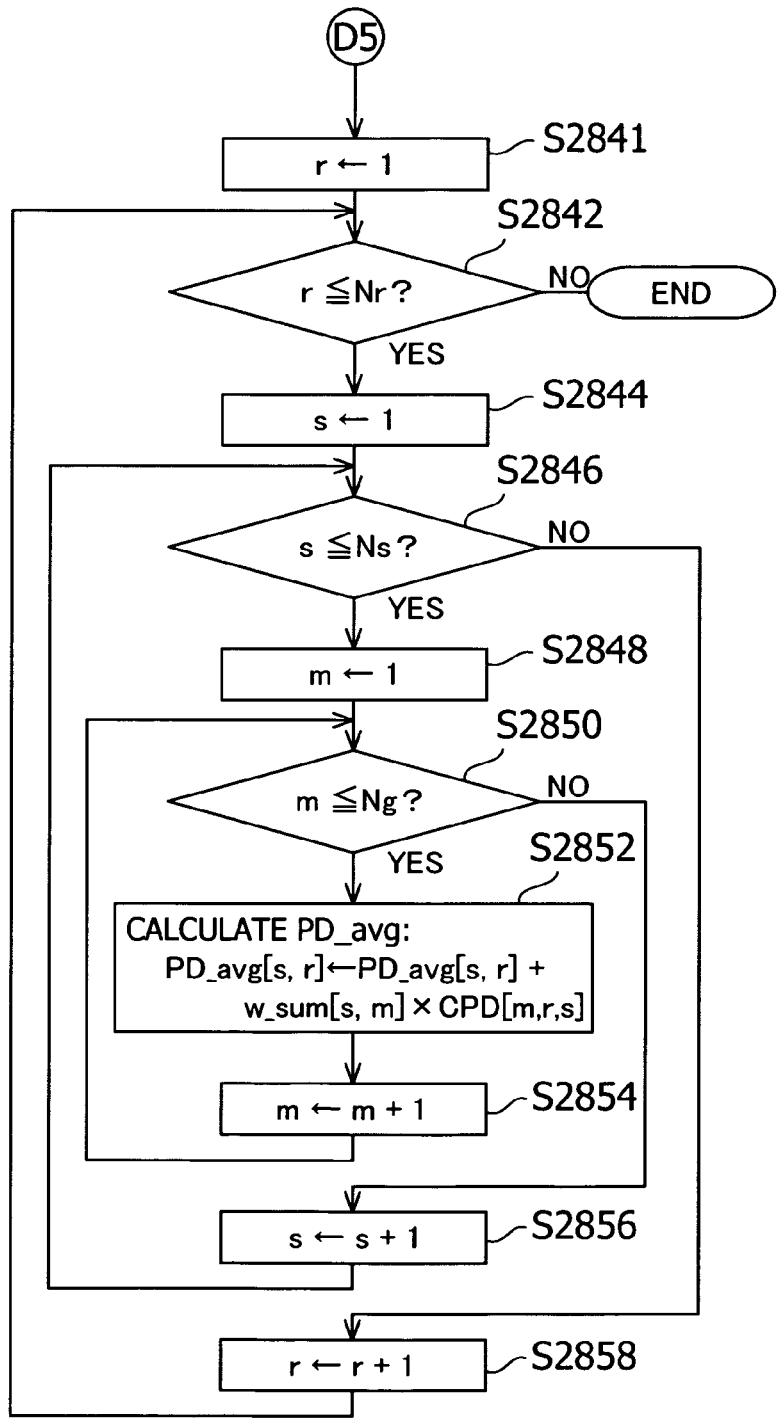
FIG. 28D is a flowchart representing the processing flow of the program according to the example of the present invention.

Example 12 is a modification of the configuration of example 10 modified to be adapted to calculation of an economic capital. Functional blocks of example 12 are shown in FIG. 27. Example 12 is different from example 10 in that a portfolio-function calculating unit 1326A is used instead of the portfolio-function calculating unit 1326, a risk-measure calculating unit 1328A is used instead of the risk-measure calculating unit 1328, and an individual-company-economic-capital calculating unit 1332 and a sum-data storage unit 1318F are added.

The portfolio-function calculating unit 1326A calculates portfolio function data and a sum data used for risk contribution calculation on the basis of inputs of $\gamma$, h, $N_k$, $N_g$, $N_s$, Nf, $\alpha[s, n]$, w[l], X[n, l], $N_I$, g[m], $\beta[s]$, and SMGF[m, k, s] and outputs an array PF[k] having the auxiliary variable number "k" as an subscript and an array P[s, m, k] having the sector number "s", the discretized valuation point number "m", and the auxiliary variable number "k" as subscripts. P[s, m, k] is a sum data in example 12 and respective elements thereof correspond to $P^S_{m, k}$ of formula 88. As in example 10, the inputted $\gamma$, h, $N_k$, and $N_g$ are stored in the parameter storage unit 1314, $N_s$, Nf, $\alpha[s, n]$, w[l], X[n, l], and $N_I$ are stored in the input-data storage unit 1316, and g[m], $\beta[s]$, and SMGF[m, k, s] are stored in the calculation-result storage unit 1318. The processing of the portfolio-function calculating unit 1326A is processing of a CalcPF_RC module in example 12. The processing of the CalcPF_RC module will now be explained in more detail using the flowcharts in FIGS. 28A to 28D.

FIGS. 28A to 28D are flowcharts of a processing flow of the CalcPF_RC module that calculates the moment generating function and risk contribution calculation coefficients. Processing of the CalcPF_RC module is different from the processing of the CalcPF module shown in FIGS. 22A and 22B in the processing in steps S2832 to S2838. Therefore, explanation of processing other than the processing is omitted.

The CalcPF_RC module calculates MGF[k] in step S2830. Then, the CalcPF_RC module performs, concerning respective sectors (S2832 and S2836), processing for adding a product of the weight w[l] and CMGF to the risk contribution calculation coefficient P[s, M[s], k]. The CalcPF_RC module increments the index "k" representing the auxiliary variable number (S2838) and performs final judgment of "k" (S2820). When processing for all k's is completed, the CalcPF_RC module increments the index "l" representing the integration point (S2840) and returns to the final judgment of "l" (S2804). By performing such additional processing, sum data P[s, m, k] for risk contribution calculation according to formula 88 is calculated and stored in the calculation-result storage unit 1318 (FIG. 27).

The risk-measure calculating unit 1328A performs processing same as the processing of the risk-measure calculating unit 1328 and calculates at least a value of VaR. The calculated value of VaR is stored in the calculation-result storage unit 1318.

Moreover, the individual-company-economic-capital calculating unit 1332 added in example 12 calculates economic capitals of all obligors included in the portfolio on the basis of inputs of $\gamma$, h, $N_k$, $N_g$, E[i], R[i], S[i], N, CPD[m, r, s], P[s, m, k], and VaR and outputs an array EC_VaR[i] having a obligor number "i" as an subscript. Respective elements of EC_VaR [i] correspond to $EC_i$ of formula 63. The inputted $\gamma$, h, $N_k$, and $N_g$ are stored in the parameter storage unit 1314, E[i], R[i], S[i], and N are stored in the input-data storage unit 1316, and CPD[m, r, s], P[s, m, k], and VaR are stored in the calculation-result storage unit 1318. The processing of the individual-company-economic-capital calculating unit 1332 is processing of a CalcEC module. The processing of the CaclEC module will now be explained in more detail using the flowcharts in FIGS. 29A to 29C.

Figure 29:
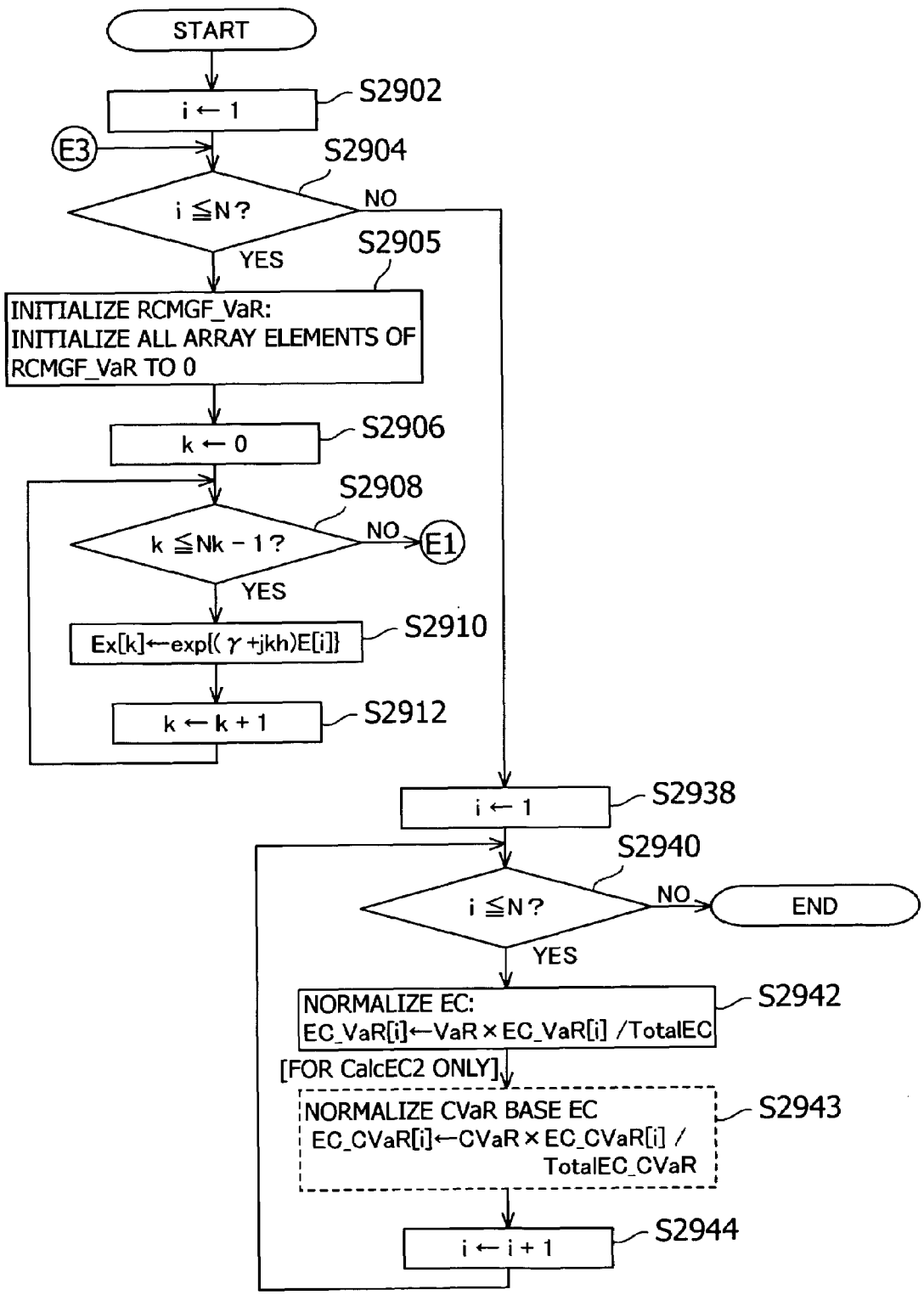
FIG. 29A is a flowchart representing a processing flow of the program according to the example of the present invention.
FIG. 29B is a flowchart representing the processing flow of the program according to the example of the present invention.
FIG. 29C is a flowchart representing the processing flow of the program according to the example of the present invention.
Figure 29B:
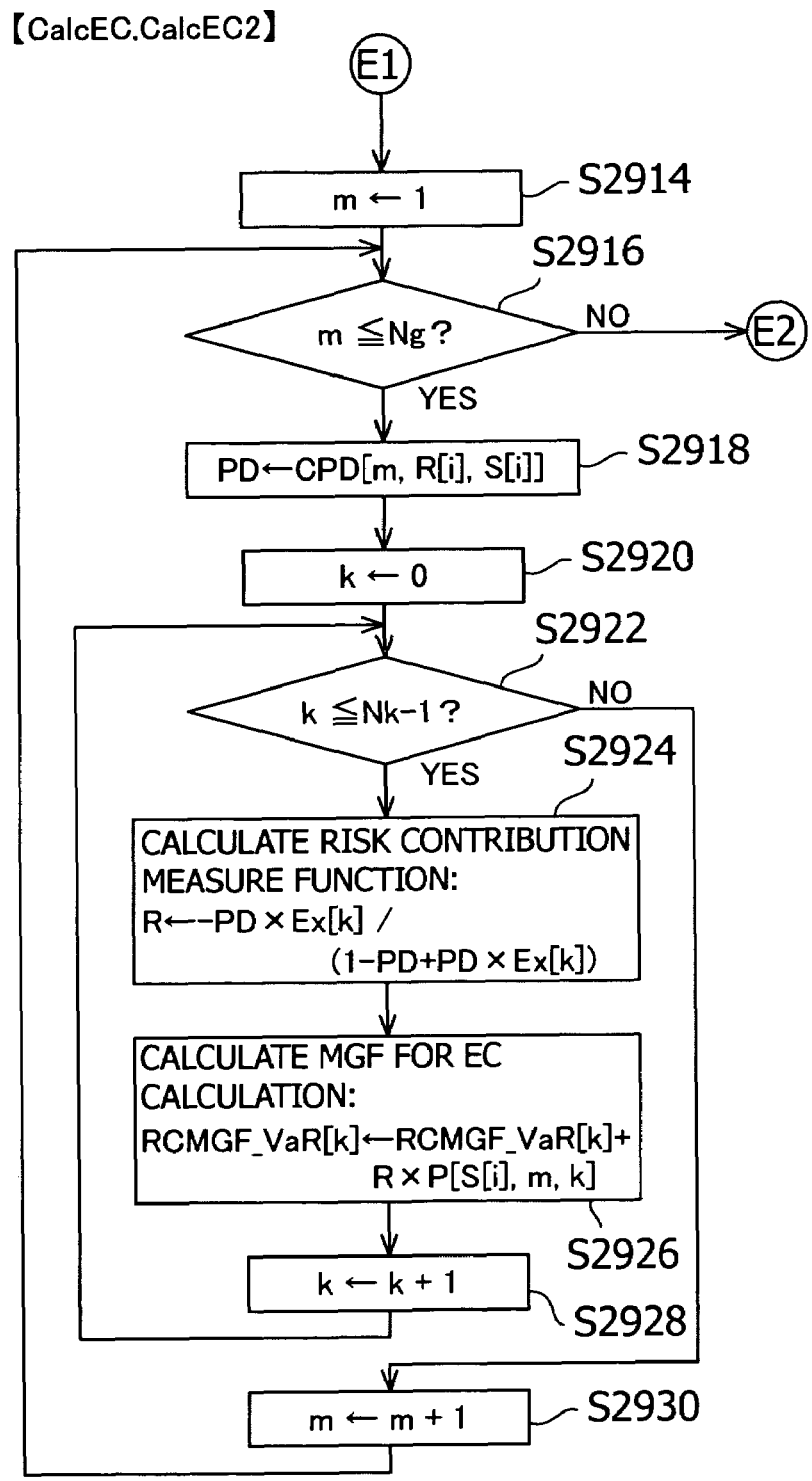
Figure 29C:
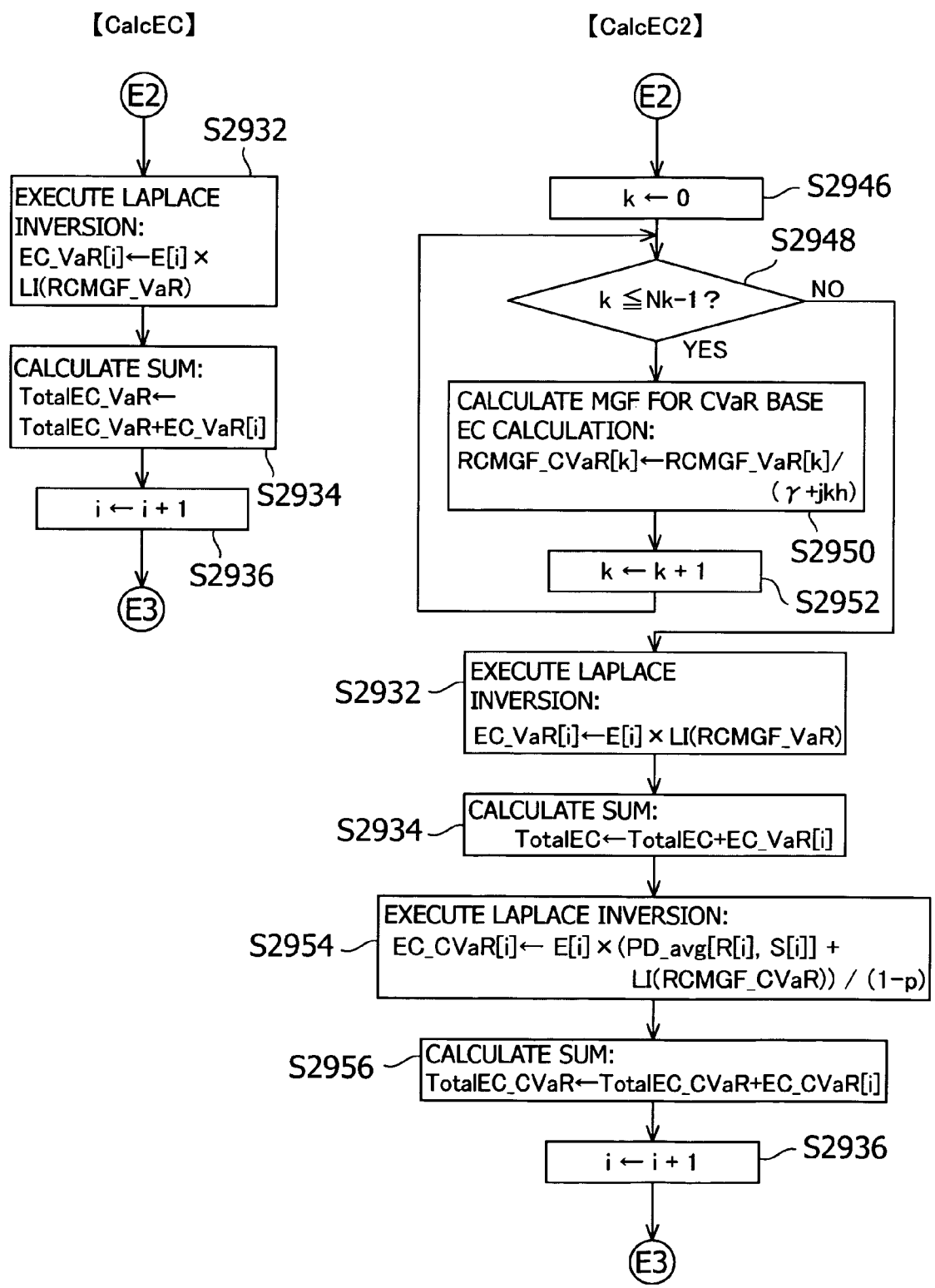

FIGS. 29A to 29C are flowcharts showing a processing flow of the CalcEC module that calculates economic capitals of individual companies. The processing of the CalcEC module is processing similar to the processing of the CalcSectorMGF module shown in FIGS. 21A and 21B. The processing of the CalcEC module is different from the processing of the CalcSectorMGF module in that the processing for initializing SMGF[m, k, s] (S2102, FIG. 21A) is not performed, processing for initializing RCMGF_VaR[k] (S2905) is added, functions calculated in steps S2924 and S2926 are different because calculation objects are different, processing of Laplace inversion S2932 calculation of a sum S2934 are performed, and processing for normalization is performed in S2938 to S2944 before the processing is finished. Among these kinds of processing, the processing for initialization S2905 is obvious. Therefore, the processing other than this processing is explained below.

A local variable R calculated in step S2924 in the processing of the CalcEC module corresponds to $\lambda=\gamma+jkh$ in formula 76 and is data of a risk contribution measure function in example 12. Respective elements of an array RCMGF_VaR [k] calculated in S2926 correspond to a value on the right side of formula 82. Therefore, in step S2924, the CalcEC module calculates a local variable R according to an equation same as the right side of formula 71. In step S2926, the CalcEC module calculates respective elements of an array RCMGF_VaR[k], which corresponds to a value on the right side of formula 82, by adding up products of the local variable R and sum data P[s, m, k] for risk contribution calculation.

Next, in step S2932, the CalcEC module subjects RCMGF_VaR[k] to Laplace inversion with the Laplace inversion module LI and multiplies the RCMGF_VaR[k] with the exposure E[i] of the obligor "i" to thereby calculate an array EC_VaR[i] for the obligor "i". The Laplace inversion module LI is the same as that used in example 10. By setting inputs to this module as C[k]=RCMGF_VaR[k] (k=0, 1, . . . , Nk−1) and t=VaR, a desired result is obtained. A value of EC_VaR[i] is a value before a division of $-f_L(VaR)$ is performed on the right side of formula 65. A value of $f_L(VaR)$ can be calculated by inputting MGF[k] calculated in the processing step of the portfolio-function calculating unit 1326A and VaR calculated by the risk-measure calculating unit 1328A to the Laplace inversion module LI. By adopting such an implementation form, a VaR base economic capital of the obligor "i" can also be calculated according to formula 65. However, with this method, because of the influence of an error of numerical calculation, a sum of the VaR base economic capitals of all the obligors does not strictly coincide with VaR. Therefore, in example 12, a VaR base economic capital is calculated on the basis of formula 69. In the processing of normalization S2938 to S2944, the CalcEC module performs calculation corresponding to formula 69 and finally obtains the VaR base economic capital EC_VaR[i] of the obligor "i". Specifications of the variables appearing in the flowcharts used for the explanation of the CalcPF_RC module and the CalcEC module are summarized in FIGS. 30A and 30B and FIGS. 31A and 31B.

A VaR base economic capital calculation module Calc_EC of the individual company can calculate the economic capital without performing a loop concerning integration points by using the sum data P[s, m, k]. Therefore, it is possible to reduce calculation time for economic capital calculation per one obligor to be extremely short and calculate economic capitals of all obligors even in a large portfolio. It is possible to easily use Monte Carlo integration by changing the processing of numerical integration performed by the CalCPF_RC module of this example 12 in the same manner as example 11.

Example 13

Example 13 is an example indicating a form of carrying out processing for calculating a CVaR base economic capital. Functional blocks of example 13 are shown in FIG. 27 used for showing the configuration of example 12. Example 13 is different from example 12 in that the processing of the portfolio-function calculating unit 1326A is processing of a CalcPF_RC2 module rather than the CalcPF_RC module, PD_avg[s, r] is calculated in addition to PF[k] and P[s, m, k], Nr and CPD[m, r, s] are used as additional inputs, CVaR is included in an output of the risk-measure calculating unit 1328A, the processing of the individual-company-economic-capital calculating unit 1332 is processing of a CalcEC2 module rather than the CalcEC module, and p, CVaR, and PD_avg[s, r] are used as additional inputs. p is a confidence coefficient used in calculating values of VaR and CVaR inputted to the individual-company-economic-capital calculating unit 1332. Respective elements of EC_CVaR[i] calculated by the CalcEC2 module correspond to $RC_i^{CVaR}$ of formula 90 multiplied with the exposure $E_i$. Nr inputted to the portfolio-function calculating unit 1326A is stored in the input-data storage unit 1316, CPD[m, r, s] is stored in the calculation-result storage unit 1318, p inputted to the individual-company-economic-capital calculating unit 1332 is stored in the parameter storage unit 1314, and CVaR and PD_avg[s, r] are stored in the calculation-result storage unit 1318. The processing of the CalcPF_RC2 module and the processing of the CalcEC2 module described above are explained more in detail using flowcharts of FIGS. 28A to 28D and flowcharts of FIGS. 29A to 29C, respectively.

In FIGS. 28A to 28D, in addition to the processing flow of the CalcPF_RC module, a processing flow of the CalcPF_RC2 in which processing similar to that of the CalcPF_RC module is performed is shown. The processing of the CalcPF_RC2 module is different from the processing of the CalcPF_RC module in the processing in step S2815 and steps S2841 to S2858. Therefore, explanation of processing other than the processing is omitted.

In the processing added anew in the CalcPF_RC2 module, the CalcPF_RC2 module calculates an array PD_avg[s, r] having an average default probability of a obligor, who has the credit rating number "r" and the sector number "s", as an element. In the processing in step S2185, the CalcPF_RC2 module calculates an array w_sum[s, m] in which a sum of weights used for calculating PD_avg[s, r] is stored. Specifically, the CalcPF_RC2 module calculates respective elements of PD_avg[s, r] and w_sum[s, m] on the basis of the following equation:

[Formula 108]

$$PD\_Avg[r, s] = \sum_{m=1}^{Ng} w\_sum[s, m] CPD[m, r, s] \qquad (108)$$

$$w\_sum[s, m] = \sum_{l \in L_m^S} w[l]$$

where, $L^S_m$ is a set given by the first equation of formula 81. The array PD_avg[s, r] is used in calculating a CVaR base economic capital in a Calc_EC2 module explained later. Specifically, the array PD_avg[s, r] is used as an approximate value of a default probability $PD_i$ of a obligor appearing in the first term in braces of the equation at the bottom of formula 93. A strict value of $PD_i$ appearing in formula 93 is given by a credit rating of the obligor in FIG. 14 and a default probability by credit rating in FIG. 15(1) and can be represented by an element of an array pd[R[i]]. This strict value can be directly used when the calculation of the equation at the bottom of formula 93 is performed. In example 13, PD_avg[s, r] is used rather than the strict value because an error in numerical calculation is taken into account. The second term in braces of the equation at the bottom of formula 93 is calculated by numerical integration. Therefore, an error of numerical integration due to bias of integration points is included in the second term. Therefore, an error of the CVaR base economic capital finally calculated can be reduced by using PD_avg[s, r], which is an average calculated by using the same integration points, for the $PD_i$ of the first term. $PD_i$ can be approximated by using PD_avg[s, r]. This can be confirmed as follows:

[Formula 109]

$$PD_i = \int_{\vec{x} \in R^{N_F}} p_i(\vec{x}) \phi_{N_F}(\vec{x}) d\vec{x} \quad (109)$$

$$\cong \sum_{l=1}^{N_I} w_l p'_i(y^{S_i}{}_l)$$

$$\cong \sum_{l=1}^{N_I} w_l p'_i(g_m{}^{s_i}{}_l)$$

$$= \sum_{m=1}^{N_g} \left\{ \left( \sum_{l \in L_m^S} w[l] \right) \cdot CPD[m, R[i], S[i]] \right\}$$

$$= PD\_Avg[R[i], S[i]]$$

In step S2815, the CalcPF_RC2 module performs processing for calculating an array w_sum[s, m] having the sector number "s" and the evaluation point number "m" as subscripts and having a sum of integration weights with respect to discretized valuation points as an element. The array w_sum[s, m] corresponds to the second equation of formula 108. The CalcPF_RC2 module can calculate all elements of the array w_sum[s, m] by performing processing for adding w[l] to w_sum[s, M[s]] with respect to all sector numbers "s" for each of the integration evaluation points.

In steps S2840 to S2858, after a loop for integration points is finished (S2804), the CalcPF_RC2 module calculates an array PD_avg[s, r] having an average default probability of a obligor, who has the credit rating number "r" and the sector number "s", as an element. First, the CalcPF_RC2 module multiplies CPD[m, r, s] with a weight w_sum[s, m] and adds CPD[m, r, s] to PD_avg[s, r] while incrementing the discretized valuation point number "m" from 1 to $N_g$ (S2852). The CalcPF_RC2 module performs this processing for all sector numbers "s" (S2844, S2846, and S2856) and further performs the processing for all credit rating numbers "r" (S2841, S2842, and S2858), whereby a value corresponding to a sum of the first equation of formula 108 is stored in respective elements of PD_avg[s, r].

In FIGS. 29A to 29C, in addition to the processing flow of the CalcEC module, a processing flow of the CalcEC2 module in which processing similar to the processing of the CalcEC module is shown. Processing of the CalcEC2 module is different from the processing of the CalcEC module in the processing in steps S2946 to S2952, steps S2954 to S2956, and step S2943. Therefore, explanation of processing other than the processing is omitted.

In the processing in steps S2946 to S2952 of the CalcEC2 module, the CalcEC2 module performs processing for calculating an array RCMGF_CVaR[k] having the auxiliary variable number "k" as an subscript. Respective elements of the array RCMGF_CVaR[k] correspond to a value calculated as $\lambda = \gamma + jkh$ in the equation in parentheses of the second equation of formula 94. As described above concerning the derivation of formula 94, RCMGF_CVaR[k] can be calculated by dividing RCMGF_VaR[k] by the auxiliary variable. Therefore, in these steps, the CalcEC2 module performs processing for dividing, while incrementing the auxiliary variable number "k" (S2946, S2948, and S2952), RCMGF_VaR[k] by $\gamma + jkh$ for each of the auxiliary variable numbers "k" and storing a result of the division in the array RCMGF_CVaR[k] (S2950).

In step S2954, the CalcEC2 module calculates the CVaR base economic capital for each of the obligors on the basis of formula 93 and stores a result in an array EC_CVaR[i] having the obligor number "i" as an subscript. PD_avg[R[i], S[i]] is used for the first term in braces at the bottom of formula 93. The second term in braces at the bottom of formula 93 is calculated by Laplace inversion according to formula 94. Laplace inversion of formula 94 can be calculated by inputting RCMGF_CVaR[k] obtained in steps S2946 to S2952 to the Laplace inversion module LI. Specifically, processing only has to be executed with an input to the Laplace inversion module set as C[k]=RCMGF_VaR[k] (k=0, 1, . . . , $N_k$−1) and t=VaR. In the processing, pd[R[i]] can be used instead of PD_avg[R[i], S[i]]. Because of an error caused by numerical calculation of integration over the common risk variables, a difference occurs between results obtained by using PD_avg[R[i], S[i]] and pd[R[i]]. However, the results are essentially the same. When pd[R[i]] is used instead of PD_avg[R[i], S[i]] in this way, processing related to calculation of PD_avg[R[i], S[i]] is unnecessary.

In step S2956, the CalcEC2 module calculates a sum TotalEC_CVaR concerning all the obligors of the CVaR base economic capitals. In step S2843, the CalcEC2 module performs normalization using Total EC_CVaR to thereby obtain the CVaR base economic capital EC_CVaR[i] of the obligor "i". As the CalcEC module, the normalization is performed to make a sum of CVaR base economic capitals coincide with CVaR. However, the normalization is not essential in the present invention. A value of EC_CVaR[i] before the processing for normalization is performed also has a meaning as an approximate value of the CVaR base economic capital of the obligor "i".

In this way, according to example 13, VaR base economic capitals and CVaR base economic capitals with respect to all the obligors of the portfolio are appropriately calculated. The Calc_EC2 module can calculate an economic capital without performing the loop concerning integration points and can calculate CVaR base economic capitals of all obligors of even a large portfolio. Specifications of the variables appearing in the flowcharts used for the explanation of the CalcPF_RC2 module and the CalcEC2 module are summarized in FIGS. 32A and 32B and FIGS. 33A and 33B.

The embodiments of the present invention have been explained. However, the present invention is not limited to the embodiments described above. Various modifications and alterations and combinations thereof are possible on the basis of the technical idea of the present invention. The present invention is understood on the basis of the description of the appended claims.

What is claimed is:

1. A calculation method for calculating risk measures concerning losses associated with a portfolio including credits given to a plurality of companies, the calculation method being implemented by a computer including an arithmetic device and a storage device including sector function data storage means, the method comprising:

a step of calculating, by a computer, for each of the companies, data of a loss index function, executed by a loss-index-function calculating unit, wherein the loss index function is a function of a probability of loss occurrence, which is the function of a sector variable, of the respective companies and an exponential of a value that is obtained by multiplying an auxiliary variable for Laplace transform by the exposure of the credits to the company, wherein the sector variable is a realization of a sector risk factor for each of the sectors into which the companies included in the portfolio are grouped, wherein the sector risk factor is a random variable common to the companies included in the sector and is defined as a linear combination of common risk factors, which are a plurality of risk factors that can affect firm values used for determination of the probability of loss occurrence, wherein the probability of loss occurrence is a conditional probability indicating the probability of the occurrence of loss of the company based on the firm value under the condition that the sector variable of the sector to which the company belongs is given, wherein the data of the loss index function is calculated by substituting each value of discretized valuation points for the sector variable in the probability of loss occurrence, wherein the discretized valuation points are a finite number of discrete points in a range corresponding to a distribution range of the sector variable and are calculated by the arithmetic device or are preliminarily stored in the storage device;

a sector-function-data calculating step of calculating sector function data, for each of the discretized valuation points, and storing the calculated sector function data, for each of the sectors and for each of the discretized valuation points, in the sector function data storage means, the sector-function-data calculating step being executed by a sector-function-data calculating unit, wherein the sector function is a function defined for each of the sectors and including the product of the loss index functions for all the companies belonging to the sector, wherein the sector function data are values of the sector function at the discretized valuation points, wherein the sector function data are calculated by using the value obtained by taking the product of the data of the loss index functions for all the companies in the respective sectors, and wherein the sector-function-data calculating unit stores each value of the calculated sector function data in the sector function data storage means in association with at least the sector for which the sector function is defined and the discretized valuation point at which the value of the sector function is calculated;

a sector multiplying step of calculating an approximate value of a conditional portfolio function at respective integration points, executed by a sector multiplying unit, wherein the conditional portfolio function is a function which includes the product of the sector functions for all the sectors included in the portfolio, wherein the integration points are a finite number of discrete points in a space of common risk variables for numerically performing integration over the common risk variables that are realization of the common risk factors, wherein the sector multiplying unit calculates the approximate value at the respective integration points, for each of the sectors, by specifying one of the discretized valuation points near the sector variable which is given by the linear combination of the components of the integration point, by retrieving the sector function data associated to the specified one discretized valuation point and the sector from the sector function data storage means, and by taking the product of the retrieved sector function data for all the sectors;

a portfolio-function calculating step of calculating data of a portfolio function, executed by a portfolio-function calculating unit, wherein the portfolio function is a function defined as the product of an average of the conditional portfolio function with respect to the common risk factors and a portfolio auxiliary variable function which is a function of the auxiliary variable, wherein the portfolio-function calculating unit calculates the average of the conditional portfolio function with respect to the common risk factors by numerically performing integration calculation over the common risk variables of an integrand that includes the conditional portfolio function using the approximate value of the conditional portfolio function at the integration points, wherein the portfolio-function calculating unit calculates the data of the portfolio function by calculating the product of the calculated average over the common risk factors of the conditional portfolio function and the portfolio auxiliary variable function;

a Laplace inversion step executed by a Laplace inversion unit, wherein the Laplace inversion unit calculates, using the data of the portfolio function, data of values of a function obtained by subjecting the portfolio function to Laplace inversion by numerically performing integration calculation over the auxiliary variable; and a risk-measure calculating step executed by a risk-measure calculating unit, wherein the risk-measure calculating unit calculates risk measures indicating risks concerning losses of the portfolio from the data of the values of the function obtained by subjecting the portfolio function to Laplace inversion.

2. The calculation method according to claim 1, wherein:
the sector function is the product of the loss index functions for all companies in the sector, and
the conditional portfolio function is the product of the sector functions for all sectors included in the portfolio.

3. The calculation method according to claim 1, wherein:
the sector function is the product of the product of the loss index functions for all companies in the sector and a sector auxiliary variable function that is a function of the auxiliary variable defined for each of the sectors,
the sector function data are calculated by multiplying the value obtained by taking the product of the data of the loss index functions for all companies in each of the sectors by a value of the sector auxiliary variable function, and
the conditional portfolio function is the product of the product of the sector functions for all sectors included in the portfolio and a conditional portfolio auxiliary variable function that is a function of the auxiliary variable.

4. The calculation method according to claim 1, wherein the portfolio-function calculating step includes:
a weight multiplying step of multiplying, for each of the integration points, the approximate value of the conditional portfolio function by a weight value related to the integration point to obtain weighted data; and
a step of adding up the weighted data for all the integration points to calculate an average over the common risk factors of the conditional portfolio function and calculating the product of the average and a value of the portfolio auxiliary variable function, which is a function of the auxiliary variable, to thereby calculate data of the portfolio function.

5. The calculation method according to claim 1, wherein the portfolio-function calculating step includes a step of adding up the approximate values of the conditional portfolio function for all the integration points and dividing the added-up approximate value by the number of the integration points to calculate an average over the common risk factors of the conditional portfolio function and calculating the product of the average and a value of the portfolio auxiliary variable function, which is a function of the auxiliary variable, to thereby calculate data of the portfolio function.

6. The calculation method according to claim 1, wherein
the step of calculating data of the loss index function for each of the companies is a step of calculating the data of the loss index function for each value of the auxiliary variable used in numerical calculation of the Laplace inversion step,
the sector-function-data calculating step is a step of storing sector function data for each auxiliary variable, which is sector function data corresponding to each of the sectors, each of the discretized valuation points, and each of the values of the auxiliary variable, in the sector-function-data storage means as the sector function data in association with the sectors, the discretized valuation points, and each of the values of the auxiliary variable,
the sector multiplying step is a step of retrieving, with respect to each of the values of the auxiliary variable, the sector function data for each auxiliary variable from the sector-function-data storage means as the sector function data for one discretized valuation point specified for each of the sectors and taking the product of the sector function data for all the sectors,
the portfolio-function calculating step is executed with respect to each of the values of the auxiliary variable, and
the Laplace inversion step is a step of executing numerical calculation of integration calculation over the auxiliary variable according to data of the portfolio function with respect to each of the values of the auxiliary variable.

7. The calculation method according to claim 1, wherein:
the loss index function is a conditional moment generating function for each of the companies under the condition that the sector risk factor takes the values of the discretized valuation point,
the sector function is the product of the loss index functions for all companies in the sector,
the conditional portfolio function is the product of the sector functions for all the sectors included in the portfolio,
the portfolio auxiliary variable function is the identity function,
the function obtained by subjecting the portfolio function to Laplace inversion is the probability density function that gives the probability distribution of the loss, and
the risk measures are calculated in the risk-measure calculating step on the basis of data of the values of the probability density function.

8. The calculation method according to claim 1, wherein:
the loss index function is a conditional moment generating function for each of the companies under the condition that the sector risk factor takes the values of the discretized valuation point,
the sector function is the product of the loss index functions for all companies in the sector,
the conditional portfolio function is the product of the sector functions for all the sectors included in the portfolio,
the portfolio auxiliary variable function is the division function by the auxiliary variable,
the function obtained by subjecting the portfolio function to Laplace inversion is the distribution function that gives the probability distribution of the loss, and
the risk measures are calculated in the risk-measure calculating step on the basis of data of the values of the distribution function.

9. The calculation method according to claim 4, wherein:
the risk measures include credit value-at-risk, and
the calculation method further includes:
the first additional calculation step of calculating the sum for all the integration points of the weighted data obtained in the weight multiplying step for each of the sectors and for each of the discretized valuation points in association with the discretized valuation point, which are specified in the sector multiplying step for each sector, and the sector for calculating a sum data;
an additional storing step of storing the sum data in sum-data storage means in association with at least the sector and the discretized valuation points;
the second additional calculation step of calculating, for all the companies in the portfolio, at each of the discretized valuation points, data of a risk contribution measure function defined by using the probability of loss occurrence and the exponential function of the value obtained by multiplying the auxiliary variable by the exposure of credits to each of the companies, retrieving the sum data specified by the sector of the company and the discretized valuation point from the sum-data storage means, and multiplying the sum data by the data of the risk contribution measure function, and calculating the sum of the results of the multiplication for all the discretized valuation points to calculate Laplace transform data of the partial differential value of a distribution function by the exposure of the company;
an additional Laplace inversion step of calculating, for all the companies included in the portfolio, data of values at the credit value-at-risk of the partial differentiation of a distribution function by the exposure of each of the companies from the Laplace transform data of the partial differential value of the distribution function by the exposure of each of the companies obtained by the second additional calculation step; and
a step of calculating the economic capital of each of the companies from data of values at the credit value-at-risk of the partial differentiation of a distribution function by the exposures of all the companies obtained by the additional Laplace inversion step, the exposures of all the companies, and the credit value-at-risk.

10. The calculation method according to claim 9, wherein:
the risk measure includes credit value-at-risk, and
the calculation method further includes:
the third additional calculation step of dividing the Laplace transform data of the partial differential value of the distribution function by the exposure of each of the companies by the auxiliary variable to obtain data by company;
the second additional Laplace inversion step of calculating, with Laplace inversion, from the data by company obtained by the third additional calculation step, integral value data that is the value obtained by integrating the partial differential value of the distribution function by the exposure of each of the companies by loss along the interval from 0 to the credit value-at-risk; and
a step of calculating the sum of the integral value data of each of the companies obtained by the second additional Laplace inversion step and an average default probability that is an average over the sector risk factor of the probability of loss occurrence of the company, dividing the sum by unity minus a confidence interval, and calculating risk contribution based on conditional value-at-risk of each of the companies.

11. The calculation method according to claim 1, wherein:
the probability of loss occurrence is given for each value of the sector variable on the basis of a criterion including a default threshold that is an upper limit of the firm value at which a company falls into default, and
the probability of loss occurrence is a conditional default probability of the company under a condition in which the sector variable is given.

12. The calculation method according to claim 11, wherein:
the criterion further includes at least one credit rating threshold concerning the firm value at which the credit rating of a company changes, and
the loss index function is defined by further including a profit and loss at credit rating transition time and a conditional rating transition probability of the company under the condition in which the sector variable is given.

13. The calculation method according to claim 1, wherein the Laplace inversion step includes a convergence acceleration step of calculating an approximate value of a series that approximates infinite interval integration of Laplace inversion, wherein the approximate value of the series is calculated from data of coefficients of the series by using a convergence acceleration method, wherein the convergence acceleration method is a method which gives a sequence converging to the value of the series faster than a sum of each term of the series.

14. The calculation method according to claim 1, wherein the Laplace inversion step includes:
a step of calculating, from data of coefficients of a series that approximates infinite interval integration of Laplace inversion, coefficients of continued fractions representing the series; and
a step of performing numerical calculation of values of the continued fractions using the coefficients.

15. The calculation method according to claim 14, wherein an infinite series obtained by applying Poisson method to integration of the infinite interval integration of Laplace inversion is used as the series that approximates the infinite interval integration of Laplace inversion.

16. The calculation method according to claim 14, wherein the step of calculating coefficients of continued fractions includes a step of calculating the coefficients of continued fractions on the basis of QD method.

17. The calculation method according to claim 14 wherein:
the series is an infinite series obtained on the basis of Poisson method, and
the step of calculating coefficients of continued fractions is a step of calculating the coefficients of continued fractions on the basis of QD method.

18. The calculation method according to claim 7, wherein:
the risk measure includes an expected loss, and
the expected loss is calculated from the probability density function or the distribution function.

19. The calculation method according to claim 8, wherein:
the risk measure includes a credit value-at-risk corresponding to a given confidence interval, and
the credit value-at-risk is calculated from the distribution function.

20. The calculation method according to claim 1, wherein, in the sector multiplying step, one of the discretized valuation points is specified from a set of the discretized valuation points to minimize an absolute value of a difference between the discretized valuation point and the sector variable.

21. A computer-readable medium that stores a program of set of instructions to cause a computer including arithmetic means and storage means to execute the calculation method of risk measures according to claim 1.

22. A calculation method for calculating risk measures concerning losses associated with a portfolio including credits given to a plurality of companies, the calculation method being implemented by a computer including an arithmetic device and a storage device including sector function data storage means, the method comprising:
a step of calculating, by a computer, for each of the companies, data of a loss index function, executed by a loss-index-function calculating unit, wherein the loss index function is a function of a probability of loss occurrence, which is the function of a sector variable, of the respective companies and an exponential of a value that is obtained by multiplying an auxiliary variable for Fourier transform by the exposure of the credits to the company and by the imaginary unit, wherein the sector variable is a realization of a sector risk factor for each of the sectors into which the companies included in the portfolio are grouped, wherein the sector risk factor is a random variable common to companies included in the sector and is defined as a linear combination of common risk factors, which are a plurality of risk factors that can affect firm values used for determination of the probability of loss occurrence, wherein the probability of loss occurrence is a conditional probability indicating the probability of the occurrence of loss of the company based on the firm value under the condition that the sector variable of the sector to which the company belongs is given, wherein the data of the loss index function is calculated by substituting each value of discretized valuation points for the sector variable in the probability of loss occurrence, wherein the discretized valuation points are a finite number of discrete points in a range corresponding to a distribution range of the sector variable and are calculated by the arithmetic device or are preliminarily stored in the storage device;
a sector-function-data calculating step of calculating sector function data, for each of the discretized valuation points, and storing the calculated sector function data, for each of the sectors and for each of the discretized valuation points, in the sector function data storage means, the sector-function-data calculating step being executed by a sector-function-data calculating unit, wherein the sector function is a function defined for each of the sectors and including the product of the loss index functions for all the companies belonging to the sector, wherein the sector function data are values of the sector function at the discretized valuation points, wherein the sector function data are calculated by using the value obtained by taking the product of the data of the loss index functions for all the companies in the respective sectors, and wherein the sector-function-data calculating unit stores each value of the calculated sector function data in the sector function data storage means in association with at least the sector for which the sector function is defined and the discretized valuation point at which the value of the sector function is calculated;
a sector multiplying step of calculating an approximate value of a conditional portfolio function at respective integration points, executed by a sector multiplying unit, wherein the conditional portfolio function is a function which includes the product of the sector functions for all the sectors included in the portfolio, wherein the integration points are a finite number of discrete points in a space of common risk variables for numerically performing integration over the common risk variables that are realization of the common risk factors, wherein the sector multiplying unit calculates the approximate value at the respective integration points, for each of the sectors, by specifying one of the discretized valuation points near the sector variable which is given by the linear combination of the components of the integration point, by retrieving the sector function data associated to the specified one discretized valuation point and the sector from the sector function data storage means, and by taking the product of the retrieved sector function data for all the sectors;

a portfolio-function calculating step of calculating data of a portfolio function, executed by a portfolio-function calculating unit, wherein the portfolio function is a function defined as the product of an average of the conditional portfolio function with respect to the common risk factors and a portfolio auxiliary variable function which is a function of the auxiliary variable, wherein the portfolio-function calculating unit calculates the average of the conditional portfolio function with respect to the common risk factors by numerically performing integration calculation over the common risk variables of an integrand that includes the conditional portfolio function using the approximate value of the conditional portfolio function at the integration points, wherein the portfolio-function calculating unit calculates the data of the portfolio function by calculating the product of the calculated average over the common risk factors of the conditional portfolio function and the portfolio auxiliary variable function;

a Fourier inversion step executed by a Fourier inversion unit, wherein the Fourier inversion unit calculates, using the data of the portfolio function, data of values of a function obtained by subjecting the portfolio function to inverse Fourier transform by numerically performing integration calculation over the auxiliary variable; and a risk-measure calculating step executed by a risk-measure calculating unit, wherein the risk-measure calculating unit calculates risk measures indicating risks concerning losses of the portfolio from the data of the values of the function obtained by subjecting the portfolio function to inverse Fourier transform.

23. The calculation method according to claim 22, wherein:
the sector function is the product of the loss index functions for all companies in the sector, and
the conditional portfolio function is the product of the sector functions for all sectors included in the portfolio.

24. The calculation method according to claim 22, wherein:
the sector function is the product of the product of the loss index functions for all companies in the sector and a sector auxiliary variable function that is a function of the auxiliary variable defined for each of the sectors,
the sector function data are calculated by multiplying the value obtained by taking the product of the data of the loss index functions for all companies in each of the sectors by a value of the sector auxiliary variable function, and
the conditional portfolio function is the product of the product of the sector functions for all sectors included in the portfolio and a conditional portfolio auxiliary variable function that is a function of the auxiliary variable.

25. The calculation method according to claim 22, wherein the portfolio-function calculating step includes:
a weight multiplying step of multiplying, for each of the integration points, the approximate value of the conditional portfolio function by a weight value related to the integration point to obtain weighted data; and
a step of adding up the weighted data for all the integration points to calculate an average over the common risk factors of the conditional portfolio function and calculating the product of the average and a value of a portfolio auxiliary variable function, which is a function of the auxiliary variable, to thereby calculate data of the portfolio function.

26. The calculation method according to claim 22, wherein the portfolio-function calculating step includes a step of adding up, for each of the integration points, the approximate values of the conditional portfolio function and dividing the added-up approximate value by the number of the integration points to calculate an average over the common risk factors of the conditional portfolio function and calculating the product of the average and a value of a portfolio auxiliary variable function, which is a function of the auxiliary variable, to thereby calculate data of the portfolio function.

27. The calculation method according to claim 22, wherein
the step of calculating data of the loss index function for each of the companies is a step of calculating the data of the loss index function for each value of the auxiliary variable used in numerical calculation of the Fourier inversion step,
the sector-function-data calculating step is a step of storing sector function data for each auxiliary variable, which is sector function data corresponding to each of the sectors, each of the discretized valuation points, and each of the values of the auxiliary variable, in the sector-function-data storage means as the sector function data in association with the sectors, the discretized valuation points, and each of the values of the auxiliary variable,
the sector multiplying step is a step of retrieving, with respect to each of the values of the auxiliary variable, the sector function data for each auxiliary variable from the sector-function-data storage means as the sector function data for one discretized valuation point specified for each of the sectors and taking the product of the sector function data for all the sectors,
the portfolio-function calculating step is executed with respect to each of the values of the auxiliary variable, and
the Fourier inversion step is a step of executing numerical calculation of integration calculation over the auxiliary variable according to data of the portfolio function with respect to each of the values of the auxiliary variable.

28. A computer-readable medium that stores a program of set of instructions to cause a computer including arithmetic means and storage means to execute the calculation method of risk measures according to claim 22.

29. A calculation apparatus that calculates risk measures for losses of a portfolio including credits given to a plurality of companies, the calculation apparatus being realized by a computer including an arithmetic device and a storage device including sector function data storage means, the calculation apparatus comprising:
a loss-index-function calculating unit that calculates, by a computer, for each of the companies, data of a loss index function, wherein the loss index function is a function of a probability of loss occurrence, which is the function of a sector variable, of the respective companies and an exponential of a value that is obtained by multiplying an auxiliary variable for Laplace transform by the exposure of the credits to the company, wherein the sector variable is a realization of a sector risk factor for each of the sectors into which the companies included in the portfolio are grouped, wherein the sector risk factor is a random variable common to the companies included in the sector and is defined as a linear combination of common risk factors, which are a plurality of risk factors that can affect firm values used for determination of the probability of loss occurrence, wherein the probability of loss occurrence is a conditional probability indicating the probability of the occurrence of loss of the company based on the firm value in a condition that the sector variable of the sector to which the company belongs is given, wherein the data of the loss index function is calculated by substituting each value of discretized valuation points for the sector variable in the probability of loss occurrence, wherein the discretized valuation points are a finite number of discrete points in a range corresponding to a distribution range of the sector variable and are calculated by the arithmetic device or are preliminarily stored in the storage device;

a sector-function-data calculating unit that calculates sector function data, for each of the discretized valuation points, and stores the calculated sector function data, for each of the sectors and for each of the discretized valuation points, in the sector function data storage means, wherein the sector function is a function defined for each of the sectors and including the product of the loss index functions for all the companies belonging to the sector, wherein the sector function data are values of the sector function at the discretized valuation points, wherein the sector function data are calculated by using the value obtained by taking the product of the data of the loss index functions for all the companies in the respective sectors, and wherein the sector-function-data calculating unit stores each value of the calculated sector function data in the sector function data storage means in association with at least the sector for which the sector function is defined and the discretized valuation point at which the value of the sector function is calculated;

a sector multiplying unit that calculates an approximate value of a conditional portfolio function at respective integration points, wherein the conditional portfolio function is a function which includes the product of the sector functions for all the sectors included in the portfolio, wherein the integration points are a finite number of discrete points in a space of common risk variables for numerically performing integration over the common risk variables that are realization of the common risk factors, wherein the sector multiplying unit calculates the approximate value at the respective integration points, for each of the sectors, by specifying one of the discretized valuation points near the sector variable which is given by the linear combination of the components of the integration point, by retrieving the sector function data associated to the specified one discretized valuation point and the sector from the sector function data storage means, and by taking the product of the retrieved sector function data for all the sectors;

a portfolio-function calculating unit that calculates data of a portfolio function, wherein the portfolio function is a function defined as the product of an average of the conditional portfolio function with respect to the common risk factors and a portfolio auxiliary variable function which is a function of the auxiliary variable, wherein the portfolio-function calculating unit calculates the average of the conditional portfolio function with respect to the common risk factors by numerically performing integration calculation over the common risk variables of an integrand that includes the conditional portfolio function using the approximate value of the conditional portfolio function at the integration points, wherein the portfolio-function calculating unit calculates the data of the portfolio function by calculating the product of the calculated average over the common risk factors of the conditional portfolio function and the portfolio auxiliary variable function;

a Laplace inversion unit that calculates, using the data of the portfolio function, data of values of a function obtained by subjecting the portfolio function to Laplace inversion by numerically performing integration calculation over the auxiliary variable; and a risk-measure calculating unit that calculates risk measures indicating risks concerning losses of the portfolio from the data of the values of the function obtained by subjecting the portfolio function to Laplace inversion.

30. A calculation apparatus that calculates risk measures for losses of a portfolio including credits given to a plurality of companies, the calculation apparatus being realized by a computer including an arithmetic device and a storage device including sector function data storage means, the calculation apparatus comprising:

a loss-index-function calculating unit that calculates, for each of the companies, data of a loss index function, wherein the loss index function is a function of a probability of loss occurrence, which is the function of a sector variable, of the respective companies and an exponential of a value that is obtained by multiplying an auxiliary variable for Fourier transform by the exposure of the credits to the company and by the imaginary unit, wherein the sector variable is a realization of a sector risk factor for each of the sectors into which the companies included in the portfolio are grouped, wherein the sector risk factor being a random variable common to companies included in the sector and is defined as a linear combination of common risk factors, which are a plurality of risk factors that can affect firm values used for determination of the probability of loss occurrence, wherein the probability of loss occurrence is a conditional probability indicating the probability of the occurrence of loss of the company based on the firm value in a condition that sector variable of the sector to which the company belongs is given, wherein the data of the loss index function is calculated by substituting each value of discretized valuation points for the sector variable in the probability of loss occurrence, wherein the discretized valuation points are a finite number of discrete points in a range corresponding to a distribution range of the sector variable and are calculated by the arithmetic device or are preliminarily stored in the storage device;

a sector-function-data calculating unit that calculates sector function data, for each of the discretized valuation points, and stores the calculated sector function data, for each of the sectors and for each of the discretized valuation points, in the sector function data storage means, wherein the sector function is a function defined for each of the sectors and including the product of the loss index functions for all the companies belonging to the sector, wherein the sector function data are values of the sector function at the discretized valuation points, wherein the sector function data are calculated by using the value obtained by taking the product of the data of the loss index functions for all the companies in the respective sectors, and wherein the sector-function-data calculating unit stores each value of the calculated sector function data in the sector function data storage means in association with at least the sector for which the sector function is defined and the discretized valuation point at which the value of the sector function is calculated;

a sector multiplying unit that calculates an approximate value of a conditional portfolio function at respective integration points, wherein the conditional portfolio function is a function which includes the product of the sector functions for all the sectors included in the portfolio, wherein the integration points are a finite number of discrete points in a space of common risk variables for numerically performing integration over the common risk variables that are realization of the common risk factors, wherein the sector multiplying unit calculates the approximate value at the respective integration points, for each of the sectors, by specifying one of the discretized valuation points near the sector variable which is given by the linear combination of the components of the integration point, by retrieving the sector function data associated to the specified one discretized valuation point and the sector from the sector function data storage means, and by taking the product of the retrieved sector function data for all the sectors;

a portfolio-function calculating unit that calculates data of a portfolio function, wherein the portfolio function is a function defined as the product of an average of the conditional portfolio function with respect to the common risk factors and a portfolio auxiliary variable function which is a function of the auxiliary variable, wherein the portfolio-function calculating unit calculates the average of the conditional portfolio function with respect to the common risk factors by numerically performing integration calculation over the common risk variables of an integrand that includes the conditional portfolio function using the approximate value of the conditional portfolio function at the integration points, wherein the portfolio-function calculating unit calculates the data of the portfolio function by calculating the product of the calculated average over the common risk factors of the conditional portfolio function and the portfolio auxiliary variable function;

a Fourier inversion unit that calculates, using the data of the portfolio function, data of values of a function obtained by subjecting the portfolio function to Fourier inversion by numerically performing integration calculation over the auxiliary variable; and a risk-measure calculating unit that calculates risk measures indicating risks concerning losses of the portfolio from the data of the values of the function obtained by subjecting the portfolio function to Fourier inversion.

* * * * *